(12) United States Patent
Kuramitsu et al.

(10) Patent No.: US 10,862,417 B2
(45) Date of Patent: Dec. 8, 2020

(54) ROTARY ELECTRIC DEVICE CONTROL DEVICE AND ELECTRIC POWER STEERING DEVICE

(71) Applicant: DENSO CORPORATION, Kariya (JP)

(72) Inventors: Shuji Kuramitsu, Kariya (JP); Koichi Nakamura, Kariya (JP); Atsuko Oka, Kariya (JP); Masaya Taki, Kariya (JP); Hideki Kabune, Kariya (JP); Yuki Watanabe, Kariya (JP); Toshimitsu Sakai, Kariya (JP); Yosuke Ogi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/405,049

(22) Filed: May 7, 2019

(65) Prior Publication Data
US 2019/0260324 A1 Aug. 22, 2019

Related U.S. Application Data

(63) Continuation of application No. PCT/JP2017/040396, filed on Nov. 9, 2017.

(30) Foreign Application Priority Data

Nov. 11, 2016 (JP) ................................ 2016-220474
Feb. 10, 2017 (JP) ................................ 2017-23443
Oct. 31, 2017 (JP) ................................ 2017-209905

(51) Int. Cl.
*H02P 5/46* (2006.01)
*H02P 25/22* (2006.01)
(Continued)

(52) U.S. Cl.
CPC ............... *H02P 25/22* (2013.01); *H02P 5/46* (2013.01); *H02P 5/74* (2013.01); *H02P 21/22* (2016.02)

(58) Field of Classification Search
CPC ...... H02M 1/14; H02M 7/493; G05B 19/404; G05B 2219/41059; G05B 2219/41264;
(Continued)

(56) References Cited

U.S. PATENT DOCUMENTS 4,426,611 A * 1/1984 Espelage ............. H02M 5/4505
318/798
6,676,400 B2 * 1/2004 Ito .......................... B29C 45/76
318/801
(Continued)

FOREIGN PATENT DOCUMENTS

JP 2001-204195 A 7/2001
JP 3839358 B2 11/2006
(Continued)

*Primary Examiner* — Rina I Duda
(74) *Attorney, Agent, or Firm* — Maschoff Brennan

(57) ABSTRACT

A rotary electric device control device controls driving of a rotary electric device including a plurality of winding sets. The rotary electric device control device includes: a plurality of drive circuits; and a plurality of control units. The control units include signal output units for outputting control signals to the drive circuits corresponding to the control units, respectively, and communicate with each other. The control units include: one master control unit; and at least one slave control unit. An electric power steering device includes: a rotary electric device control device; the rotary electric device that outputs an assist torque for assisting a steering operation of a steering wheel by a driver; and a power transmission unit that transmits a driving force of the rotary electric device to a drive target.

25 Claims, 37 Drawing Sheets

(51) Int. Cl.
*H02P 21/22* (2016.01)
*H02P 5/74* (2006.01)

(58) Field of Classification Search
CPC .... H02P 25/22; H02P 5/46; H02P 5/68; H02P 5/74; H02P 21/22
See application file for complete search history.

(56) References Cited

U.S. PATENT DOCUMENTS

| | | | | |
|---|---|---|---|---|
| 6,693,405 | B2* | 2/2004 | Blanke | B62D 5/003 180/446 |
| 6,864,646 | B2* | 3/2005 | Rahman | H02P 5/74 318/41 |
| 8,305,016 | B2* | 11/2012 | Okita | G05B 19/404 318/34 |
| 8,436,565 | B2* | 5/2013 | Maeda | G05B 19/404 318/432 |
| 8,569,981 | B2* | 10/2013 | Nakamura | B62D 5/0403 318/400.02 |
| 8,604,730 | B2* | 12/2013 | Suzuki | H02M 1/14 318/400.02 |
| 8,897,967 | B2* | 11/2014 | Uryu | B62D 5/0484 701/43 |
| 2005/0159866 | A1 | 7/2005 | Takeuchi et al. | |
| 2011/0266984 | A1 | 11/2011 | Watanabe et al. | |
| 2013/0285591 | A1* | 10/2013 | Suzuki | H02P 6/10 318/724 |
| 2013/0299271 | A1* | 11/2013 | Endo | B62D 5/046 180/446 |
| 2017/0310264 | A1 | 10/2017 | Okamoto et al. | |

FOREIGN PATENT DOCUMENTS

| | | |
|---|---|---|
| JP | 2011-195089 A | 10/2011 |
| JP | 2011-234517 A | 11/2011 |
| JP | 2014-176215 A | 9/2014 |
| JP | 2015-126642 A | 7/2015 |
| WO | 2016079839 A1 | 5/2016 |

* cited by examiner

FIG. 23A

| q-AXIS CUR COMMAND VAL Iq* | d-AXIS CUR COMMAND VAL Id* | q-AXIS CUR DETECT VAL Iq1 | d-AXIS CUR DETECT VAL Id1 | RUN COUNTER | CRC |

FIG. 23B

| q-AXIS CUR DETECT VAL Iq2 | d-AXIS CUR DETECT VAL Id2 | RUN COUNTER | CRC |

FIG. 23C

| ASSIST TORQ CUR COMMAND VAL Trq* | q-AXIS CUR DETECT VAL Iq1 | d-AXIS CUR DETECT VAL Id1 | RUN COUNTER | CRC |

FIG. 23D

| q-AXIS VOLT COMMAND VAL Vq2* | d-AXIS VOLT COMMAND VAL Vd2* | RUN COUNTER | CRC |

FIG. 23E

| U-PH VOLT COMMAND VAL Vu2* | V-PH VOLT COMMAND VAL Vv2* | W-PH VOLT COMMAND VAL Vw2* | RUN COUNTER | CRC |

FIG. 23F

| U-PH PWM SIG PWM_u2* | V-PH PWM SIG PWM_v2* | W-PH PWM SIG PWM_w2* | RUN COUNTER | CRC |

FIG. 28A

| q-AXIS CUR COMMAND VAL Iq* | d-AXIS CUR COMMAND VAL Id* | q-AXIS CUR DETECT VAL Iq1 | d-AXIS CUR DETECT VAL Id1 | MASTER STATUS | RUN COUNTER | CRC |
|---|---|---|---|---|---|---|

FIG. 28B

| q-AXIS CUR DETECT VAL Iq2 | d-AXIS CUR DETECT VAL Id2 | SLAVE STATUS | RUN COUNTER | CRC |
|---|---|---|---|---|

FIG. 28C

| ASSIST TORQ CUR COMMAND VAL Trq* | q-AXIS CUR DETECT VAL Iq1 | d-AXIS CUR DETECT VAL Id1 | MASTER STATUS | RUN COUNTER | CRC |
|---|---|---|---|---|---|

FIG. 28D

| q-AXIS VOLT COMMAND VAL Vq2* | d-AXIS VOLT COMMAND VAL Vd2* | MASTER STATUS | RUN COUNTER | CRC |
|---|---|---|---|---|

FIG. 28E

| U-PH VOLT COMMAND VAL Vu2* | V-PH VOLT COMMAND VAL Vv2* | W-PH VOLT COMMAND VAL Vw2* | MASTER STATUS | RUN COUNTER | CRC |
|---|---|---|---|---|---|

FIG. 28F

| U-PH PWM SIG PWM_u2* | V-PH PWM SIG PWM_v2* | W-PH PWM SIG PWM_w2* | MASTER STATUS | RUN COUNTER | CRC |
|---|---|---|---|---|---|

US 10,862,417 B2

ROTARY ELECTRIC DEVICE CONTROL DEVICE AND ELECTRIC POWER STEERING DEVICE

CROSS REFERENCE TO RELATED APPLICATION

The present application is a continuation application of International Patent Application No. PCT/JP2017/040396 filed on Nov. 9, 2017, which designated the U.S. and claims the benefit of priority from Japanese Patent Applications No. 2016-220474 filed on Nov. 11, 2016, No. 2017-23443 filed on Feb. 10, 2017 and No. 2017-209905 filed on Oct. 31, 2017. The entire disclosures of all of the above applications are incorporated herein by reference.

TECHNICAL FIELD

The present disclosure relates to a rotary electric device control device and an electric power steering device using the control device.

BACKGROUND

Conventionally, an electric power steering device for assisting steering by a driving force of a motor has been known. For example, two microcomputers independently calculate a basic assist control amount.

SUMMARY

According to an aspect of the present disclosure, a rotary electric device control device controls driving of a rotary electric device including a plurality of winding sets. The rotary electric device control device includes: a plurality of drive circuits; and a plurality of control units. The control units include signal output units for outputting control signals to the drive circuits corresponding to the control units, respectively, and communicate with each other. The control units include: one master control unit; and at least one slave control unit.

According to another aspect of the present disclosure, an electric power steering device includes: a rotary electric device control device; the rotary electric device that outputs an assist torque for assisting a steering operation of a steering wheel by a driver; and a power transmission unit that transmits a driving force of the rotary electric device to a drive target.

BRIEF DESCRIPTION OF THE DRAWINGS

The above and other objects, features and advantages of the present disclosure will become more apparent from the following detailed description made with reference to the accompanying drawings. In the drawings:

FIG. 23A is an illustrative diagram illustrating a communication frame of an inter-microcomputer communication according to the seventh embodiment;

FIG. 23B is an illustrative diagram illustrating the communication frame of the inter-microcomputer communication according to the seventh embodiment;

FIG. 23C is an illustrative diagram illustrating the communication frame of the inter-microcomputer communication according to the seventh embodiment;

FIG. 23D is an illustrative diagram illustrating the communication frame of the inter-microcomputer communication according to the seventh embodiment;

FIG. 23E is an illustrative diagram illustrating the communication frame of the inter-microcomputer communication according to the seventh embodiment;

FIG. 23F is an illustrative diagram illustrating the communication frame of the inter-microcomputer communication according to the seventh embodiment;

FIG. 28A is an illustrative diagram illustrating a communication frame of an inter-microcomputer communication according to an eighth embodiment;

FIG. 28B is an illustrative diagram illustrating the communication frame of the inter-microcomputer communication according to the eighth embodiment;

FIG. 28C is an illustrative diagram illustrating the communication frame of the inter-microcomputer communication according to the eighth embodiment;

FIG. 28D is an illustrative diagram illustrating the communication frame of the inter-microcomputer communication according to the eighth embodiment;

FIG. 28E is an illustrative diagram illustrating the communication frame of the inter-microcomputer communication according to the eighth embodiment;

FIG. 28F is an illustrative diagram illustrating the communication frame of the inter-microcomputer communication according to the eighth embodiment;

DETAILED DESCRIPTION

Figure 1:
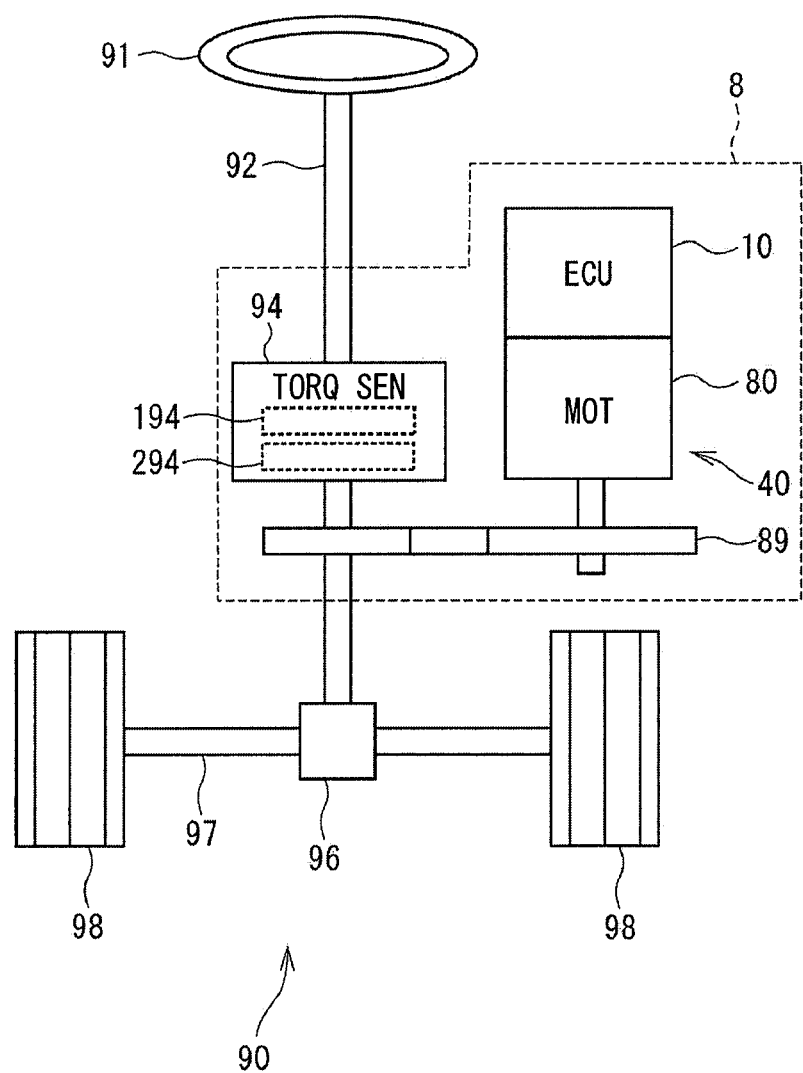
FIG. 1 is a schematic configuration diagram of a steering system according to a first embodiment.

When the assist control amount is calculated independently in each system and current control is performed independently, inconsistencies may occur between the systems.

A rotary electric device control device that controls driving of a rotary electric device while coordinating multiple systems with each other, and an electric power steering device using the control device are provided.

A rotary electric device control device controls driving of a rotary electric device including a plurality of winding sets. The rotary electric device control device includes: a plurality of drive circuits; and a plurality of control units. The control units include signal output units for outputting control signals to the drive circuits corresponding to the control units, respectively, and communicate with each other. The control units include: one master control unit that calculates a command value for generating the control signals in all the control units, and transmits the command value to another control unit; and at least one slave control unit that outputs another control signal based on the command value transmitted from the master control unit.

With transmission of a command value calculated by one master control unit to a slave control unit, the multiple systems can be appropriately coordinated with each other, and the inconsistency between the systems and the complexity of arbitration can be reduced.

A rotary electric device control device controls driving of a rotary electric device including a plurality of winding sets. The rotary electric device control device includes: a plurality of drive circuits; and a plurality of control units. The control units include signal output units for outputting control signals to the drive circuits corresponding to the control units, respectively, and communicate with each other. The control units include one master control unit and at least one slave control unit. The control unit includes: a cooperative drive mode, an independent drive mode and a single-system driving mode. In the cooperative drive mode, the master control unit calculates a command value for generating a control signal, and outputs the control signal based on the command value, and the slave control unit outputs another control signal based on the command value calculated by the master control unit. In the independent drive mode, the master control unit calculates a command value for generating a control signal in a master system and outputs the control signal based on a calculated command value, and the slave control unit calculates another command value for generating another control signal of a slave system and outputs the other control signal based on a calculated other command value. In the single-system driving mode in which a part of the master control unit and the slave control unit stops outputting a control signal, and another control unit calculates another command value for generating another control signal of another system and outputs the other control signal based on the other command value.

Hereinafter, a rotary electric device control device and an electric power steering device according to the present disclosure will be described with reference to the drawings. Hereinafter, in a plurality of embodiments, substantially the same components are denoted by the same reference numerals, and descriptions thereof are omitted.

First Embodiment

The first embodiment is shown in FIGS. 1 to 11. As shown in FIG. 1, an ECU 10 as a rotary electric device control device according to the present embodiment is applied to, for example, an electric power steering device 8 for assisting a steering operation of a vehicle together with a motor 80 as a rotary electric device. FIG. 1 shows an overall configuration of a steering system 90 including the electric power steering device 8.

FIG. 1 shows a configuration of the steering system 90 including the electric power steering device 8. The steering system 90 includes a steering wheel 91 as a steering member, a steering shaft 92, a pinion gear 96, a rack shaft 97, wheels 98, the electric power steering device 8, and the like. The steering wheel 91 is connected to the steering shaft 92. The steering shaft 92 is provided with a torque sensor 94 for detecting a steering torque Ts. The pinion gear 96 is provided at a tip of the steering shaft 92. The pinion gear 96 meshes with the rack shaft 97. A pair of the wheels 98 is connected to both ends of the rack shaft 97 through tie rods or the like.

When a driver rotates the steering wheel 91, the steering shaft 92 connected to the steering wheel 91 rotates. The rotational movement of the steering shaft 92 is converted into a linear movement of the rack shaft 97 by the pinion gear 96. The pair of wheels 98 are steered to an angle corresponding to the displacement amount of the rack shaft 97.

The electric power steering device 8 includes a drive device 40 having the motor 80 and the ECU 10, and a reduction gear 89 as a power transmission portion that reduces the rotation of the motor 80 and transmits the reduced rotation to the steering shaft 92. The electric power steering device 8 according to the present embodiment is a so-called "column assist type", but may be a so-called "rack assist type" which transmits the rotation of the motor 80 to the rack shaft 97. In the present embodiment, the steering shaft 92 corresponds to a "drive target".

The motor 80 outputs an assisting torque for assisting the driver to steer the steering wheel 91, and is driven by an electric power supplied from batteries 191 and 291 (refer to FIG. 8) as a power supply to rotate the reduction gear 89 forward and backward. The motor 80 is a three-phase brushless motor and includes a rotor 860 and a stator 840 (refer to FIG. 6).

Figure 2:
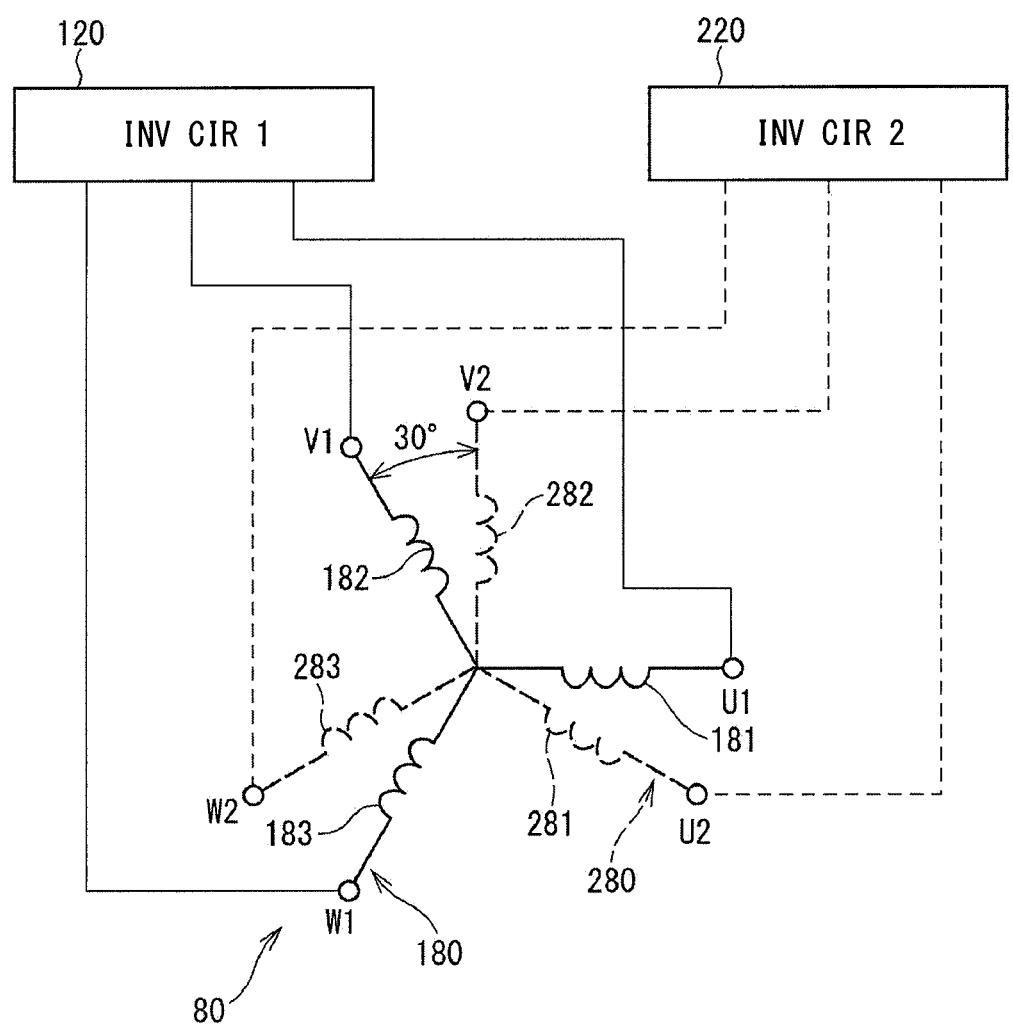
FIG. 2 is a schematic diagram showing a motor winding according to the first embodiment.

As shown in FIG. 2, the motor 80 has a first motor winding 180 and a second motor winding 280 as a winding set. As shown in FIG. 2, the first motor winding 180 includes a U1 coil 181, a V1 coil 182, and a W1 coil 183. The second motor winding 280 includes a U2 coil 281, a V2 coil 282, and a W2 coil 283. In the figure, the first motor winding 180 is referred to as "motor winding 1" and the second motor winding 280 is referred to as "motor winding 2". In other configurations to be described later, a "first" is described as a subscript "1" and a "second" is described as a subscript "2" as appropriate in the drawings.

Figure 3:
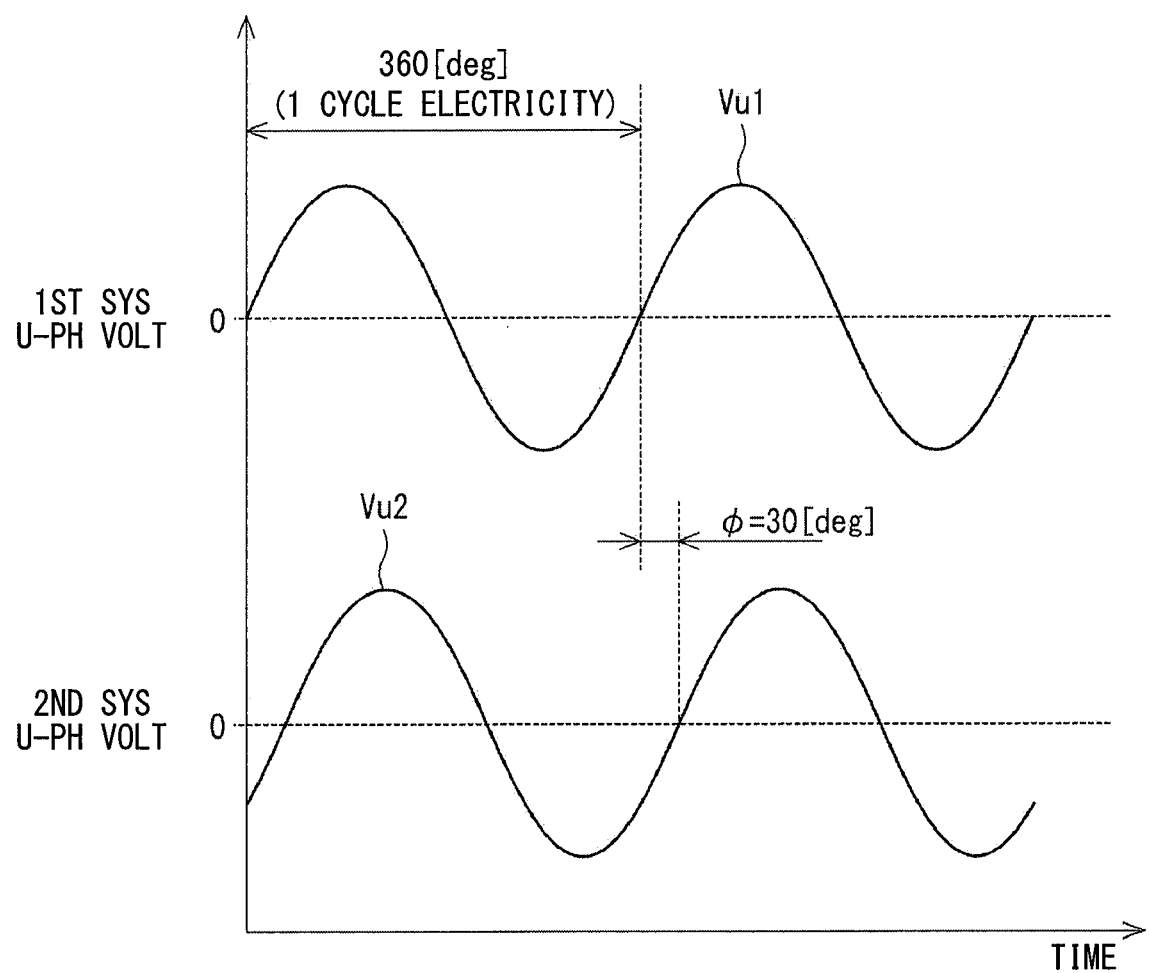
FIG. 3 is a time chart illustrating an energization phase difference according to the first embodiment.
Figure 4:
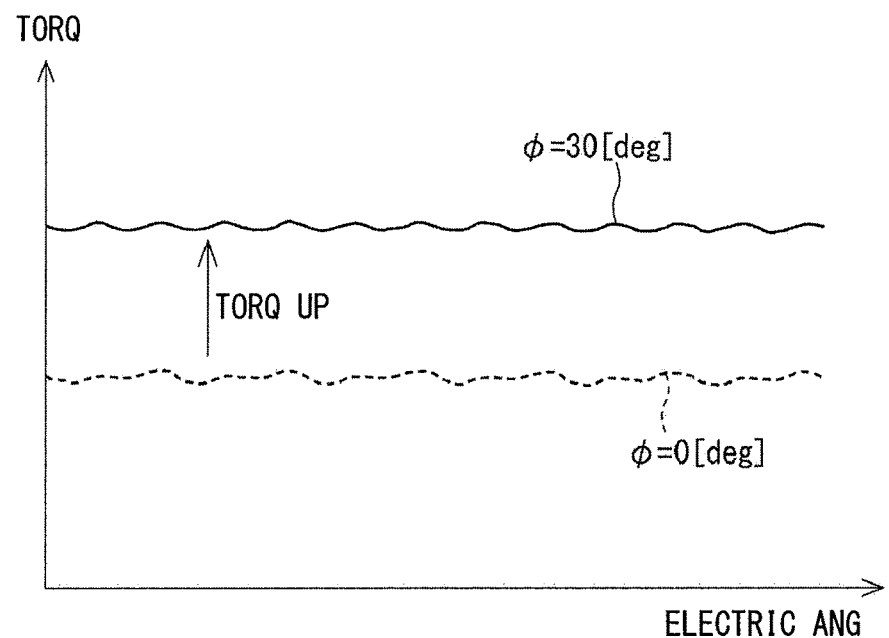
FIG. 4 is an illustrative diagram illustrating a torque improvement by a phase difference energization according to the first embodiment.
Figure 5:
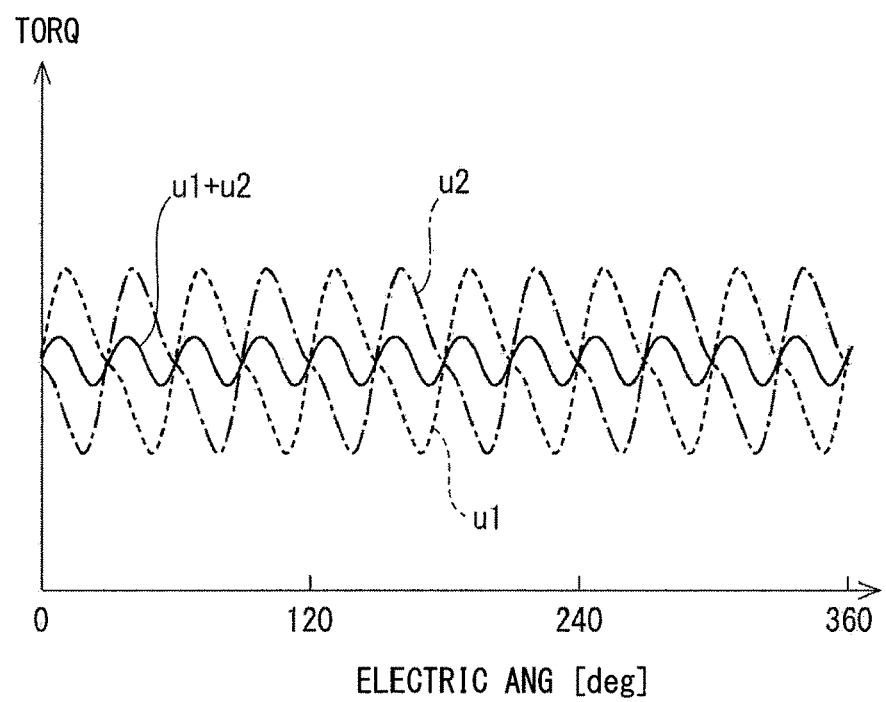
FIG. 5 is an illustrative diagram illustrating a torque ripple according to the first embodiment.

The first motor winding 180 and the second motor winding 280 have the same electrical characteristics, and are wound to cancel each other by shifting the common stator 840 by an electrical angle of 30 [deg] from each other, as shown in FIG. 3 of Japanese Patent No. 5672278, for example. In response to the above configuration, the motor windings 180 and 280 are controlled to be energized by a phase current whose phase ϕ is shifted by 30 [deg] (refer to FIG. 3). FIG. 3 illustrates a U-phase voltage Vu1 of the first system and a U-phase voltage Vu2 of the second system. As shown in FIG. 4, an energization phase difference is optimized, to thereby improve an output torque as compared with the case where a phase difference energization is not performed. In addition, as shown in FIG. 5, a sixth-order torque ripple can be reduced by setting the energization phase difference to an electric angle 30 [deg] (refer to Expression (I)).

$$\sin 6(\omega t) + \sin 6(\omega t + 30) = 0 \qquad (i)$$

Furthermore, since the currents are averaged by the phase difference energization, the cancellation merit of noise and vibration can be maximized. In addition, since the heat generation is also averaged, an error between the systems depending on a temperature, such as a detection value of each sensor and a torque can be reduced and a current amount can be averaged.

Hereinafter, a combination of a first inverter circuit 120, a first control unit 131, and so on involved in the drive control of the first motor winding 180 is referred to as a first system L1, and a combination of a second inverter circuit 220, a second control unit 231, and so on involved in the drive control of the second motor winding 280 is referred to as a second system L2. In the present embodiment, the first system L1 corresponds to a "master system" and the second system L2 corresponds to a "slave system". In addition, the configuration involved in the first system L1 is numbered in the 100-th order, and the configuration involved in the second system L2 is numbered in the 200-th order. In the first system L1 and the second system L2, the same components are numbered so that the last two digits are the same.

Figure 6:
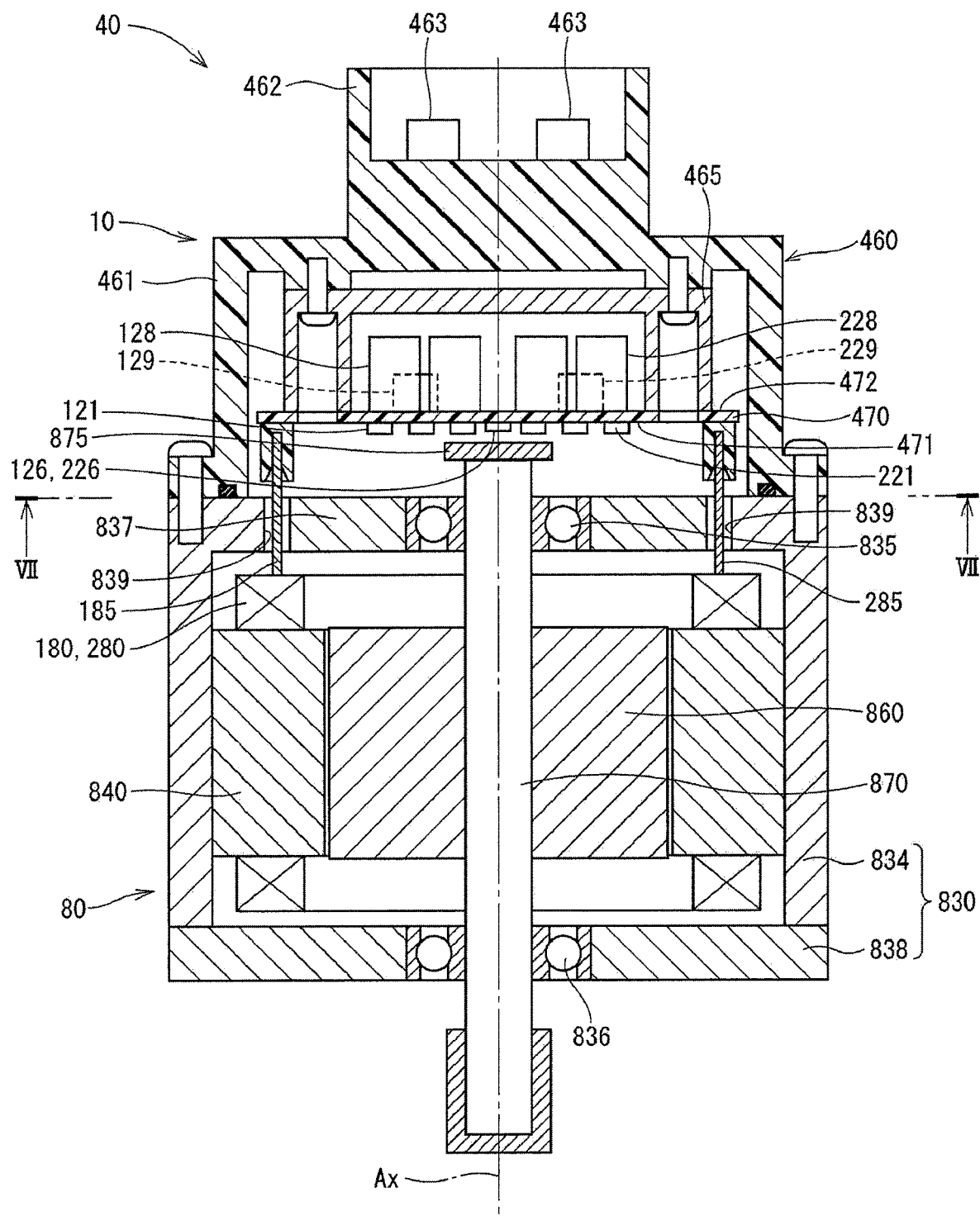
FIG. 6 is a cross-sectional view of a drive device according to the first embodiment.
Figure 7:
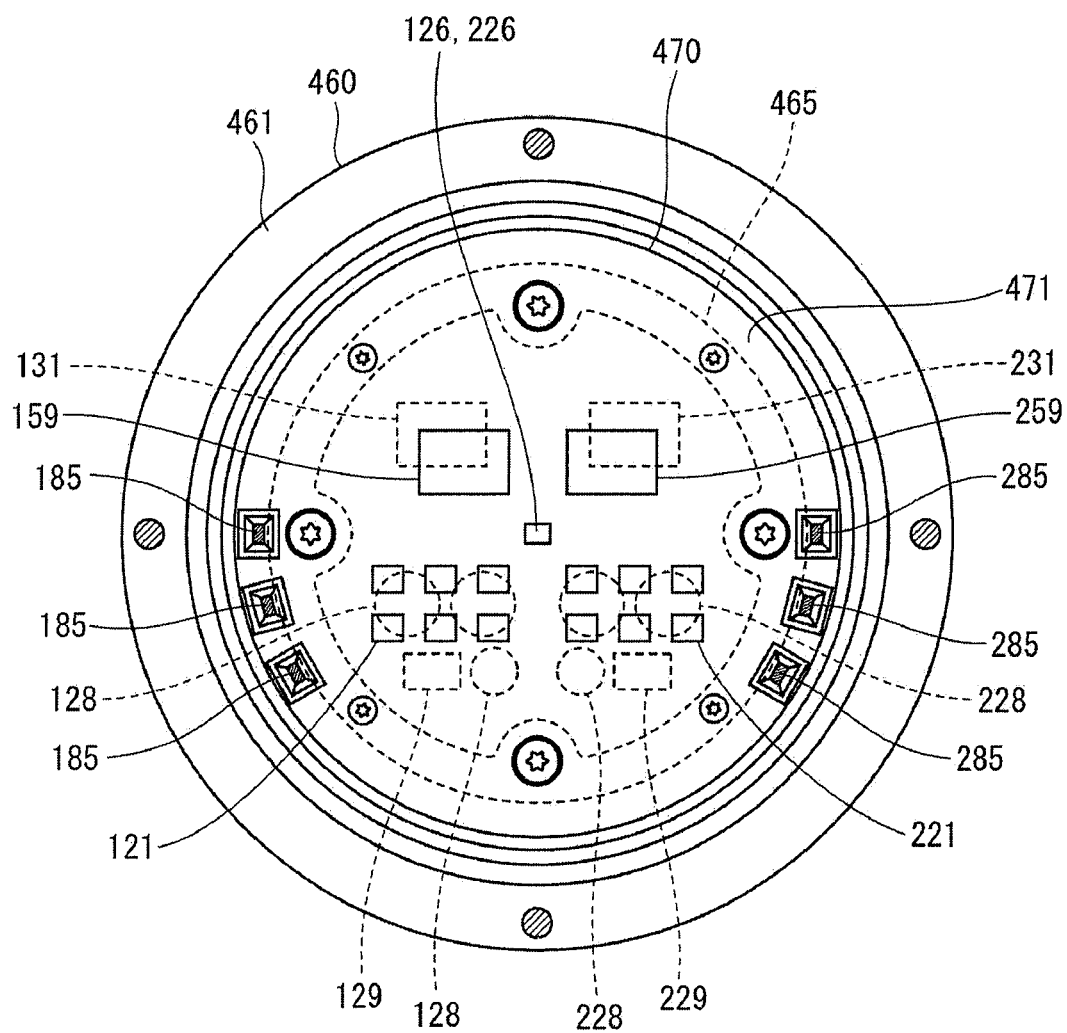
FIG. 7 is a cross-sectional view taken along a line VII-VII of FIG. 6.

The configuration of the drive device 40 will be described with reference to FIGS. 6 and 7. In the drive device 40 according to the present embodiment, the ECU 10 is a so-called "electro-mechanically integrated type" in which the ECU 10 is integrally provided on one side of the motor 80 in the axial direction. The ECU 10 is disposed coaxially with an axis Ax of a shaft 870 on a side of the motor 80 opposite to the output shaft. The ECU 10 may be provided on the output shaft of the motor 80. With the provision of the electro-mechanically integrated type, the ECU 10 and the motor 80 can be efficiently disposed in a vehicle having a limited mounting space.

The motor 80 includes a stator 840, a rotor 860, and a housing 830 for accommodating those components. The stator 840 is secured to housing 830 and motor windings 180 and 280 are wound on the stator 840. The rotor 860 is provided in the radially inner side of the stator 840 and rotatable relative to the stator 840.

The shaft 870 is fitted into the rotor 860 and rotates integrally with the rotor 860. The shaft 870 is rotatably supported in the housing 830 by bearings 835 and 836. An end portion of the shaft 870 on the ECU 10 side projects toward the ECU 10 from the housing 830. A magnet 875 is provided at the end portion of the shaft 870 on the ECU 10 side.

The housing 830 includes a bottomed cylindrical case 834 including a rear frame end 837, and a front frame end 838 provided on an opening side of the case 834. The case 834 and the front frame end 838 are fastened to each other by a bolt or the like. Lead line insertion holes 839 are provided in the rear frame end 837. Lead lines 185 and 285 connected to the respective phases of the respective motor windings 180 and 280 are inserted into the lead line insertion holes 839. The lead lines 185 and 285 are taken out from the lead line insertion holes 839 to the ECU 10 side and connected to the circuit board 470.

The ECU 10 includes a cover 460, a heat sink 465 which is fixed to the cover 460, a circuit board 470 which is fixed to the heat sink 465, various electronic components which are mounted on the substrate 470, and the like.

The cover 460 protects the electronic components from an external impact, and prevents dust, water, and the like from entering an inside of the ECU 10. The cover 460 has a cover main body 461 and a connector portion 462 integrally formed with each other. The connector portion 462 may be separate from the cover main body 461. Terminals 463 of the connector portion 462 are connected to the circuit board 470 through a wire (not shown) or the like. The number of connectors and the number of terminals can be appropriately changed in accordance with the number of signals and the like. The connector portion 462 is provided one an end portion of the drive device 40 in the axial direction, and opens on a side opposite to the motor 80. The connector portion 462 includes connectors 111 to 113 and 211 to 231 which will be described later.

The substrate 470 is, for example, a printed board, and is provided to face the rear frame end 837. On the circuit board 470, electronic components of two systems are mounted independently for each system, to form a completely redundant configuration. In the present embodiment, electronic components are mounted on one circuit board 470, but the electronic components may be mounted on multiple substrates.

Of two main surfaces of the circuit board 470, one surface on the motor 80 side is defined as a motor surface 471, and the other surface on the opposite side to the motor 80 is defined as a cover surface 472. As shown in FIG. 7, a switching element 121 configuring the inverter circuit 120, a switching element 221 configuring the inverter circuit 220, rotation angle sensors 126 and 226, custom ICs 159 and 259, and the like are mounted on the motor surface 471. The rotation angle sensors 126 and 226 are mounted at places facing the magnet 875 so as to be able to detect a change in the magnetic field caused by the rotation of the magnet 875.

Capacitors 128 and 228, inductors 129 and 229, microcomputers configuring the control units 131 and 231, and the like are mounted on the cover surface 472. In FIG. 7, "131" and "231" are assigned to the microcomputers configuring the control units 131 and 231, respectively. The capacitors 128 and 228 smooth electric powers input from the batteries 191 and 291 (refer to FIG. 8). The capacitors 128 and 228 also store charge to assist in supplying the power to the motor 80. The capacitors 128, 228 and the inductors 129, 229 configure a filter circuit to reduce noise transmitted from other devices sharing the batteries 191 and 291 and to reduce noise transmitted from the drive device 40 to the other devices sharing the batteries 191 and 291. Although not shown in FIG. 7, power supply circuits 116 and 216, the motor relay, current sensors 125 and 225, and the like are also mounted on the motor surface 471 or the cover surface 472.

Figure 8:
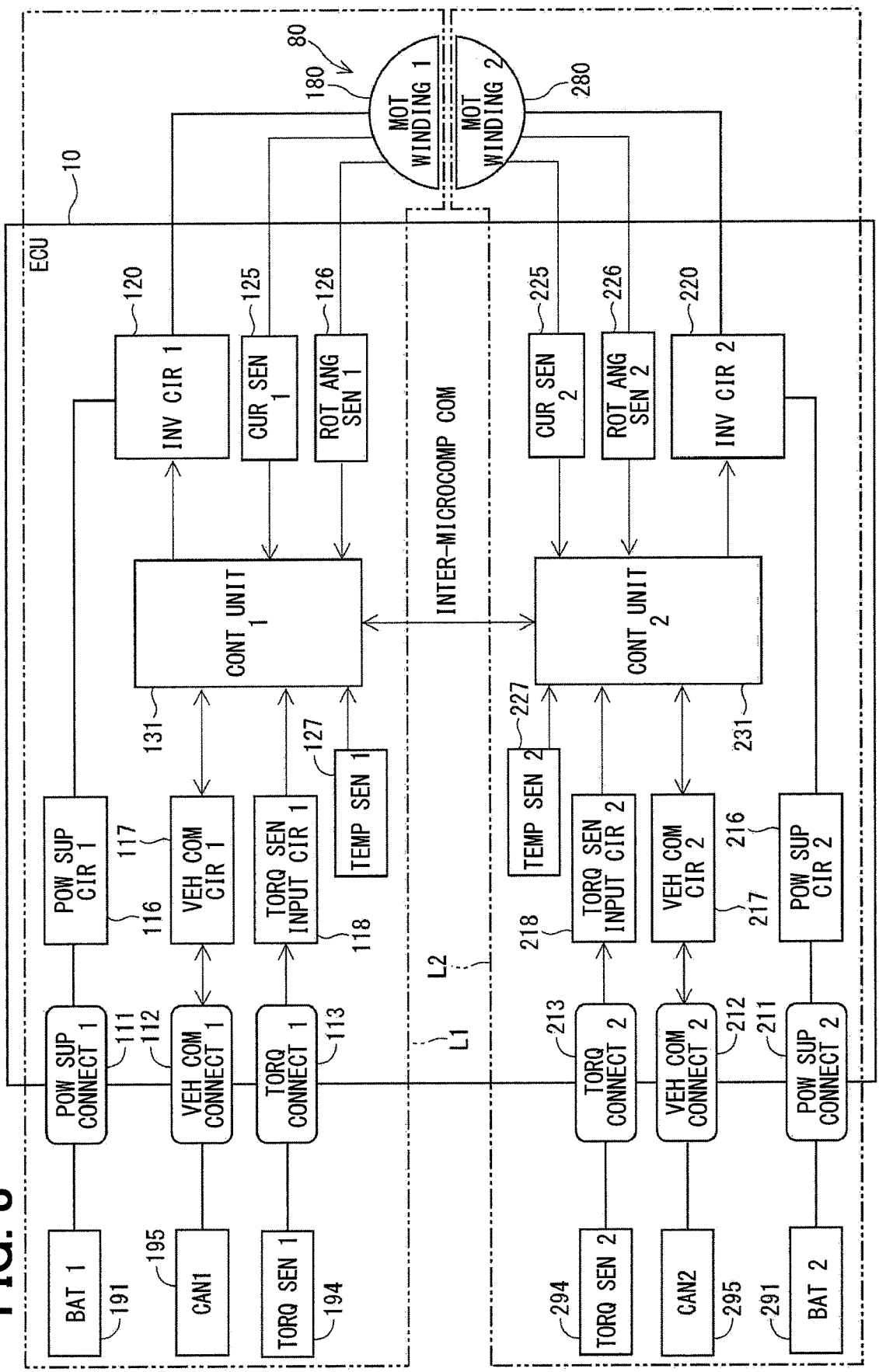
FIG. 8 is a block diagram showing a motor control device according to the first embodiment.

As shown in FIG. 8, the ECU 10 includes the inverter circuits 120 and 220 as the drive circuits, the control units 131 and 231, and so on. The ECU 10 is provided with a first power supply connector 111, a first vehicle communication connector 112, a first torque connector 113, a second power supply connector 211, a second vehicle communication connector 212, and a second torque connector 213.

The first power supply connector 111 is connected to the first battery 191, and the second power supply connector 211 is connected to the second battery 291. The connectors 111 and 211 may be connected to the same battery. The first power supply connector 111 is connected to the first inverter circuit 120 through the first power supply circuit 116. The second power supply connector 211 is connected to the second inverter circuit 220 through the second power supply circuit 216. The power supply circuits 116 and 216 are, for example, power supply relays.

The first vehicle communication connector 112 is connected to a first vehicle communication network 195, and the second vehicle communication connector 212 is connected to a second vehicle communication network 295. In FIG. 8, a CAN (Controller Area Network) is exemplified as the vehicle communication networks 195 and 295, but any standard network such as CAN-FD (CAN with Flexible Data rate) or FlexRay may be used.

The first vehicle communication connector 112 is connected to the first control unit 131 through a first vehicle communication circuit 117. The first control unit 131 can transmit and receive information to and from the vehicle communication networks through the vehicle communication connector 112 and the vehicle communication circuit 117. The second vehicle communication connector 212 is connected to the second control unit 231 through a second vehicle communication circuit 217. The second control unit 231 can exchange information with the vehicle communication network through the vehicle communication connector 212 and the vehicle communication circuit 217.

The torque connectors 113 and 213 are connected to the torque sensor 94. In detail, the first torque connector 113 is connected to the first sensor unit 194 of the torque sensor 94. The second torque connector 213 is connected to the second sensor unit 294 of the torque sensor 94. In FIG. 8, the first sensor unit 194 is referred to as "torque sensor 1" and the second sensor unit 294 is referred to as "torque sensor 2".

The first control unit 131 can acquire a torque signal involved in the steering torque Ts from the first sensor unit 194 of the torque sensor 94 through the torque connector 113 and a torque sensor input circuit 118. The second control unit 231 can acquire a torque signal involved in the steering torque Ts from the second sensor unit 294 of the torque sensor 94 through the torque connector 213 and the torque sensor input circuit 218. With the above configuration, the control units 131 and 231 can calculate the steering torque Ts based on the torque signal.

The first inverter circuit 120 is a three-phase inverter having the switching element 121, and converts electric power supplied to the first motor winding 180. The on/off operation of the switching element 121 is controlled based on first PWM signals PWM_u1*, PWM_v1*, and PWM_w1* output from the first control unit 131.

The second inverter circuit 220 is a three-phase inverter having a switching element 221, and converts an electric power supplied to the second motor winding 280. The on/off operation of the switching element 221 is controlled based on second PWM signals PWM_u2*, PWM_v2*, and PWM_w2* output from the second control unit 231. In the present embodiment, the PWM signals PWM_u1*, PWM_v1*, PWM_w1*, PWM_u2*, PWM_v2*, and PWM_w2* correspond to "control signals".

The first current sensor 125 detects a first U-phase current Iu1, a first V-phase current Iv1, and a first W-phase current Iw1 that are supplied to the respective phases of the first motor winding 180, and outputs the detection values to the first control unit 131. The second current sensor 225 detects a second U-phase current Iu2, a second V-phase current Iv2, and a second W-phase current Iw2 that are supplied to the respective phases of the second motor winding 280, and outputs the detection values to the second control unit 231. Hereinafter, the U-phase current, the V-phase current, and the W-phase current are collectively referred to as "phase current" or "three-phase current" as appropriate. A d-axis current and a q-axis current are collectively referred to as "dq-axis current" as appropriate. The same applies to the voltage.

The first rotation angle sensor 126 detects a rotation angle of the motor 80 and outputs the detected rotation angle to the first control unit 131. The second rotation angle sensor 226 detects the rotation angle of the motor 80 and outputs the detected rotation angle to the second control unit 231. In the present embodiment, an electric angle based on the detection value of the first rotation angle sensor 126 is defined as a first electric angle EleAng1, and an electric angle based on the detection value of the second rotation angle sensor 226 is defined as a second electric angle EleAng2.

The first temperature sensor 127 is disposed, for example, in a region where the first inverter circuit 120 is provided, and detects a temperature of the first system L1. The second temperature sensor 227 is disposed, for example, in a region where the second inverter circuit 220 is provided, and detects a temperature of the second system L2. The temperature sensors 127 and 227 may detect a temperature of the heat sink 465, may detect a temperature of the circuit board 470, may detect element temperatures of the inverter circuits 120 and 220, or may detect temperatures of the motor windings 180 and 280.

The first control unit 131 is supplied with a power through the first power supply connector 111, a regulator (not shown), and the like. The second control unit 231 is supplied with the power through the second power supply connector 211, a regulator (not shown), and the like. The first control unit 131 and the second control unit 231 are provided so as to be able to communicate with each other between the control units. Hereinafter, the communication between the control units 131 and 231 is referred to as "inter-microcomputer communication" as appropriate. As a communication method between the control units 131 and 231, any method such as a serial communication such as SPI or SENT, a CAN communication, a FlexRay communication, or the like may be used.

Figure 9:
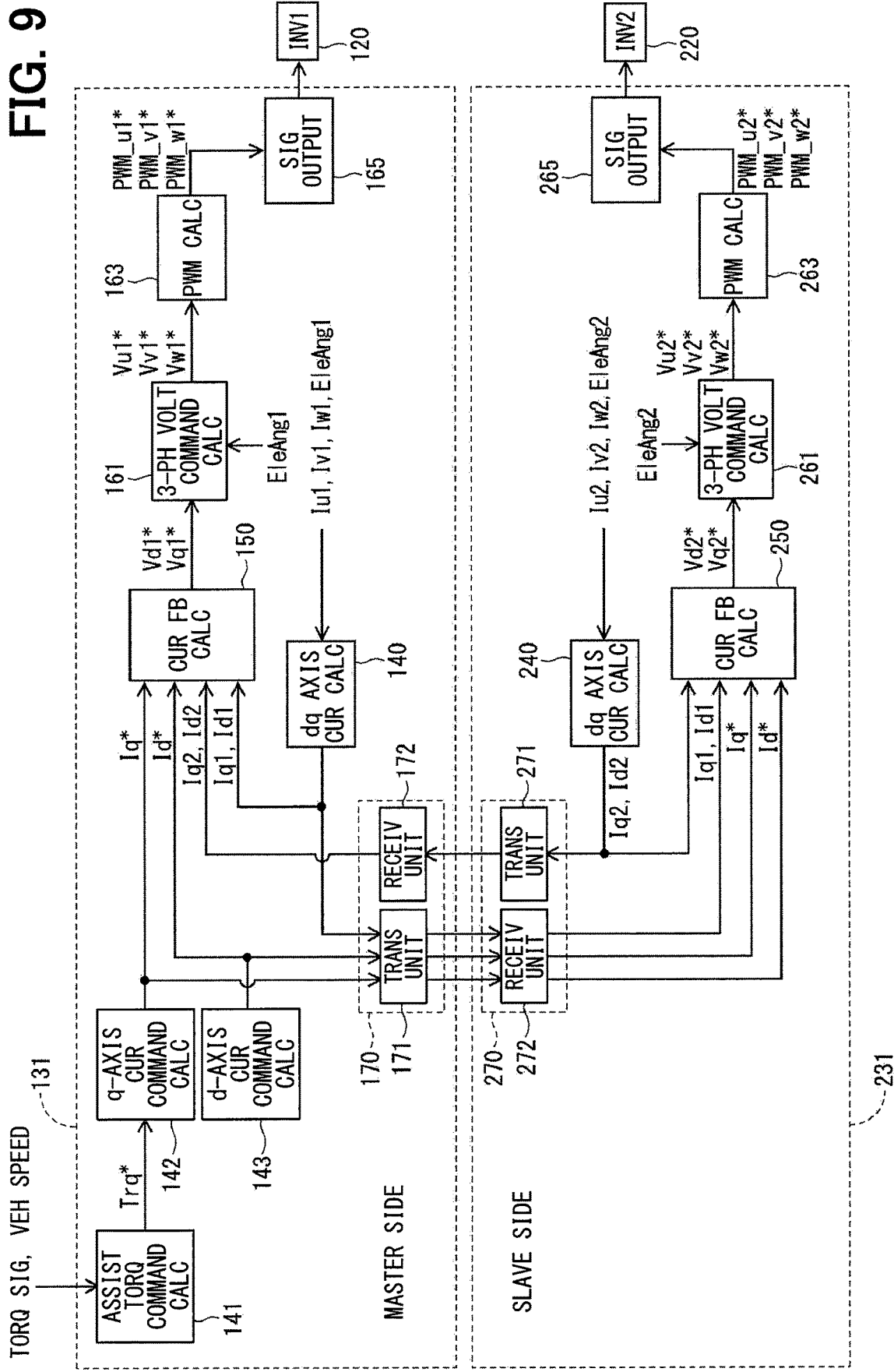
FIG. 9 is a block diagram showing a first control unit and a second control unit according to the first embodiment.

Details of the control units 131 and 231 are shown in FIG. 9. The control units 131 and 231 are configured mainly by microcomputers and include a CPU, a ROM, a RAM, an I/O, and a bus line for connecting those configurations. Each processing in the control units 131 and 231 may be software processing by executing a program stored in advance in a tangible memory device such as a ROM (readable non-transitory tangible recording medium) by a CPU, or may be hardware processing by a dedicated electronic circuit.

The first control unit 131, which is the master control unit, includes a dq-axis current calculation unit 140, an assist torque command calculation unit 141, a q-axis current command calculation unit 142, a d-axis current command calculation unit 143, a first current feedback calculation unit 150, a first three-phase voltage command calculation unit 161, a first PWM calculation unit 163, a first signal output unit 165, and a first communication unit 170. Hereinafter, the feedback is referred to as "FB" as appropriate.

The first dq-axis current calculation unit 140 converts the phase currents Iu1, Iv1, and Iw1 acquired from the first current sensor 125 into a dq-axis with the use of a first electric angle EleAng1, and calculates a first d-axis current detection value Id1 and a first q-axis current detection value Iq1.

The assist torque command calculation unit 141 calculates an assist torque command value Trq* as a torque command value based on a torque signal acquired from the torque sensor 94 through the torque sensor input circuit 118, a vehicle speed acquired from the vehicle communication network 195 through the vehicle communication circuit 117, and the like. The assist torque command value Trq* is output to the current command calculation unit 142. The assist torque command value Trq* is provided to a device other than the electric power steering device 8 through the vehicle communication circuit 117.

The q-axis current command calculation unit 142 calculates the q-axis current command value Iq* based on the assist torque command value Trq*. The q-axis current command value Iq* according to the present embodiment is a q-axis current value of a total of the two systems required for outputting the torque of the assist torque command value Trq*. The q-axis current value is obtained by multiplying the assist torque command value Trq* by a motor torque constant.

The d-axis current command calculation unit 143 calculates a d-axis current command value Id*. In the present embodiment, the q-axis current command value Iq* and the d-axis current command value Id* correspond to a "current sum command value".

The first current feedback calculation unit 150 performs a current feedback calculation based on the dq-axis current command values Id* and Iq* and the dq-axis current detection values Id1, Iq1, Id2, and Iq2, and calculates a first d-axis voltage command value Vd1* and a first q-axis voltage command value Vq1*. The details of the current feedback calculation will be described later. In the present embodiment, the first dq-axis voltage command values Vd1* and Vq1* are calculated by "sum and difference control" using the dq-axis current command values Id* and Iq* as the current sum command values. Under controlling the sum and the difference, an influence of a mutual inductance can be canceled.

The first three-phase voltage command calculation unit 161 performs an inverse dq transformation on the first dq-axis voltage command values Vd1* and Vq1* with the use of the first electric angle EleAng1, and calculates a first U-phase voltage command value Vu1*, a first V-phase voltage command value Vv1*, and a first W-phase voltage command value Vw1*.

The first PWM calculation unit 163 calculates first PWM signals PWM_u1* PWM_v1*, and PWM_w1* based on the three-phase voltage command values Vu1*, Vv1*, and Vw1*.

The first signal output unit 165 outputs the first PWM signals PWM_u1*, PWM_v1*, and PWM_w1* to the first inverter circuit 120.

The first communication unit 170 includes a first transmission unit 171 and a first receiving unit 172, and performs a communication with the second communication unit 270. The first transmission unit 171 transmits a value calculated by the first control unit 131 to the second control unit 231. In the present embodiment, the first transmission unit 171 transmits the d-axis current command value Id*, the q-axis current command value Iq*, the first d-axis current detection value Id1, and the first q-axis current detection value Iq1 to the second control unit 231. The first receiving unit 172 receives the value transmitted from the second control unit 231. In the present embodiment, the first receiving unit 172 receives the second d-axis current detection value Id2 and the second q-axis current detection value Iq2.

The current command value and the current detection value transmitted and received between the control units 131 and 231 may be a three-phase value instead of the value of the dq-axis, but the amount of data can be reduced by transmitting and receiving the value of the dq axis. Further, transmission and reception of the d-axis current detection values Id1 and Id2 may not be performed.

The second control unit 231, which is a slave control unit, includes a second dq-axis current calculation unit 240, a second current feedback calculation unit 250, a second three-phase voltage command value calculation unit 261, a second PWM calculation unit 263, a second signal output unit 265, and a second communication unit 270.

The second dq-axis current calculation unit 240 converts the phase currents Iu2, Iv2, and Iw2 acquired from the second current sensor 225 into a dq-axis with the use of the second electric angle EleAng2, and calculates the second d-axis current detection value Id2 and the second q-axis current detection value Iq2.

The second current feedback calculation unit 250 performs a current feedback calculation based on the dq-axis current command values Id* and Iq* and the dq-axis current detection values Id1, Iq1, Id2, and Iq2, and calculates a second d-axis voltage command value Vd2* and a second q-axis voltage command value Vq2*. In the present embodiment, the second dq-axis voltage command values Vd2* and Vq2* are calculated by "sum and difference control" in which the dq-axis current command values Id* and Iq* are the current sum command values.

The second current feedback calculation unit 250 performs a current feedback calculation with the use of the dq-axis current command values Id* and Iq* transmitted from the first control unit 131. In other words, the first control unit 131 and the second control unit 231 perform the current feedback calculation with the use of the same current command values Id* and Iq*.

The second three-phase voltage command calculation unit 261 converts the second dq-axis voltage command values Vd2* and Vq2* into an inverse dq with the use of the second electric angle EleAng2, and calculates a second U-phase voltage command value Vu2*, a second V-phase voltage command value Vv2*, and a second W-phase voltage command value Vw2*. The voltage command calculation units 161 and 261 calculate the voltage command values Vu1*, Vv1*, Vw1*, Vu2*, Vv2*, and Vw2* so that the energization phase difference becomes an electric angle 30 [deg].

The second PWM calculation unit 263 calculates the second PWM signals PWM_u2*, PWM_v2*, and PWM_w2* based on the three-phase voltage command values Vu2*, Vv2*, and Vw2*. The second signal output unit 265 outputs the second PWM signals PWM_u2*, PWM_v2*, and PWM_w2* to the second inverter circuit 220.

The second communication unit 270 includes a second transmission unit 271 and a second receiving unit 272. The second transmission unit 271 transmits a value calculated by the second control unit 231 to the first control unit 131. In the present embodiment, the second transmission unit 271 transmits the second d-axis current detection value Id2 and the second q-axis current detection value Iq2. The second receiving unit 272 receives the value transmitted from the first control unit 131. In the present embodiment, the second receiving unit 272 receives the d-axis current command value Id*, the q-axis current command value Iq*, the first d-axis current detection value Id1, and the first q-axis current detection value Iq1.

Figure 10:
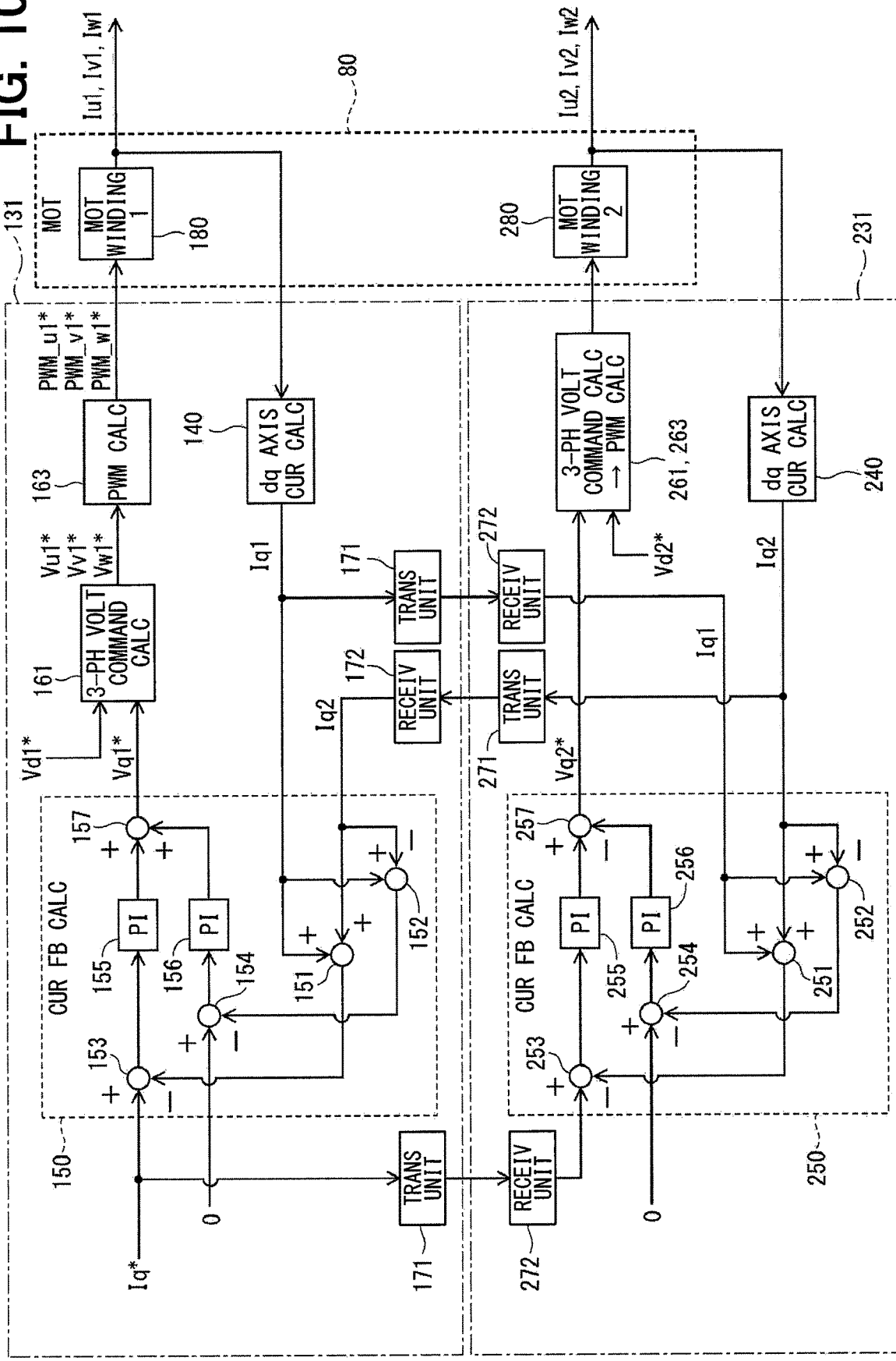
FIG. 10 is a block diagram illustrating a current feedback control according to the first embodiment.

Details of the current feedback calculation units 150 and 250 will be described with reference to FIG. 10. In FIG. 10, for the sake of convenience, the blocks of the transmission units 171 and 271 are described separately. The second three-phase voltage command calculation unit 261 and the second PWM calculation unit 263 are collectively described in one block, and the signal output units 165 and 265, the inverter circuits 120 and 220, and the like are omitted. In FIG. 10, the current feedback calculation involved in the q-axis will be mainly described. The current feedback calculation for the d-axis is the same as that for the q-axis, and therefore a description of that calculation will be omitted. The same applies to FIGS. 15 and 27 described later.

The first current feedback calculation unit 150 includes an adder 151, subtractors 152 to 154, controllers 155 and 156, and an adder 157. The adder 151 adds the first q-axis current detection value Iq1 and the second q-axis current detection value Iq2 to calculate a first q-axis current sum Iq_a1. The subtractor 152 subtracts the second q-axis current detection value Iq2 from the first q-axis current detection value Iq1 and calculates the first q-axis current difference Iq_d1.

The subtractor 153 subtracts the first q-axis current sum Iq_a1 from the q-axis current command value Iq* to calculate a first current sum deviation ΔIq_a1. The subtractor 154 subtracts the first q-axis current difference Iq_d1 from the current difference command value to calculate a first current difference deviation ΔIq_d1. In the present embodiment, the current difference command value is set to 0, and the control is performed so as to eliminate a current difference between the systems. The current difference command value may be set to a value other than 0, and a control may be performed so that a desired current difference occurs between the systems. The same applies to the current difference command value input to the subtractor 254.

The controller 155 calculates a basic q-axis voltage command value Vq_b1* by, for example, PI calculation or the like so that the current sum deviation ΔIq_a1 becomes 0. The controller 156 calculates a q-axis voltage difference command value Vq_d1* by, for example, a PI calculation or the like so that the current difference deviation ΔIq_d1 becomes 0. The adder 157 calculates the basic q-axis voltage command value Vq_b1* and the q-axis voltage difference command value Vq_di* and calculates the first q-axis voltage command value Vq1*.

The second current feedback calculation unit 250 includes an adder 251, subtractors 252 to 254, controllers 255 and 256, and a subtractor 257. The adder 251 adds the first q-axis current detection value Iq1 and the second q-axis current detection value Iq2 to calculate a q-axis current sum Iq_a2. The subtractor 252 subtracts the second q-axis current detection value Iq2 from the first q-axis current detection value Iq1 and calculates a q-axis current difference Iq_d2.

In the present embodiment, since the adders 151 and 251 use the same value, the q-axis current sums Iq_a1 and Iq_a2 have the same value. When different values of the control cycle are used as in the sixth embodiment which will be described later, the q-axis current sums Iq_a1 and Iq_a2 have different values. The same applies to the q-axis current differences Iq_d1 and Iq_d2.

The subtractor 253 subtracts the second q-axis current sum Iq_a2 from the q-axis current command value Iq* and calculates the second current sum deviation ΔIq_a2. The subtractor 254 subtracts the second q-axis current difference Iq_d2 from the current difference command value and calculates a second current difference deviation ΔIq_d2. The current difference command value input to the subtractor 254 may be a value transmitted from the first control unit 131, or may be a value internally set by the second control unit 231.

The controller 255 calculates a basic q-axis voltage command value Vq_b2* by, for example, PI calculation or the like so that the current sum deviation ΔIq_a2 becomes 0. The controller 256 calculates a q-axis voltage difference command value Vq_d2* by, for example, a PI calculation or the like so that the current difference deviation ΔIq_d2 becomes 0. The subtractor 257 subtracts the q-axis voltage difference command value Vq_d2* from the basic q-axis voltage command value Vq_b2* and calculates the second q-axis voltage command value Vq2*.

Figure 11:
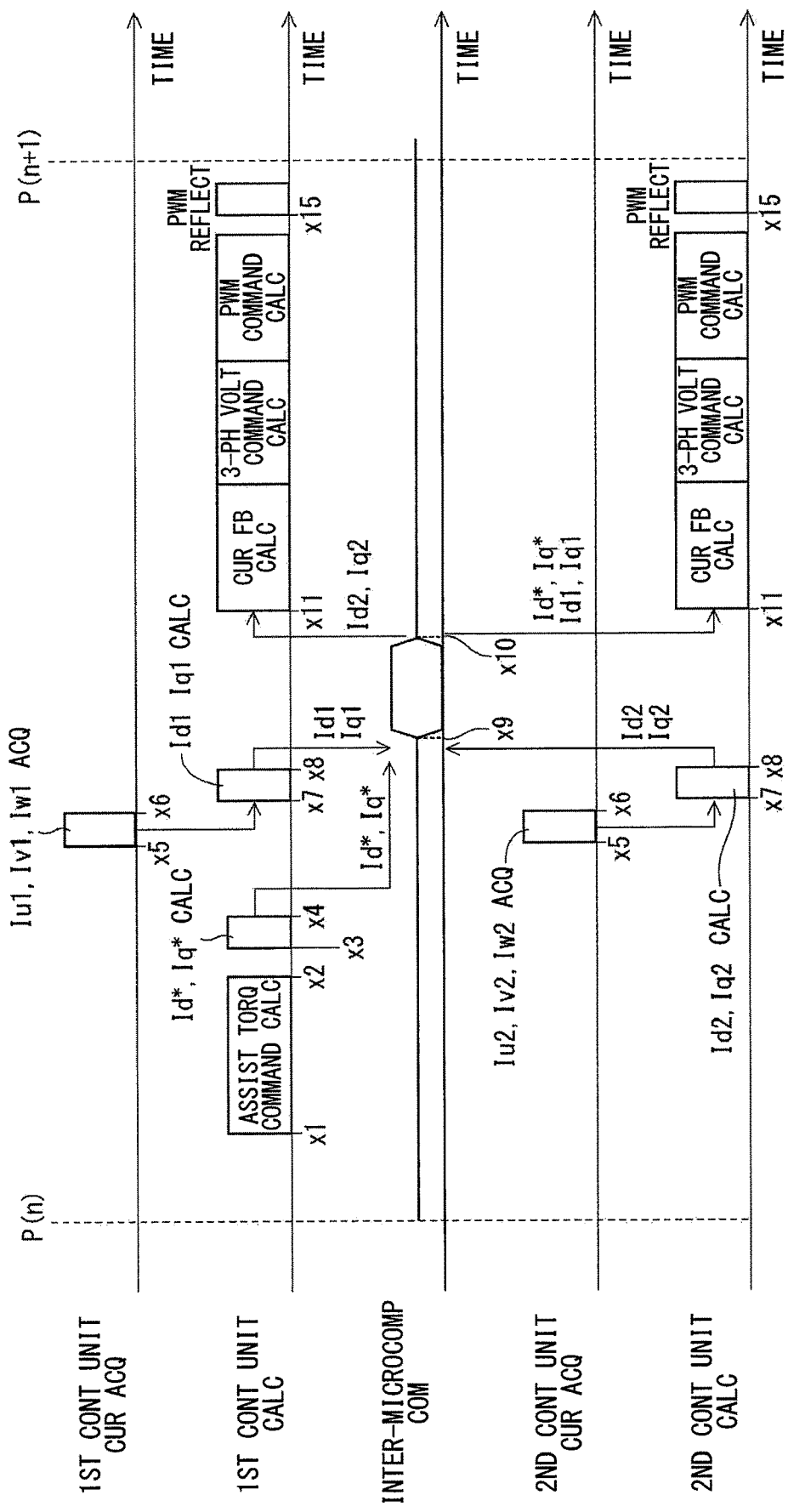
FIG. 11 is a time chart illustrating calculation processing according to the first embodiment.

The calculation processing of the present embodiment will be described with reference to a time chart of FIG. 11. FIG. 11 shows a current acquisition timing of the first control unit, an calculation processing in the first control unit, the inter-microcomputer communication, a current acquisition timing of the second control unit, and the calculation processing in the second control unit from the top, with the common time axis as the horizontal axis. In FIG. 10, the current control cycle is denoted as P(n), and the start timing is denoted as "P(n)". The next control cycle is set as P(n+1). In FIG. 11, the values involved in the current control transmitted and received by the inter-microcomputer communication are mainly described, and a description of the values and the like used in the host system will be omitted as appropriate. The same applies to a time chart according to the embodiment to be described later.

As shown in FIG. 11, in the first control unit 131, the assist torque command calculation unit 141 calculates the assist torque command value Trq* at a time x1 to a time x2, and the current command calculation units 142 and 143 calculate the current command values Id* and Iq* from at a time x3 to a time x4.

The first control unit 131 acquires the phase currents Iu1, Iv1, and Iw1 from the current sensor 125 at a time x5 to a time x6, and calculates the dq-axis current detection values Id1 and Iq1 at a time x7 to a time x8. Similarly, the second control unit 231 acquires the phase currents Iu2, Iv2, and Iw2 from the current sensor 125 at the time x5 to a time x6, and calculates the current detection values Id2 and Iq2 at time x7 to a time x8. In this example, although the current acquisition and the dq conversion timing in the control units 131 and 231 are simultaneous, a deviation within a range corresponding to a time x9 at which the inter-microcomputer communication starts is allowed. In addition, a deviation of the processing after the inter-microcomputer communication to the extent that the processing falls within a control cycle is also allowed. The same applies to the embodiments described later.

At the time x9 to a time x10, the inter-microcomputer communication is performed between the control units 131 and 231, and the dq-axis current detection values Id1, Iq1, Id2, and Iq2 are mutually transmitted and received between the controls units 131 and 231. The first control unit 131 transmits the dq-axis current command values Id* and Iq* to the second control unit 231. Then, each of the control units 131 and 231 performs the current FB calculation, the three-phase voltage command calculation, and the PWM command calculation from a time x11 after the end of the inter-microcomputer communication, and outputs and reflects the PWM signal to each of the inverter circuits 120 and 220 at a time x15 after the PWM command calculation.

In the present embodiment, the inter-microcomputer communication is performed before the start of the current feedback calculation, and information necessary for the current feedback calculation is exchanged. As a result, the control units 131 and 231 can perform the current feedback calculation with the use of the same value.

In the present embodiment, with the common use of the assist torque command value Trq* calculated by the first control unit 131, the information provided to the in-vehicle devices other than the electric power steering device 8 can be unified. Further, with the generation of the control signals with the use of the uniform assist torque command value Trq* in both the systems, the complication of the arbitration for the mismatch when the assist torque command values are calculated differently in the respective systems can be eliminated.

The current feedback calculation units 150 and 250 control the current sum and the current difference between the currents of the two systems. With the control of the current sum, a deviation between the assist torque command value Trq* and the output torque can be reduced, and a desired torque can be output from the motor 80. In addition, since the current difference between the systems is controlled to be 0, the heat generation in each system can be equalized. In addition, it is possible to reduce the complexity of control in the case where limiting processing such as current limitation is performed at the time of voltage fluctuation or heat generation, or in the case of backup control in which abnormality occurs in one system and driving is performed with the use of the other system.

As described above, the ECU 10 of the present embodiment controls the driving of the motor 80 including the motor windings 180 and 280 which are multiple winding sets, and includes the multiple inverter circuits 120 and 220 and the multiple control units 131 and 231.

The control units 131 and 231 have the signal output units 165 and 265 for outputting the control signals to the inverter circuits 120 and 220 provided correspondingly, and can communicate with each other. More specifically, the first control unit 131 outputs the first PWM signals PWM_u1*, PWM_v1*, and PWM_w1*, which are control signals, to the corresponding first inverter circuits 120. The second control unit 231 outputs the second PWM signals PWM_u2*, PWM_v2*, and PWM_w2*, which are control signals, to the corresponding second inverter circuit 220.

The first control unit 131, which is one master control unit, calculates the command values involved in the generation of the control signals in all of the control units 131 and 231, and transmits the command values to the second control unit 231, which is another control unit. The second control unit 231, which is a slave control unit, outputs a control signal based on a command value transmitted from the first control unit 131.

In the present embodiment, with the transmission of the command value calculated by one master control unit to the slave control unit, the first system L1 and the second system L2 can be appropriately coordinately operated. In this example, "coordination" means controlling the energization of the master system and the slave system based on the "command value" calculated by the master control unit. In particular, it is desirable to coordinate the respective systems by controlling the energization of the respective systems with the use of the detection values of the respective systems in common.

The first control unit 131 transmits the dq-axis current command values Id* and Iq* as command values to the second control unit 231. As a result, the systems L1 and L2 can be coordinated with each other to appropriately perform the current feedback control.

The first control unit 131 transmits the first dq-axis current detection values Id1 and Iq1, which are the current detection values of the first system L1, to the second control unit 231. The second control unit 231 transmits the second dq-axis current detection values Id2 and Iq2, which are the current detection values of the second system L2, to the first control unit 131. In the present embodiment, the first dq-axis current detection values Id1 and Iq1 correspond to a "master current detection value" and the second dq-axis current detection values Id2 and Iq2 correspond to a "slave current detection value". The master current detection value and the slave current detection value may be, for example, three-phase current detection values, and are not limited to the dq-axis current.

In each of the first control unit 131 and the second control unit 231, a current sum of the first system L1, which is the master system, and the second system L2, which is the slave system, becomes the current command values Id* and Id*, and a current difference becomes the current difference command value under the control.

With the control of the current sum, the assist torque can be output from the motor 80 in accordance with the assist torque command value Trq*. Further, with the control of the current difference, the current difference between the systems can be appropriately controlled. In particular, the current difference command value is set to 0 to be able to eliminate the current difference between the systems, and therefore the heat generation of each system can be equalized. In addition, the complexity of control can be reduced at the time of current limitation due to a fluctuation of the power supply voltage or the heat generation, or at the time of backup control due to occurrence of a failure or transition to single-system driving.

The first control unit 131 and the second control unit 231 perform transmission and reception of information necessary for the current feedback control in a period after the calculation of the current detection values Id1, Iq1, Id2, and Iq2 until the current feedback control starts. Specifically, the first dq-axis current detection values Id1 and Iq1 and the second dq-axis current detection values Id2 and Iq2 are mutually transmitted and received, and the dq-axis current command values Id* and Iq* are transmitted from the first control unit 131 to the second control unit 231.

As a result, the control units 131 and 231 can perform a current feedback control with the use of the current command values Id* and Iq* and the current detection values Id1, Iq1, Id2, and Iq2 in the current control cycle.

The ECU 10 according to the present embodiment is applied to an electric power steering device 8. The electric power steering device 8 includes an ECU 10, a motor 80, and a reduction gear 89. The motor 80 outputs an assist torque for assisting the driver to steer the steering wheel 91. The reduction gear 89 transmits the driving force of the motor 80 to the steering shaft 92. In the present embodiment, since the two systems are operated in coordination based on the assist torque command value Trq* calculated by the first control unit 131 which is the master control unit, the assist torque can be appropriately output.

Second Embodiment

Figure 12:
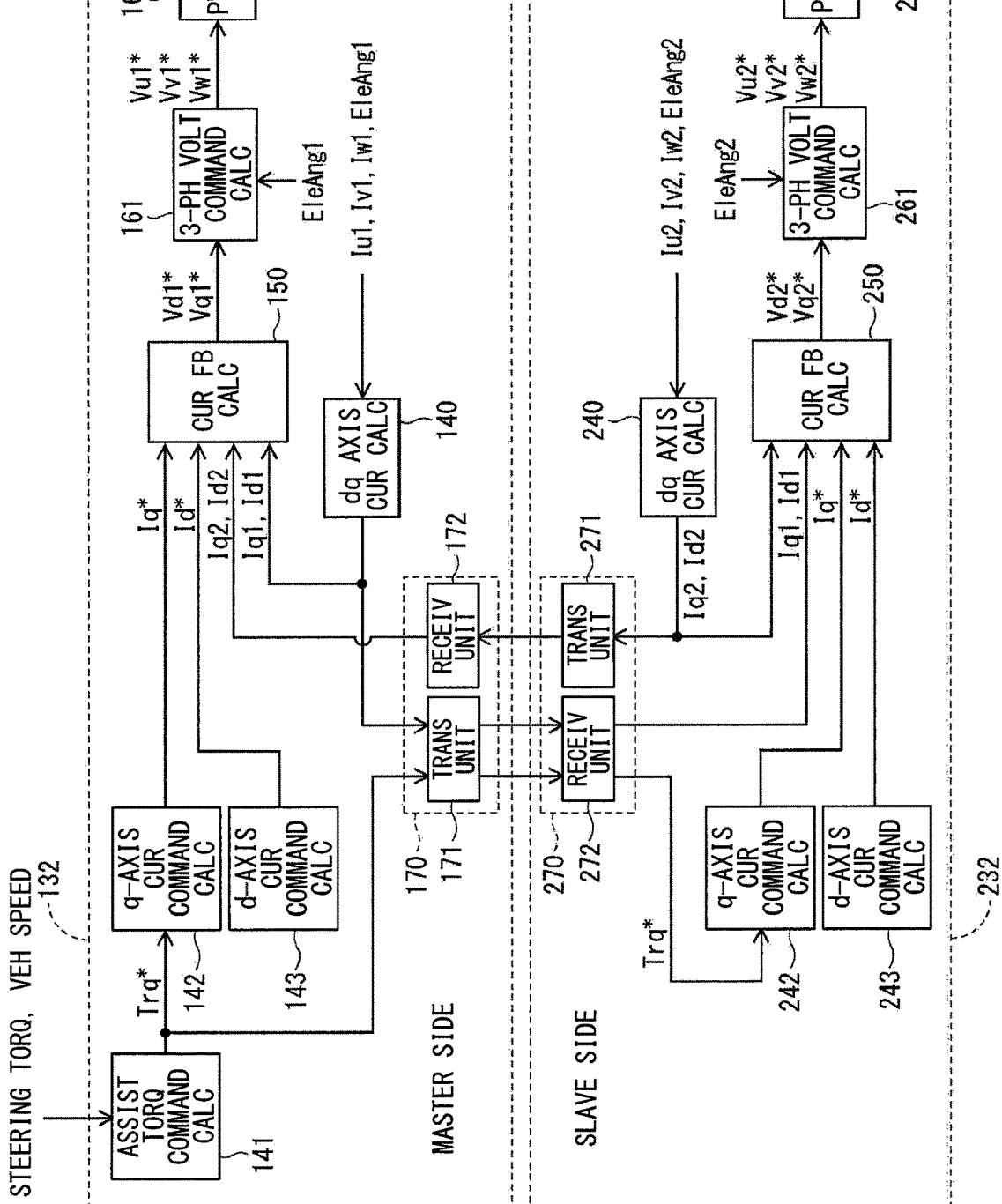
FIG. 12 is a block diagram showing a first control unit and a second control unit according to a second embodiment.
Figure 13:
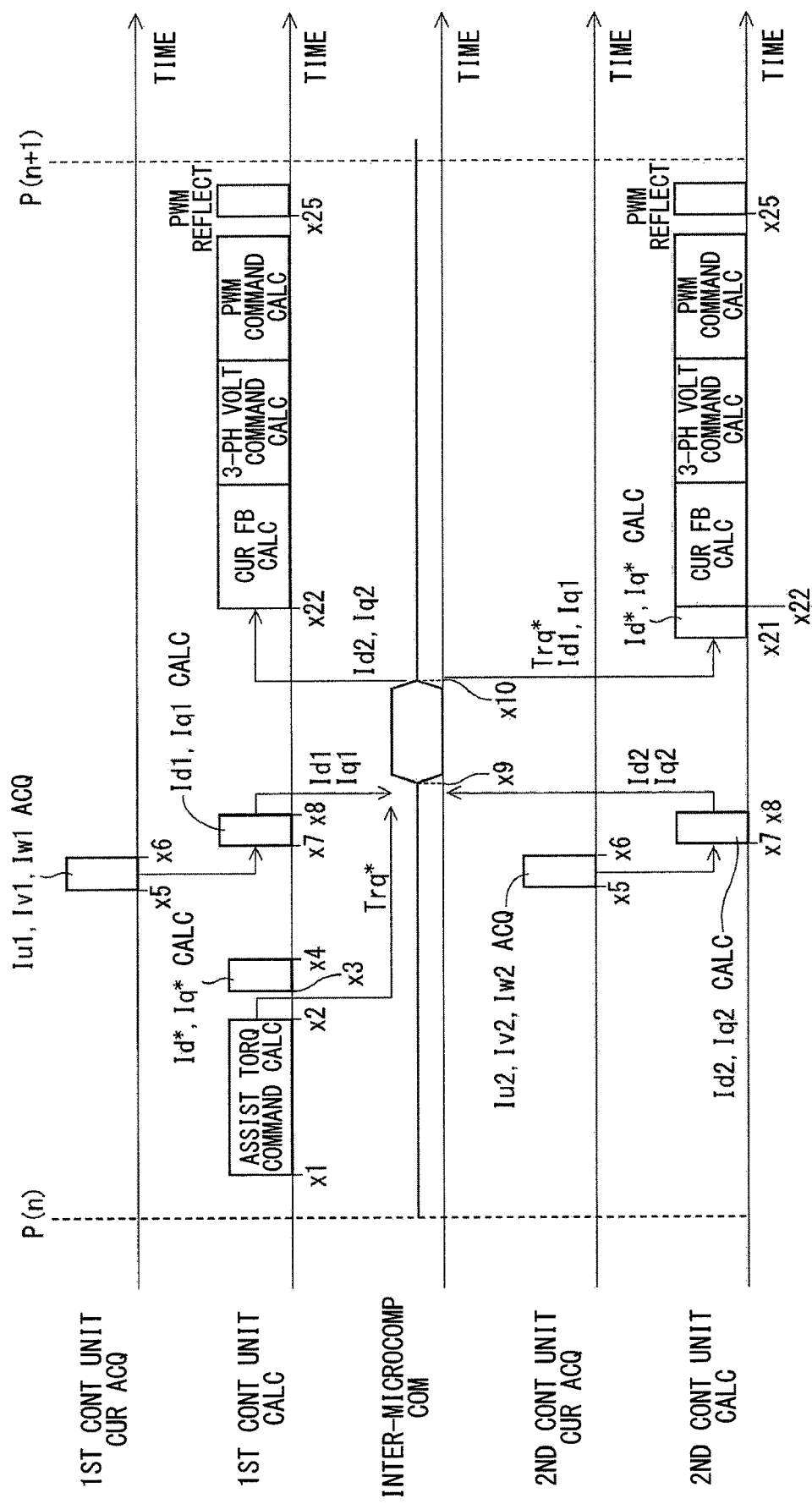
FIG. 13 is a time chart illustrating calculation processing according to the second embodiment.

A second embodiment is shown in FIGS. 12 and 13. In the second to fifth embodiments and the seventh embodiment, since the control units are different from each other, a description will be focused on the different control unit. As shown in FIG. 12, as in the first embodiment, a first control unit 132, which is a master control unit, includes a dq-axis current calculation unit 140, an assist torque command calculation unit 141, a q-axis current command calculation unit 142, a d-axis current command calculation unit 143, a first current feedback calculation unit 150, a first three-phase voltage command calculation unit 161, a first PWM calculation unit 163, a first signal output unit 165, and a first communication unit 170.

A second control unit 232, which is a slave control unit, includes a q-axis current command calculation unit 242 and a d-axis current command calculation unit 243 in addition to a second dq-axis current calculation unit 240, a second current feedback calculation unit 250, a second three-phase voltage command value calculation unit 261, a second PWM calculation unit 263, a second signal output unit 265, and a second communication unit 270.

In the first embodiment, current command values Id* and Iq* are transmitted from a first control unit 131 to a second control unit 231 as "command values". In the present embodiment, an assist torque command value Trq* is transmitted from a first control unit 132 to a second control unit 232 as the "command value" instead of the current command values Id* and Iq*. In other words, in the present embodiment, the first communication unit 170 transmits the torque command value Trq* and current detection values Id1 and Iq1 to the second communication unit 270, and the second communication unit 270 transmits current detection values Id2 and Iq2 to the first communication unit 170.

The q-axis current command calculation unit 242 calculates a q-axis current command value Iq* based on the assist torque command value Trq* transmitted from the first control unit 132. The d-axis current command calculation unit 243 calculates a d-axis current command value Id*. Then, the second current feedback calculation unit 250 performs a current feedback calculation based on the current command values Id* and Iq* calculated by the current command calculation units 242 and 243 and the current detection values Id1, Iq1, Id2, and Iq2, and calculates a second d-axis voltage command value Vd2* and a second q-axis voltage command value Vq2*.

The calculation processing of the present embodiment will be described with reference to a time chart of FIG. 13. The processing from a time x1 to a time x8 is the same as that in FIG. 11. At a time x9 to a time x10, an inter-microcomputer communication is performed between the control units 132 and 232, and the current detection values Id1, Iq1, Id2, and Iq2 are mutually transmitted and received between the control units 132 and 232. The first control unit 132 transmits the assist torque command value Trq* to the second control unit 232.

A time x21 to a time x22 after an end of the inter-microcomputer communication, in the second control unit 232, the current command calculation units 242 and 243 calculate the current command values Id* and Iq* based on the assist torque command value Trq* transmitted from the first control unit 132. After the time x22, similar to the time x11 in FIG. 11, the current feedback control and the subsequent processes are performed, and at a time x25, the PWM signal is output to and reflected by the inverter circuits 120 and 220.

In the present embodiment, since the assist torque command values Trq* calculated by the first control unit 132 are shared by the control units 132 and 232, the same effects as those of the above embodiment can be achieved. Further, as compared with the case where the current command values Id* and Iq* are transmitted and received, the amount of data in the inter-microcomputer communication can be reduced.

In the present embodiment, the first control unit 132 transmits the assist torque command value Trq*, which is the torque command value, to the second control unit 232 as the command value. Even in this case, the same effects as those of the above embodiment can be obtained.

Third Embodiment

Figure 14:
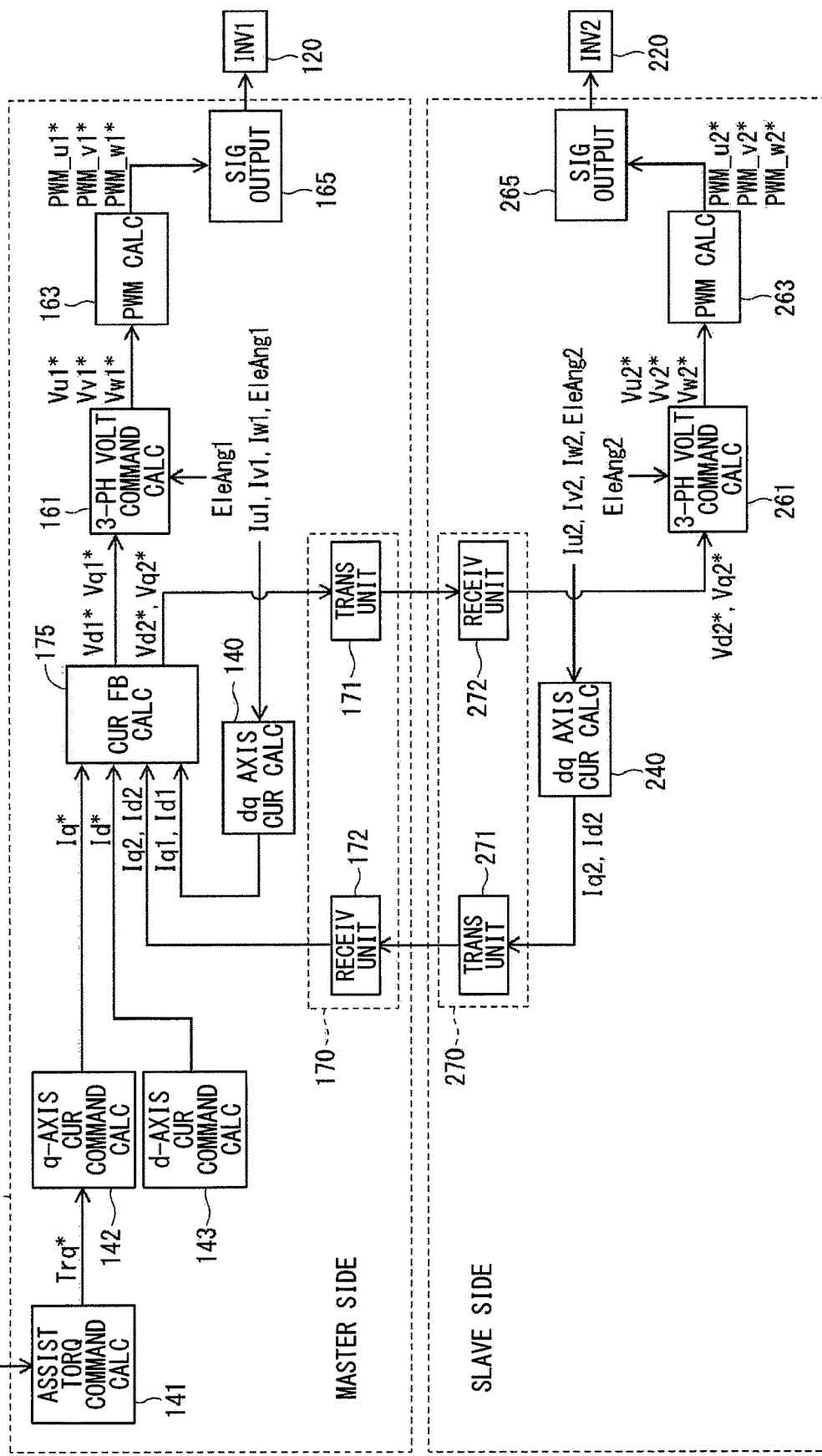
FIG. 14 is a block diagram showing a first control unit and a second control unit according to a third embodiment.
Figure 15:
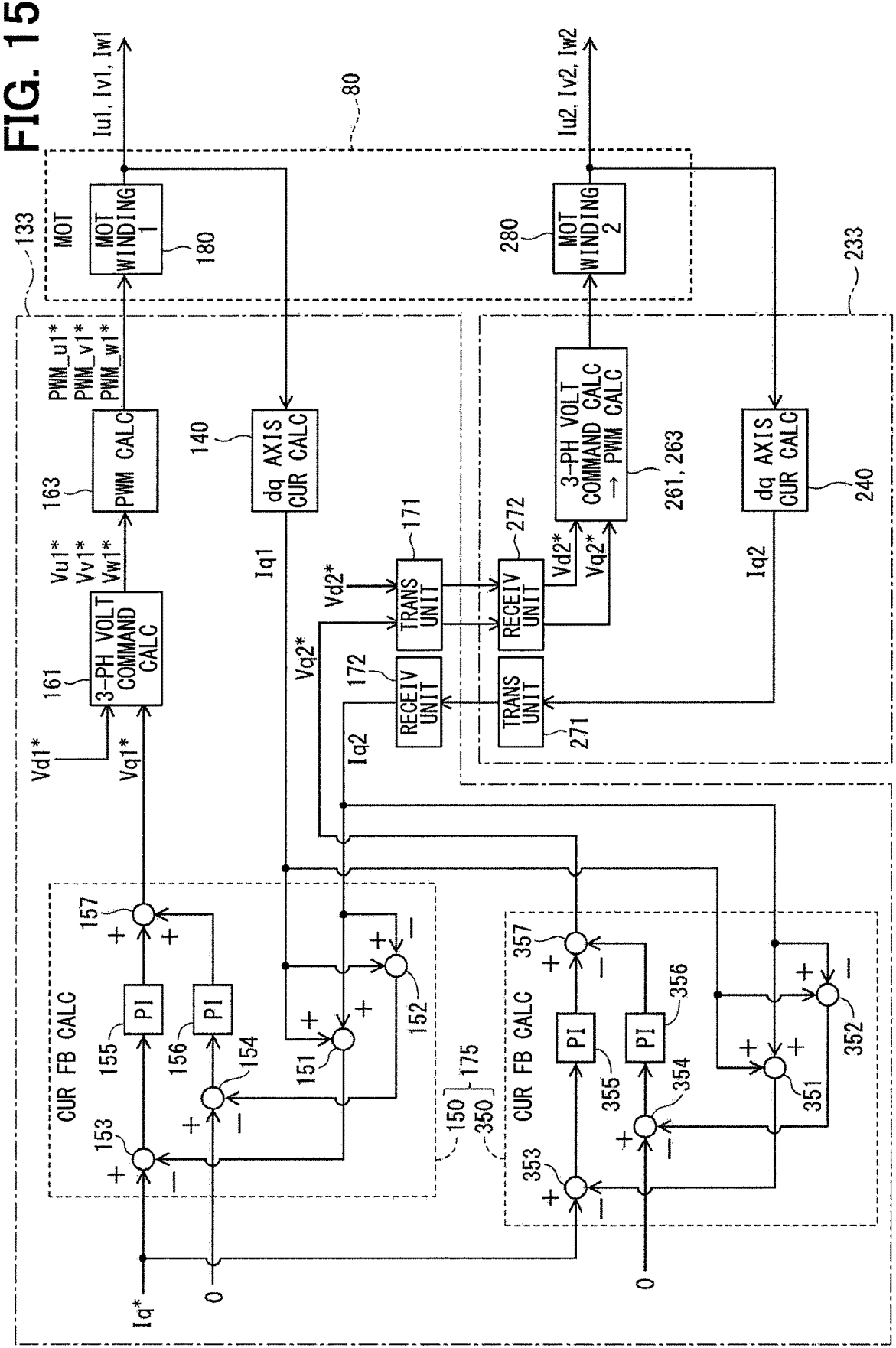
FIG. 15 is a block diagram illustrating a current feedback control according to the third embodiment.
Figure 16:
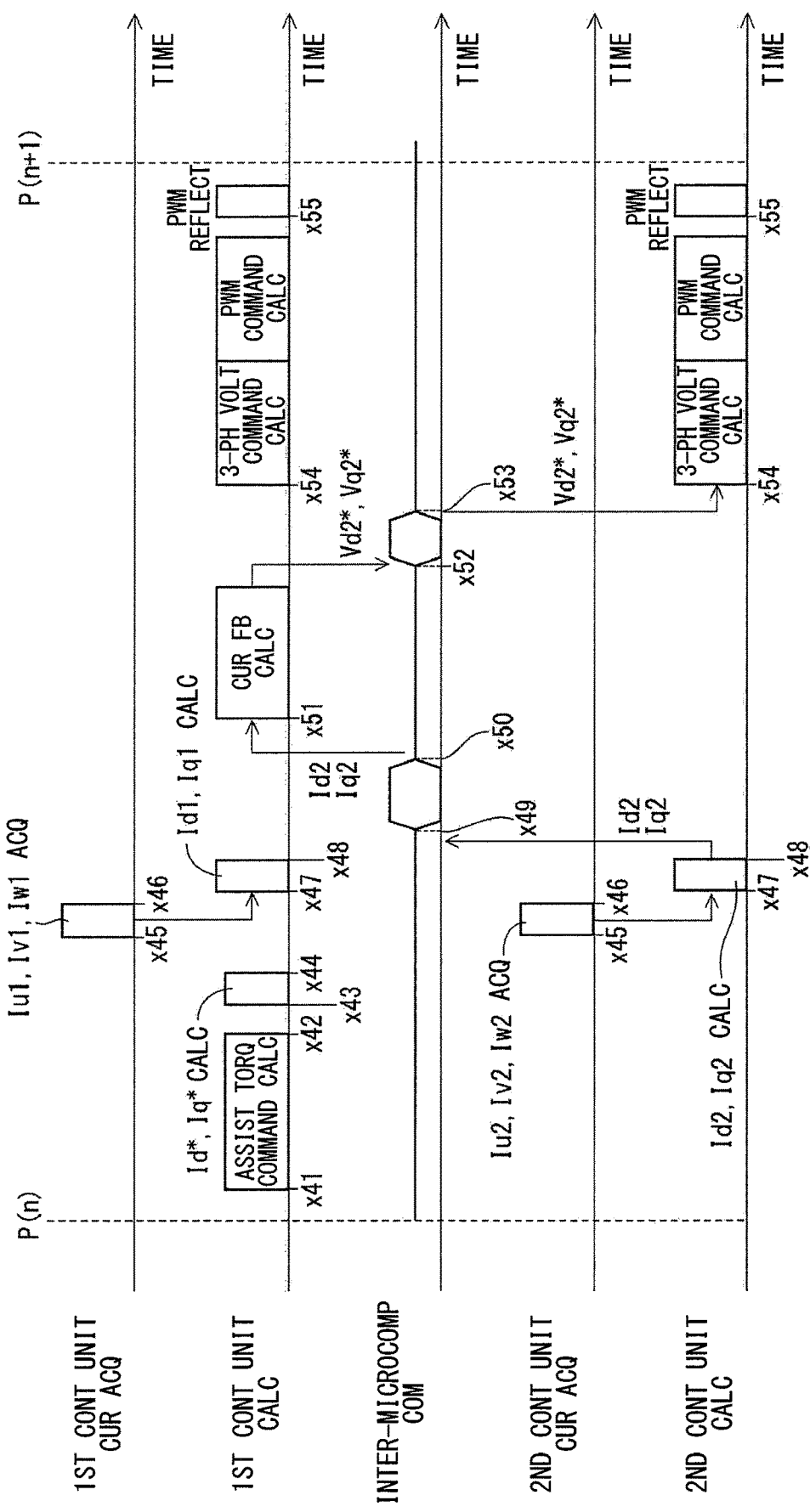
FIG. 16 is a time chart illustrating calculation processing according to the third embodiment.

A third embodiment is shown in FIGS. 14 to 16. As shown in FIG. 14, a first control unit 133 which is a master control unit includes a dq-axis current calculation unit 140, an assist torque command calculation unit 141, a q-axis current command calculation unit 142, a d-axis current command calculation unit 143, a current feedback calculation unit 175, a first three-phase voltage command calculation unit 161, a first PWM calculation unit 163, a first signal output unit 165, and a first communication unit 170.

A current feedback calculation unit 175 performs a current feedback calculation based on dq-axis current command values Id* and Iq* and dq-axis current detection values Id1, Iq1, Id2, and Iq2, and calculates dq-axis voltage command values Vdi*, Vq1*, Vd2*, and Vq2*.

A second control unit 233, which is a slave control unit, includes a dq-axis current calculation unit 240, a second three-phase voltage command value calculation unit 261, a second PWM calculation unit 263, a second signal output unit 265, and a second communication unit 270.

As shown in FIG. 15, the current feedback calculation unit 175 of the first control unit 133 includes a first current feedback calculation unit 150 and a second current feedback calculation unit 350. The process in the first current feedback calculation unit 150 is the same as that in the first embodiment, and the first dq-axis voltage command values Vdi* and Vq1* are calculated.

The second current feedback calculation unit 350 calculates the second dq-axis voltage command values Vd2* (and Vq2*, and includes an adder 351, subtracters 352 to 354, controllers 355 and 356, and a subtractor 357. The second current feedback calculation unit 350 is the same as the second current feedback calculation unit 250 of the second control unit 231 in the above embodiment, and the processes in the adder 351, the subtractors 352 to 353, the controllers 355 and 356, and the subtractor 357 are the same as the processes in the adder 251, the subtractors 252 to 254, the controllers 255 and 256, and the subtractor 257 corresponding to the last two digits. In the present embodiment, since the second current feedback calculation unit 350 is provided in the first control unit 133, the first dq-axis current detection values Id1 and Iq1 are internally acquired values. The second dq-axis current detection values Id2 and Iq2 are values transmitted from the second control unit 233 in the inter-microcomputer communication.

The second dq-axis voltage command values Vd2* and Vq2* calculated by the current feedback calculation unit 175 of the first control unit 133 are transmitted from the transmission unit 171 to the second control unit 233. In other words, in the present embodiment, the second dq-axis voltage command values Vd2* and Vq2* are transmitted as "command values" from the first control unit 133 to the second control unit 233. The second three-phase voltage command calculation unit 261 converts the second dq-axis voltage command values Vd2* and Vq2* transmitted from the first control unit 133 into inverse dq, and calculates the second three-phase voltage command values Vu2*, Vv2*, and Vw2*.

In the present embodiment, the first communication unit 170 transmits the second dq-axis voltage command values Vd2* and Vq2* to the second control unit 233, and the second communication unit 270 transmits the second dq-axis current detection values Id2 and Iq2 to the first control unit 133.

In the present embodiment, since the current FB calculation is performed by the first control unit 133, there is no need to transmit the first dq-axis current detection values Id1 and Iq1 from the first control unit 133 to the second control unit 233. Therefore, the transmission of the first dq-axis current detection values Id1 and Iq1 from the first control unit 133 to the second control unit 233 can be omitted. The same applies to the fourth embodiment and the fifth embodiment which will be described later.

The calculation processing of the present embodiment will be described with reference to a time chart of FIG. 16. The processing from a time x41 to a time x48 is the same as the processing from the time x1 to the time x8 in FIG. 11. At times x49 to x50, a first inter-microcomputer communication in the control cycle is performed between the control units 133 and 233. In the present embodiment, the second dq-axis current detection values Id2 and Iq2 are transmitted from the second control unit 233 to the first control unit 133 in the first inter-microcomputer communication.

From a time x51 after an end of the first inter-microcomputer communication, the first control unit 133 performs the current FB calculation. In addition, the second inter-microcomputer communication is performed at times x52 to x53 after the end of the current FB calculation. In the second inter-microcomputer communication, the second dq-axis voltage command values Vd2* and Vq2* are transmitted from the first control unit 133 to the second control unit 233.

After a time x 54 after the second inter-microcomputer communication, the control units 133 and 233 perform the three-phase voltage command calculation and the PWM command calculation, and output and reflect the PWM signal to the inverter circuits 120 and 220 at a time x55 after the PWM command calculation.

In the present embodiment, the first control unit 133 calculates the first dq-axis voltage command values Vdi* and Vq2* involved in the first system L1, and the second dq-axis voltage command values Vd2* and Vq2* involved in the second system L2. The first control unit 133 transmits the second dq-axis voltage command values Vd2* and Vq2* as command values to the second control unit 233. In the present embodiment, the second dq-axis voltage command values Vd2* and Vq2* correspond to "slave voltage command values". As a result, the current feedback calculation in the second control unit 233 can be omitted.

The second control unit 233 transmits the second dq-axis current detection values Id2 and Iq2, which are the slave current detection values, to the first control unit 133. The first control unit 133 calculates the first dq-axis voltage command values Vdi* and Vq1*, which are the voltage command values of the first system L1, and the second dq-axis voltage command values Vd2* and Vq2*, which are the voltage command values of the second system L2, based on the first dq-axis current detection values Id1 and Iq1, which are the master current detection values, and the second dq-axis current detection values Id2 and Iq2, so that the current sum of the first system L1 and the second system L2 becomes the current command values Id* and Iq*, and the current difference becomes the current difference command value.

With the control of the current sum, the assist torque can be output from the motor 80 in accordance with the assist torque command value Trq*. In addition, the current difference between the systems can be controlled to a predetermined value. In particular, the current difference command value is set to 0 to be able to eliminate the current difference between the systems, and therefore the heat generation of each system can be equalized. In addition, the complexity of control can be reduced at the time of current limitation due to a fluctuation of the power supply voltage or the heat generation, or at the time of backup control due to occurrence of a failure or transition to single-system driving. In addition, the same effects as those of the above embodiment can be obtained.

Fourth Embodiment

Figure 17:
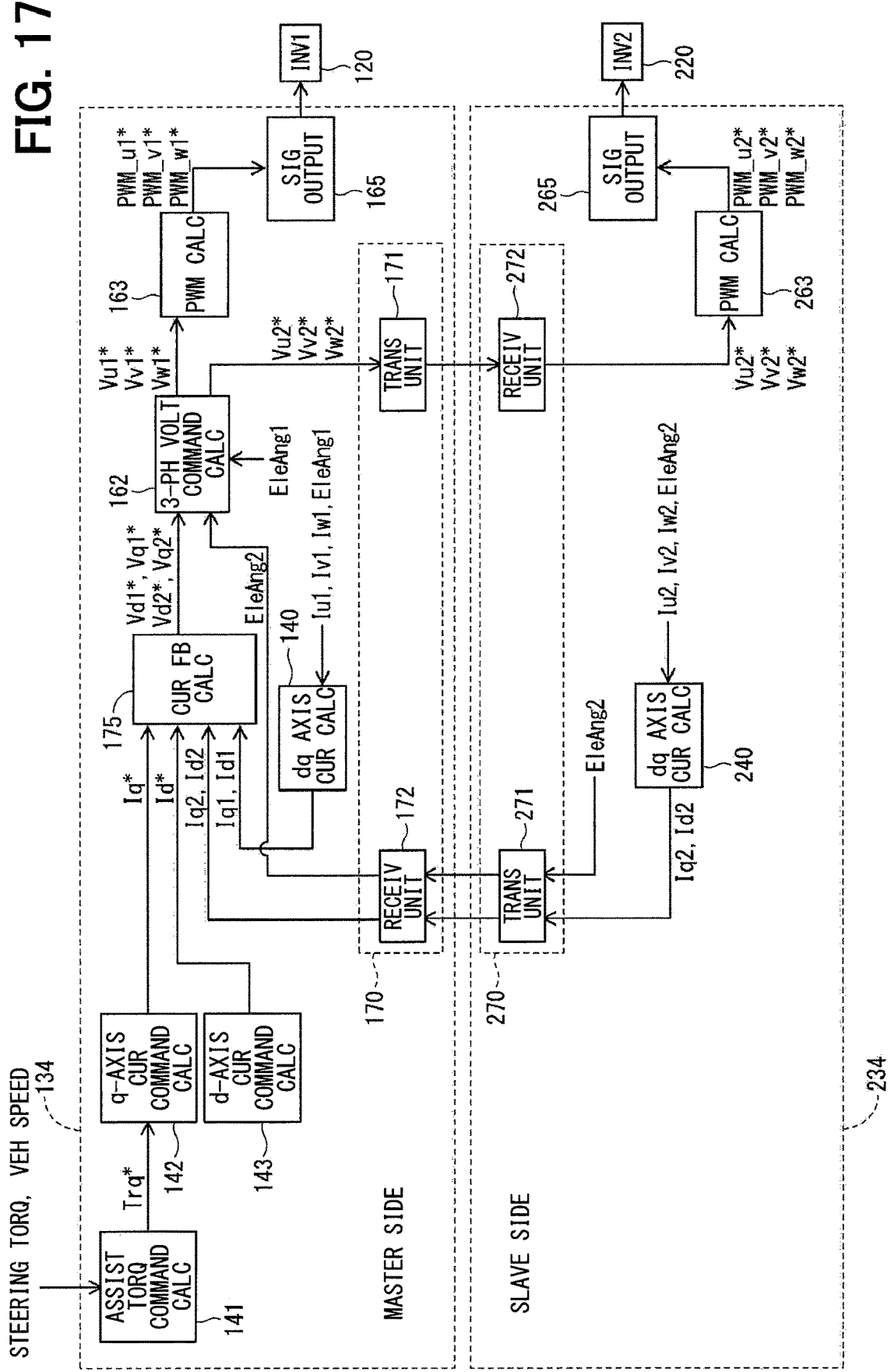
FIG. 17 is a block diagram showing a first control unit and a second control unit according to a fourth embodiment.
Figure 18:
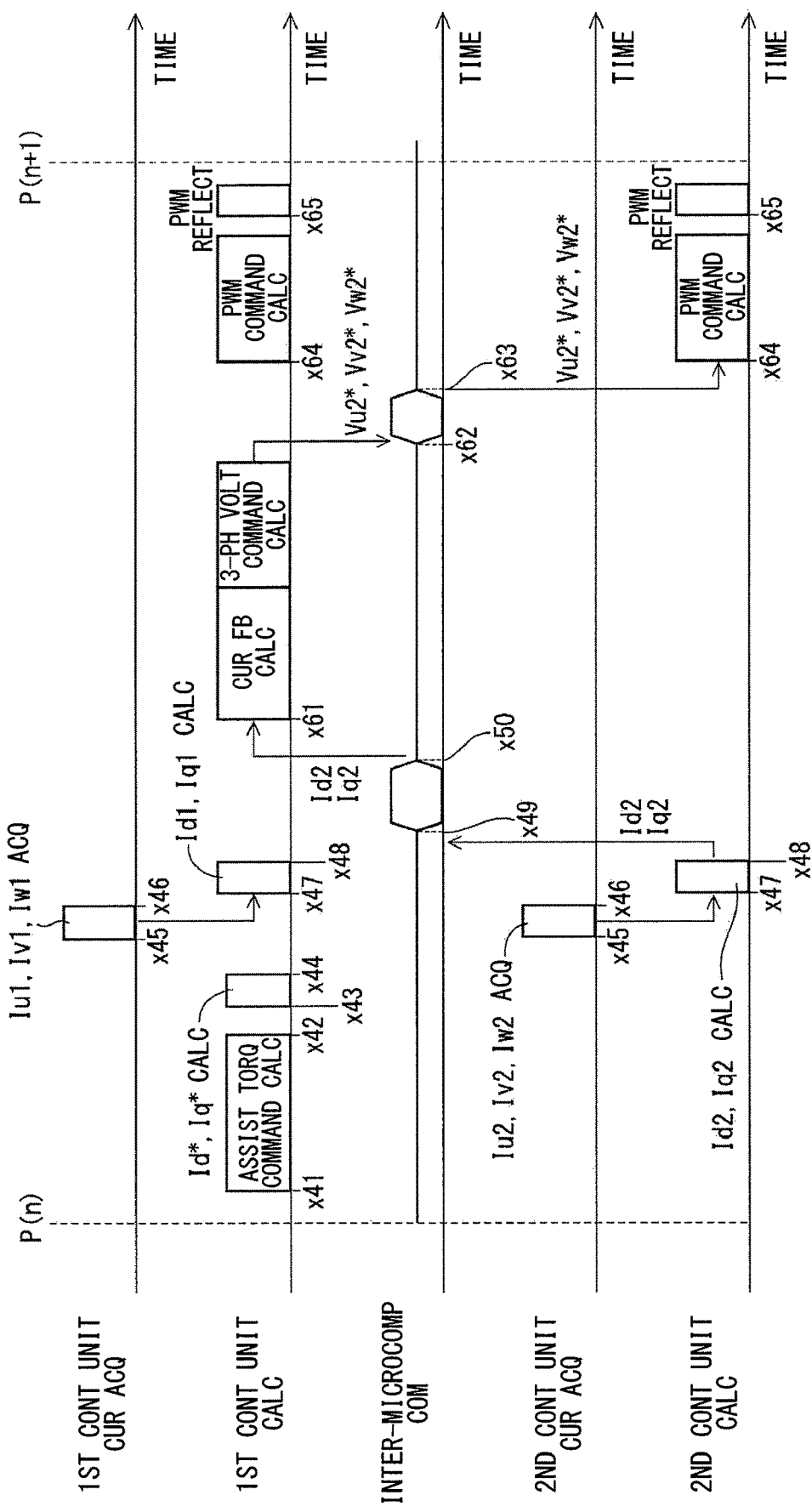
FIG. 18 is a time chart illustrating calculation processing according to the fourth embodiment.

A fourth embodiment is shown in FIGS. 17 and 18. As shown in FIG. 17, a first control unit 134, which is a master control unit, includes a dq-axis current calculation unit 140, an assist torque command calculation unit 141, a q-axis current command calculation unit 142, a d-axis current command calculation unit 143, a current feedback calculation unit 175, a three-phase voltage command calculation unit 162, a first PWM calculation unit 163, a first signal output unit 165, and a first communication unit 170. The dq-axis voltage command values Vdi*, Vq1*, Vd2*, and Vq2* calculated by a current feedback calculation unit 175 are output to the three-phase voltage command calculation unit 162.

The three-phase voltage command calculation unit 162 converts the first dq-axis voltage command values Vdi* and Vq1* into an inverse dq with the use of the first electric angle EleAng1, and calculates a first U-phase voltage command value Vu1*, a first V-phase voltage command value Vv1*, and a first W-phase voltage command value Vw1*. The first three-phase voltage command values Vu1*, Vv1*, and Vw1* are output to the first PWM calculation unit 163 and used for calculation of first PWM signals PWM_u1*, PWM_v1*, and PWM_w1*.

The three-phase voltage command calculation unit 162 converts the second dq-axis voltage command values Vd2* and Vq2* into an inverse dq with the use of the second electric angle EleAng2, and calculates a second U-phase voltage command value Vu2*, a second V-phase voltage command value Vv2*, and a second W-phase voltage command value Vw2*. In the present embodiment, the second electric angle EleAng2 transmitted from the second control unit 234 is used for inverse dq conversion, but the second electric angle EleAng2 may not be acquired from the second control unit 234, and the second electric angle EleAng2 may be obtained from the first electric angle EleAng1 in the first control unit 134 and used for inverse dq conversion. The same applies to the fifth embodiment.

The second three-phase voltage command values Vu2*, Vv2*, and Vw2* are transmitted from the transmission unit 171 to the second control unit 234. In other words, in the present embodiment, the second three-phase voltage command values Vu2*, Vv2*, and Vw2* are transmitted from the first control unit 134 to the second control unit 234 as "command values".

The second control unit 234, which is a slave control unit, includes a dq-axis current calculation unit 240, a second PWM calculation unit 263, a second signal output unit 265, and a second communication unit 270. The second PWM calculation unit 263 calculates second PWM signals PWM_u2*, PWM_v2*, and PWM_w2* with the use of the three-phase voltage command values Vu2*, Vv2*, and Vw2* transmitted from the first control unit 134.

In the present embodiment, the first communication unit 170 transmits the second three-phase voltage command values Vu2*, Vv2*, and Vw2* to the second control unit 234, and the second communication unit 270 transmits the second dq-axis current detection values Id2, Iq2, and the second electric angle EleAng2 to the first control unit 134.

The calculation processing of the present embodiment will be described with reference to a time chart of FIG. 18. In the present embodiment, as in the third embodiment, two inter-microcomputer communications are performed in a single control cycle. The processing up to the first inter-microcomputer communication is the same as that of the third embodiment. In the present embodiment, in the first inter-microcomputer communication, the dq-axis current detection values Id2, Iq2, and the second electric angle EleAng2 are transmitted from the second control unit 234 to the first control unit 134. The same applies to the fifth embodiment.

From a time x61 after an end of the first inter-microcomputer communication, a current FB calculation is performed by the first control unit 134, and then a three-phase voltage command calculation is performed. In addition, a second inter-microcomputer communication is performed at times x62 to x63 after the completion of the three-phase voltage command calculation. In the second inter-microcomputer communication, the second three-phase voltage command values Vu2*, Vv2*, and Vw2* are transmitted from the first control unit 134 to the second control unit 234.

After a time x64 after the second inter-microcomputer communication, the control units 134 and 234 execute the PWM command calculation and output and reflect the PWM signal to each inverter circuitry 120 and 220 at a time x65 after the PWM command calculation.

The present embodiment is substantially the same as the third embodiment except that the three-phase voltage command values Vu2*, Vv2*, and Vw2* are transmitted from the first control unit 134 to the second control unit 234 instead of the dq-axis voltage command values Vd2* and Vq2*. In the present embodiment, the three-phase voltage command values Vu2*, Vv2*, and Vw2* correspond to "slave voltage command values". In addition, the same effects as those of the above embodiment can be obtained.

Fifth Embodiment

Figure 19:
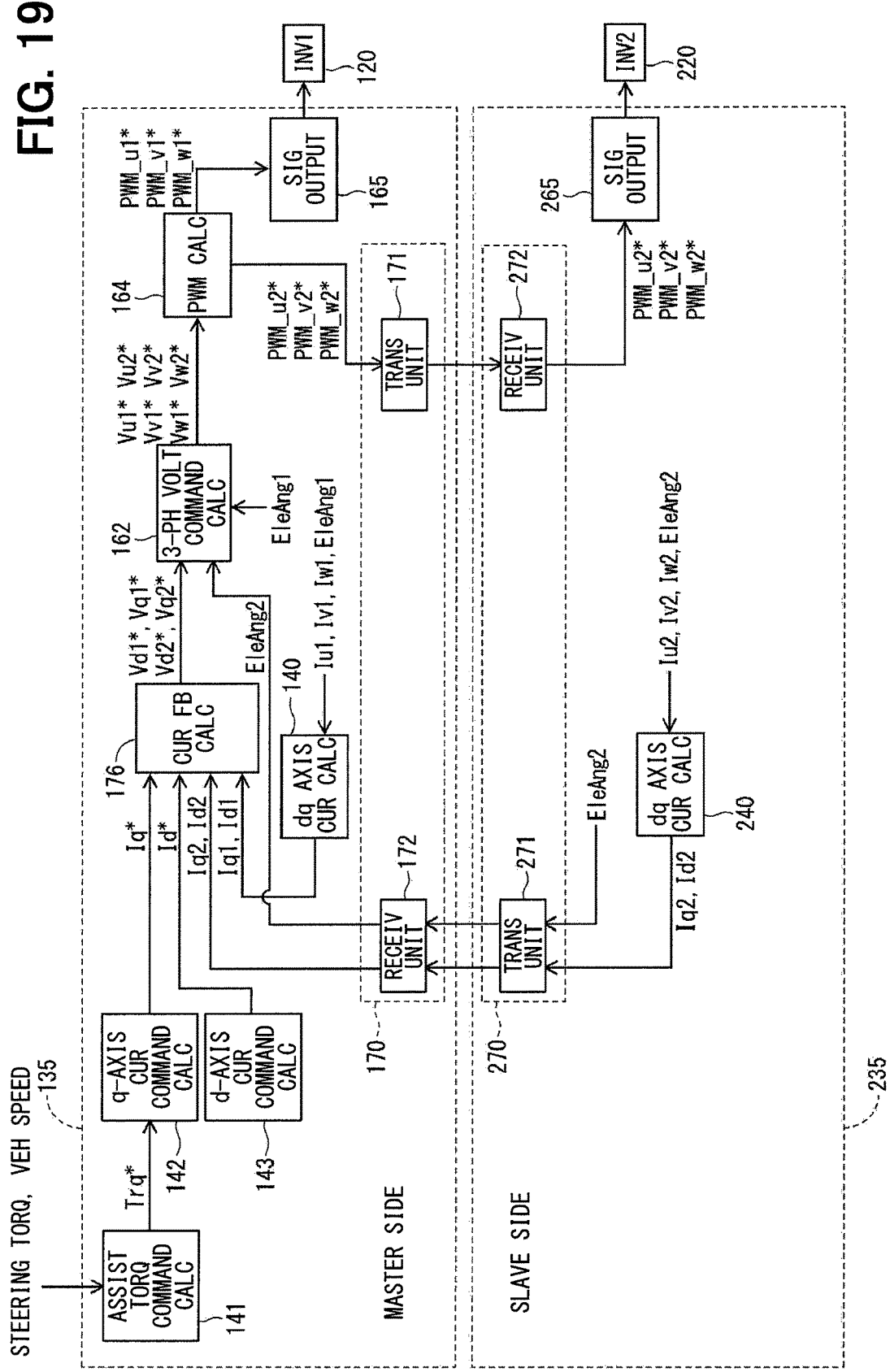
FIG. 19 is a block diagram showing a first control unit and a second control unit according to a fifth embodiment.
Figure 20:
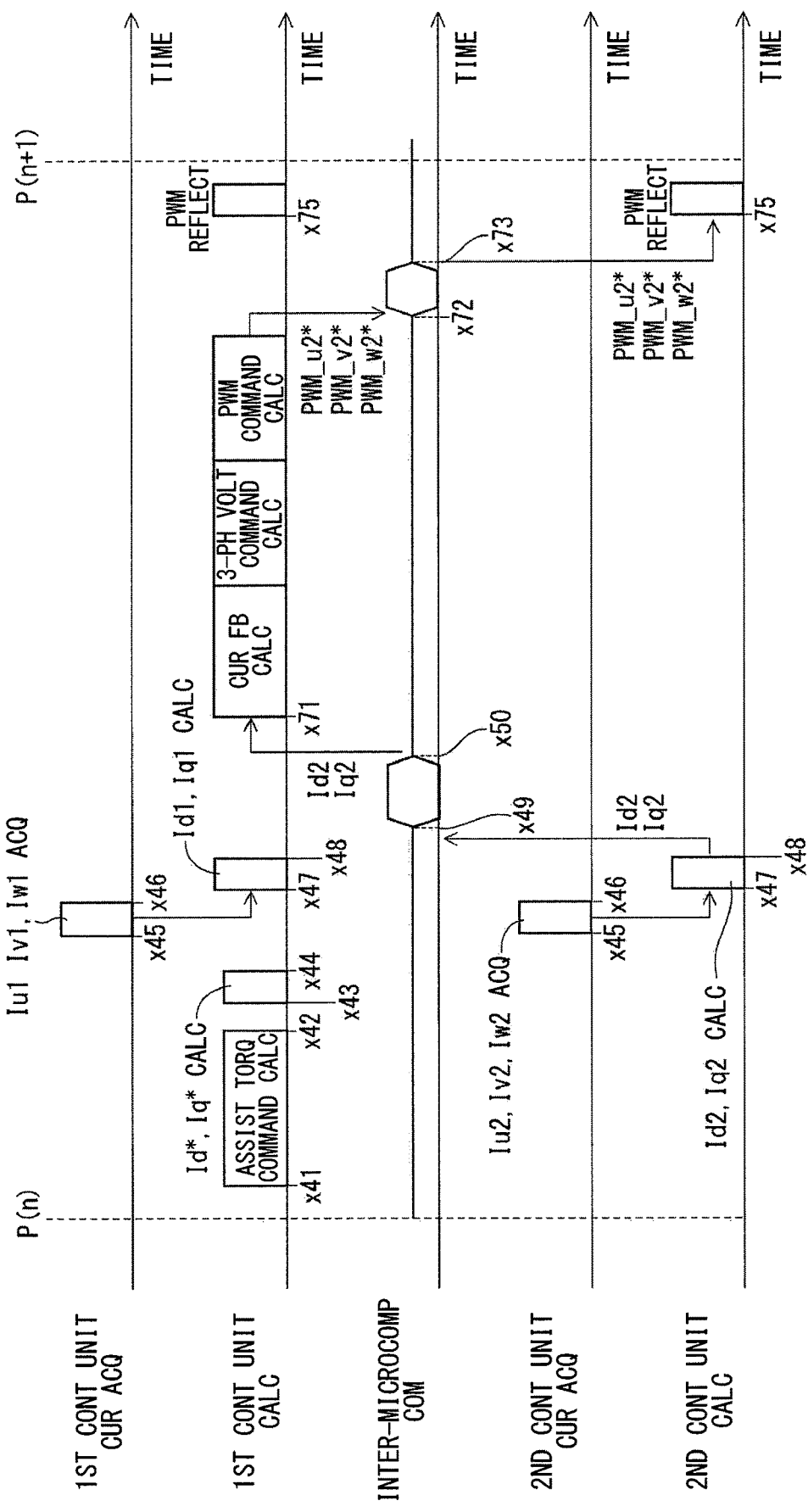
FIG. 20 is a time chart illustrating calculation processing according to the fifth embodiment.

A fifth embodiment is shown in FIGS. 19 and 20. As shown in FIG. 19, a first control unit 135, which is a master control unit, includes a dq-axis current calculation unit 140, an assist torque command calculation unit 141, a q-axis current command calculation unit 142, a d-axis current command calculation unit 143, a current feedback calculation unit 175, a three-phase voltage command calculation unit 162, a PWM calculation unit 164, a first signal output unit 165, and a first communication unit 170.

In the present embodiment, a current feedback calculation unit 175 and the three-phase voltage command calculation unit 162 are the same as those in the fourth embodiment. Three-phase voltage command values Vu1*, Vv1*, Vw1*, Vu2*, Vv2*, and Vw2* calculated by the three-phase voltage command calculation unit 162 are output to the PWM calculation unit 164.

The PWM calculation unit 164 calculates first PWM signals PWM_u1*, PWM_v1*, and PWM_w1* based on the first three-phase voltage command values Vu1*, Vv1*, and Vw1*. The first PWM signals PWM_u1*, PWM_v1*, and PWM_w1* are output from the signal output unit 165 to the first inverter circuit 120. The PWM calculation unit 164 calculates second PWM signals PWM_u2*, PWM_v2*, and PWM_w2* based on the second three-phase voltage command values Vu2*, Vv2*, and Vw2*. The second PWM signals PWM_u2*, PWM_v2*, and PWM_w2* are transmitted from the transmission unit 171 to the second control unit 235.

The second control unit 235, which is a slave control unit, includes a dq-axis current calculation unit 240, a second signal output unit 265, and a second communication unit 270. The second signal output unit 265 outputs the second PWM signals PWM_u2*, PWM_v2*, and PWM_w2* transmitted from the first control unit 135 to the second inverter circuit 220. In other words, in the present embodiment, the second PWM signals PWM_u2*, PWM_v2*, and PWM_w2* are transmitted from the first control unit 135 to the second control unit 235 as "command values".

In the present embodiment, the first communication unit 170 transmits the second PWM signals PWM_u2*, PWM_v2*, and PWM_w2* to the second control unit 235, and the second communication unit 270 transmits second dq-axis current detection values Id2, Iq2, and a second electric angle EleAng2 to the first control unit 135.

The calculation processing of the present embodiment will be described with reference to the time chart of FIG. 20. In the present embodiment, as in the third embodiment and the fourth embodiment, two inter-microcomputer communications are performed in a single control cycle. The processing up to a first inter-microcomputer communication is the same as that of the third embodiment and the fourth embodiment.

From a time x71 after an end of the first inter-microcomputer communication, a current FB calculation is performed, and then a three-phase voltage command calculation and a PWM command calculation are performed. A second inter-microcomputer communication is performed at times x72 to x73 after the completion of PWM command calculation. In the second inter-microcomputer communication, the second PWM signals PWM_u2*, PWM_v2*, and PWM_w2* are transmitted from the first control unit 135 to the second control unit 235. At a time x75 after the second inter-microcomputer communication, the PWM signal is output to and reflected by the inverter circuits 120 and 220.

In the present embodiment, the first control unit 135 calculates the first PWM signals PWM_u1*, PWM_v1*, and PWM_w1* involved in the first system L1, and the second PWM signals PWM_u2*, PWM_v2*, and PWM_w2* involved in the second system L2. The first control unit 135 transmits the second PWM signals PWM_u2*, PWM_v2*, and PWM_w2* as command values to the second control unit 235. In the present embodiment, the second PWM signals PWM_u2*, the PWM_v2*, and the PWM_w2* correspond to the "slave control signals". As a result, the calculation of the voltage command value in the second control unit 235 can be omitted. In addition, the same effects as those of the above embodiment can be obtained.

Sixth Embodiment

Figure 21:
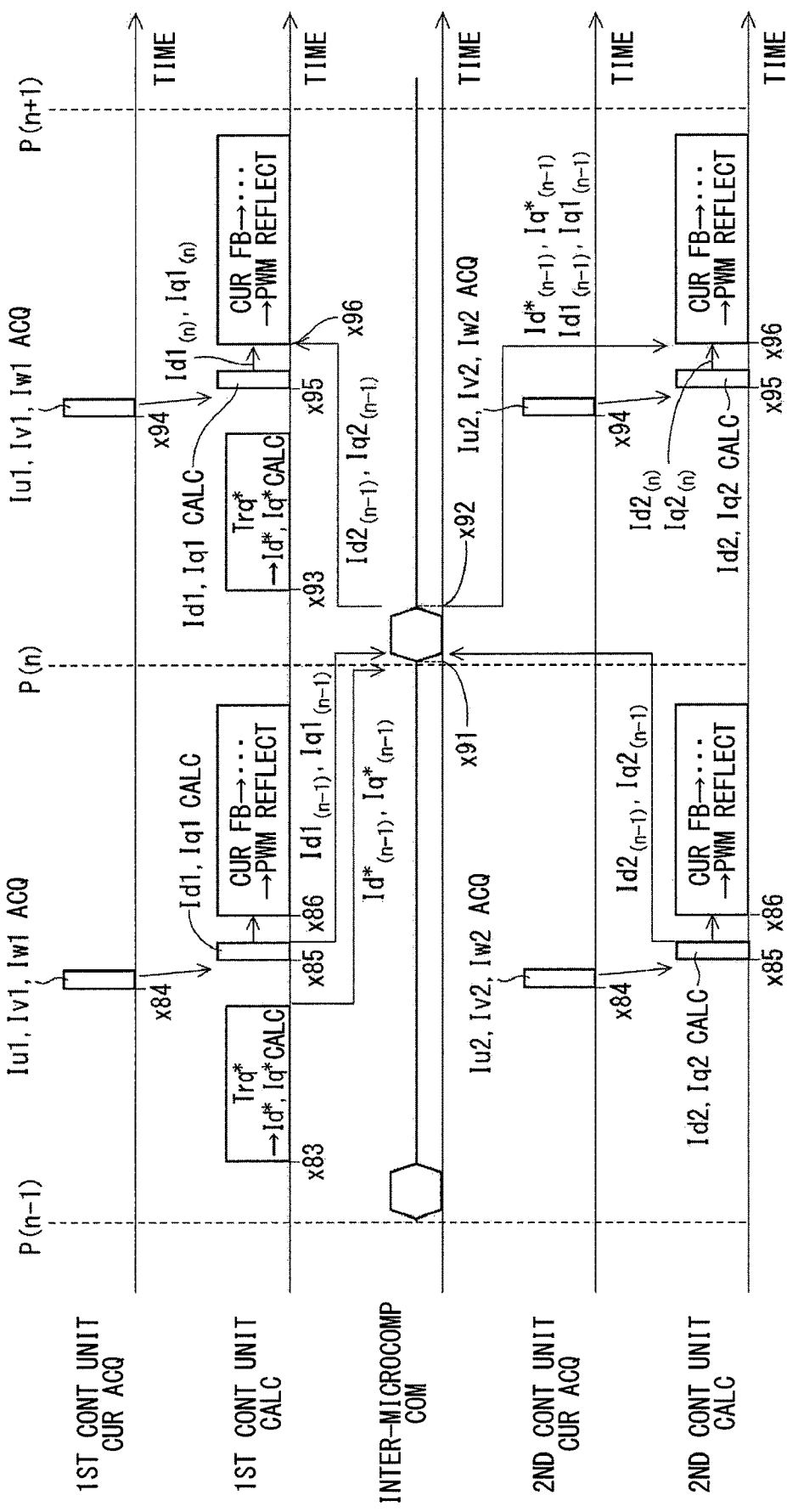
FIG. 21 is a time chart illustrating calculation processing according to a sixth embodiment.

FIG. 21 shows a sixth embodiment. In the present embodiment, similarly to the first embodiment, dq-axis current command values Id* and Iq* are transmitted as command values from a first control unit 131 to a second control unit 231, and the respective control units 131 and 231 perform a current FB calculation. Hereinafter, values calculated in a previous control cycle P(n−1) are given a subscript (n−1), and values calculated in the current control cycle P(n) are given a subscript (n), as appropriate. The processing at times x83 to x86 of the previous control cycle P(n−1) is the same as the processing at the times x93 to x96 of the current control cycle P(n), and therefore a description of the above processing will be omitted.

In the current control cycle P(n), an inter-microcomputer communication between the control units 131 and 231 is performed at a time x91 to a time x92, and dq-axis current detection values $Id1_{(n-1)}$, $Iq1(n-1)$, $Id2_{(n-1)}$, and $Iq2_{(n-1)}$ calculated by the previous control cycle $P_{(n-1)}$ are transmitted and received between the control units 131 and 231. The first control unit 131 transmits the dq-axis current command values $Id*_{(n-1)}$ and $Iq*_{(n-1)}$ to the second control unit 231.

At a time x93, the first control unit 131 calculates an assist torque command value Trq* and dq-axis current command values Id* and Iq*. At times x94 and x95, the first control unit 131 acquires phase currents Iu1, Iv1, and Iw1, and calculates dq-axis current detection values $Id1_{(n)}$ and $Iq1_{(n)}$. The second control unit 231 acquires phase currents Iu2, Iv2, and Iw2, and calculates dq-axis current detection values $Id2_{(n)}$ and $Iq2_{(n)}$.

At a time x96, a series of calculations from the current FB calculation to the output and reflection of the PWM signal is performed.

In the present embodiment, the first control unit 131 uses the dq-axis current command values $Id*_{(n)}$, the $Iq*_{(n)}$, and the dq-axis current detection values $Id1_{(n)}$ and $Iq1_{(n)}$ of the host system, and the dq-axis current detection values $Id2_{(n-1)}$ and $Iq2_{(n-1)}$ of the other systems of the previous control cycle $P_{(n-1)}$ in the current FB calculation.

The second control unit 231 uses the dq-axis current command values $Id*_{(n-1)}$ and $Iq*_{(n-1)}$ and the dq-axis current detection values $Id1_{(n-1)}$ and $Iq1_{(n-1)}$ of the other systems in the previous control cycle $P_{(n-1)}$, and the dq-axis current detection values $Id2_{(n)}$ and $Iq2_{(n)}$ of the host system in the current control cycle P(n) in the current FB calculation.

In other words, in the present embodiment, calculation is performed with the use of the values in the current control cycle P(n) for the values calculated in the host system, and with the use of the values in the previous control cycle P(n−1) for the values acquired from the other system. As in the present embodiment, the values acquired from the other systems are included in the concept of "coordinating operation" in which the values involved in the respective systems are commonly used to control the energization of the respective systems even when the values involved in the previous control cycle are used.

As a result, there is no need to perform the inter-microcomputer communication between the calculation of the dq-axis current detection values Id1, Iq1, Id2, and Iq2 and the current FB calculation, so that a period from the end of the calculation of the dq-axis current detection values Id1, Iq1, Id2, and Iq2 to the start of the current FB calculation can be shortened. Therefore, as compared with the case where the inter-microcomputer communication is performed immediately before the current FB calculation, the closer current detection value can be used for the current FB calculation with respect to the value involved in the host system. In FIG. 21, the control units 131 and 231 of the first embodiment have been described as an example, but in the second to fifth embodiments, the values in the previous control cycle may be used as the current detection values of the other system.

In the present embodiment, of the information required for the calculation of the control signals, the information acquired from the other control unit uses the value in the previous control cycle. In the present embodiment, the "information required for the calculation of the control signals" includes the dq-axis current detection values Id1, Iq1, Id2, and Iq2, and the dq-axis current command values Id* and Iq*. With the use of the values in the previous control cycle as the values acquired from the other control unit, the degree of freedom of the communication timing is increased. In the present embodiment, since a time from the calculation of the current detection values Id1, Iq1, Id2, and Iq2 to the start of the current feedback control can be shortened, a more recent value can be used for the value involved in the host system. In addition, the same effects as those of the above embodiment can be obtained.

Seventh Embodiment

Figure 22:
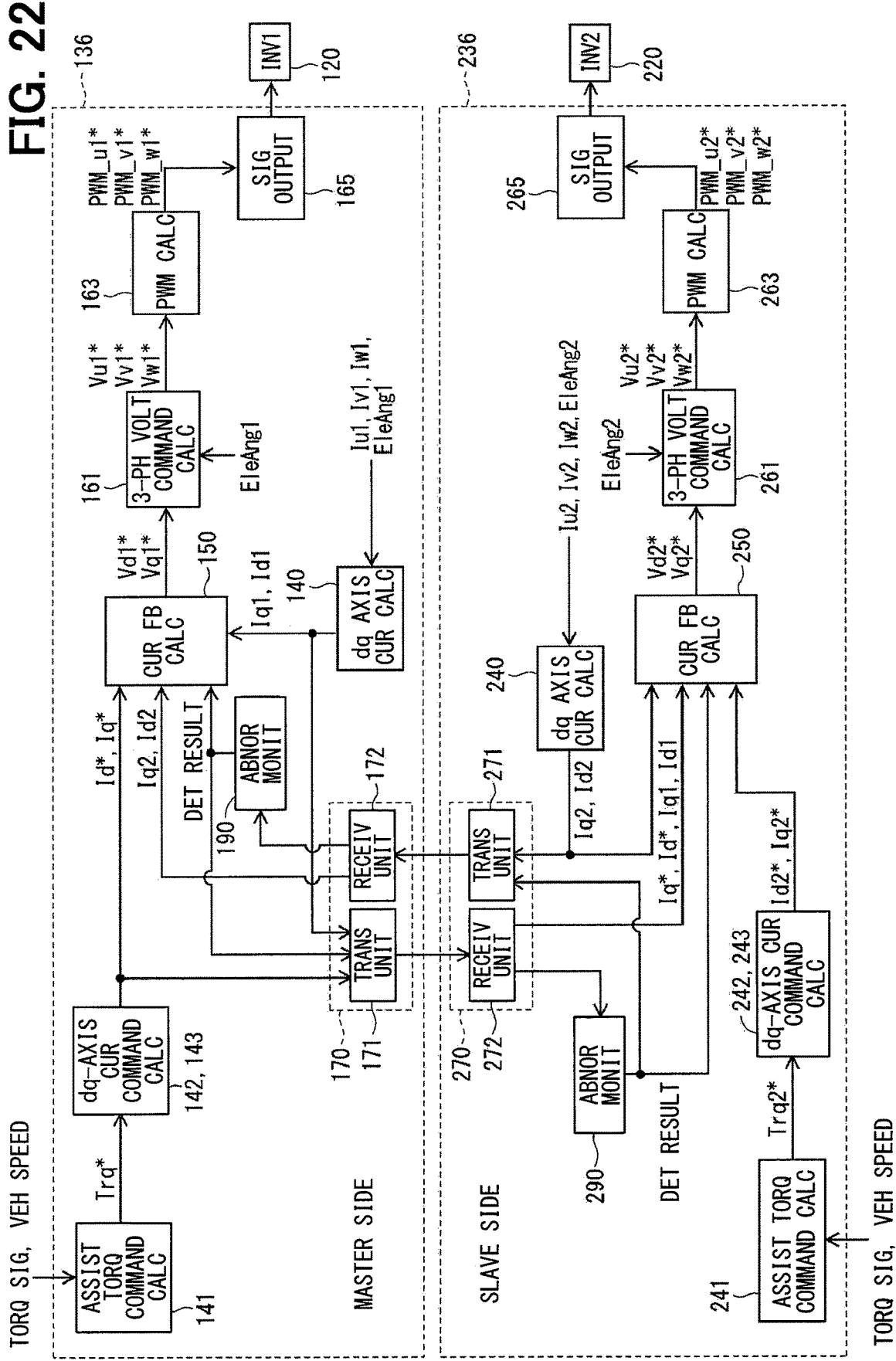
FIG. 22 is a block diagram showing a first control unit and a second control unit according to a seventh embodiment.

FIGS. 22 to 27 show a seventh embodiment. As shown in FIG. 22, a first control unit 136, which is a master control unit, includes an abnormality monitoring unit 190 in addition to the respective components of the first control unit 131 in the first embodiment. A second control unit 236, which is a slave control unit, includes an assist torque calculation unit 241, a q-axis current command calculation unit 242, a d-axis current command calculation unit 243, and an abnormality monitoring unit 290 in addition to the respective components of the second control unit 231 in the first embodiment. In FIG. 22, a d-axis current command calculation unit and a q-axis current command calculation unit are collectively described in one block in each of the control units 136 and 236.

Although FIG. 22 shows an example in which the abnormality monitoring units 190, 290 and the like are provided in the control units 131, 231 in the first embodiment, the abnormality monitoring units 190, 290 and the blocks and the like required for calculation of the PWM signals may be provided in the control units 132 to 135, 232 to 235 in the second to fifth embodiments.

The assist torque calculation unit 241 of the second control unit 236 calculates an assist torque command value Trq2 as a torque command value based on a torque signal acquired from a torque sensor 94 through a torque sensor input circuit 218, a vehicle speed acquired from a vehicle communication network through a vehicle communication circuit 217, and the like. The q-axis current command calculation unit 242 calculates a q-axis current command value Iq2* based on the assist torque command value Trq2. The d-axis current command calculation unit 243 calculates a d-axis current command value Id2*.

The command values Trq2, Iq2*, and Id2* calculated by the second control unit 236 are used when an abnormality occurs in the first control unit 136, which is a master control unit, or when a communication abnormality occurs. As a result, even when the abnormality occurs in the first control unit 136 or the communication abnormality occurs, the control can be continued by the second control unit 236 alone.

When the dq-axis current command values Id* and Iq* can be acquired from the first control unit 136, the second control unit 236 does not need to perform the calculation of the command values Trq2, Iq2*, and Id2*. In addition, even when the dq-axis current command values Id* and Iq* can be acquired from the first control unit 136, the second control unit 236 may calculate command values Trq2*, Iq2*, and Id2*. As a result, when the command value cannot be acquired from the first control unit 136, the control can be quickly switched to the control by the second control unit 236 alone. In particular, even in the case of including a logic whose control output is changed by a calculation intermediate value such as a filter processing, a calculation error of the command value caused by a calculation start delay can be reduced.

The abnormality monitoring units 190 and 290 monitor abnormalities of the host systems and abnormalities of the inter-microcomputer communication between the control units 136 and 236. The abnormality information involved in the host system is transmitted to the control unit of the other system by the inter-microcomputer communication. In addition, the abnormality information involved in other systems is acquired by the inter-microcomputer communication. As a result, an abnormal state is shared. The current feedback calculation units 150 and 250 perform a control according to the determination results of the abnormality monitoring units 190 and 290. The communication abnormalities include abnormalities in the inter-microcomputer communication corresponding to "communication abnormalities between the control units" and communication abnormalities between the vehicle communication networks 195 and 295. Hereinafter, simple "communication abnormality" means an abnormality in the inter-microcomputer communication.

In the present embodiment, similarly to the embodiments described above, the command value calculated by the first control unit 136 is transmitted to the second control unit 236 by the inter-microcomputer communication, and the energization of the master system and the slave system is controlled with the use of the common command value, so that the respective systems coordinate with each other.

Incidentally, an abnormality may occur in an inter-microcomputer communication due to disconnection of a communication line between the control units 136 and 236, bit conversion of a signal due to noise superimposition, or the like. Therefore, in the present embodiment, the abnormality monitoring units 190 and 290 monitor the abnormality of the inter-microcomputer communication, and perform a backup procedure when the abnormality is detected.

The communication frame details of the inter-microcomputer communication are shown in FIG. 23. FIG. 23A shows a communication frame of signals transmitted from the first control unit 136 to the second control unit 236. When the first control unit 131 transmits the d-axis current command value Id* and the q-axis current command value Iq* to the second control unit 231, a communication frame includes a signal indicating the q-axis current command value Iq*, a signal indicating the d-axis current command value Id*, a signal indicating the q-axis current detection value Iq1, a signal indicating the d-axis current detection value Id1, a run counter signal, and a CRC (Cyclic Redundancy Check) signal.

FIG. 23B shows signals transmitted from the second control unit 236 to the first control unit 136, and the communication frame includes a q-axis current detection value Iq2, a d-axis current detection value Id2, a run counter signal, and a CRC signal. The same applies to the signals transmitted from the second control units 231 to 235 to the first control units 131 to 135.

FIG. 23C shows signals transmitted from the first control unit 132 according to the second embodiment. As in the second embodiment, when the assist torque command value Trq* is transmitted from the first control unit 132 to the second control unit 232, the communication frame includes a signal indicating the assist torque command value Trq*, a signal indicating the q-axis current detection value Iq1, a signal indicating the d-axis current detection value Id1, a run counter signal, and a CRC signal.

FIG. 23D shows signals transmitted from the first control unit 133 according to the third embodiment. As in the third embodiment, when the dq-axis voltage command values Vd2* and Vq2* are transmitted from the first control unit 133 to the second control unit 233, the communication frame includes a signal indicating the q-axis voltage command value Vq2*, a signal indicating the d-axis voltage command value Vd2*, a run counter signal, and a CRC signal.

FIG. 23E shows signals transmitted from the first control unit 134 according to the fourth embodiment. As in the fourth embodiment, when the three-phase voltage command values Vu2*, Vv2*, and Vw2* are transmitted from the first control unit 134 to the second control unit 234, the communication frame includes a signal indicating the U-phase voltage command value Vu2*, a signal indicating the V-phase voltage command value Vv2*, a signal indicating the W-phase voltage command value Vw2*, a run counter signal, and a CRC signal.

FIG. 23F shows signals transmitted from the first control unit 135 to the second control unit 235 according to the fifth embodiment. As in the fifth embodiment, when the PWM signal PWM_u2*, the PWM_v2*, and the PWM_w2* are transmitted from the first control unit 135 to the second control unit 235, the communication frame includes a signal indicating the PWM signal PWM_u2*, the PWM_v2*, the PWM_w2*, a run counter signal, and a CRC signal.

The signals involved in the q-axis current command value, the d-axis current command value, the q-axis current detection value, and the d-axis current detection value may be any number as long as the number of bits can represent the respective physical quantities with a desired accuracy. The same applies to the torque command value, the voltage command value, and the PWM signal.

The run counter signal may be any number of bits capable of detecting a communication disruption, for example, if the number of counters is 2 bits, the number of counters is 0 to 3, and if the number of counters is 4 bits, the number of counters is 0 to 15. Furthermore, the CRC signal which is the error detection signal may be a CRC polynomial and the number of bits which can secure the reliability of communication. The error detection signal may be a signal other than CRC, such as a checksum, as long as the reliability of communication can be detected. Alternatively, the order of signals may be changed or other signals may be added. The same applies to the eighth embodiment.

Figure 24:
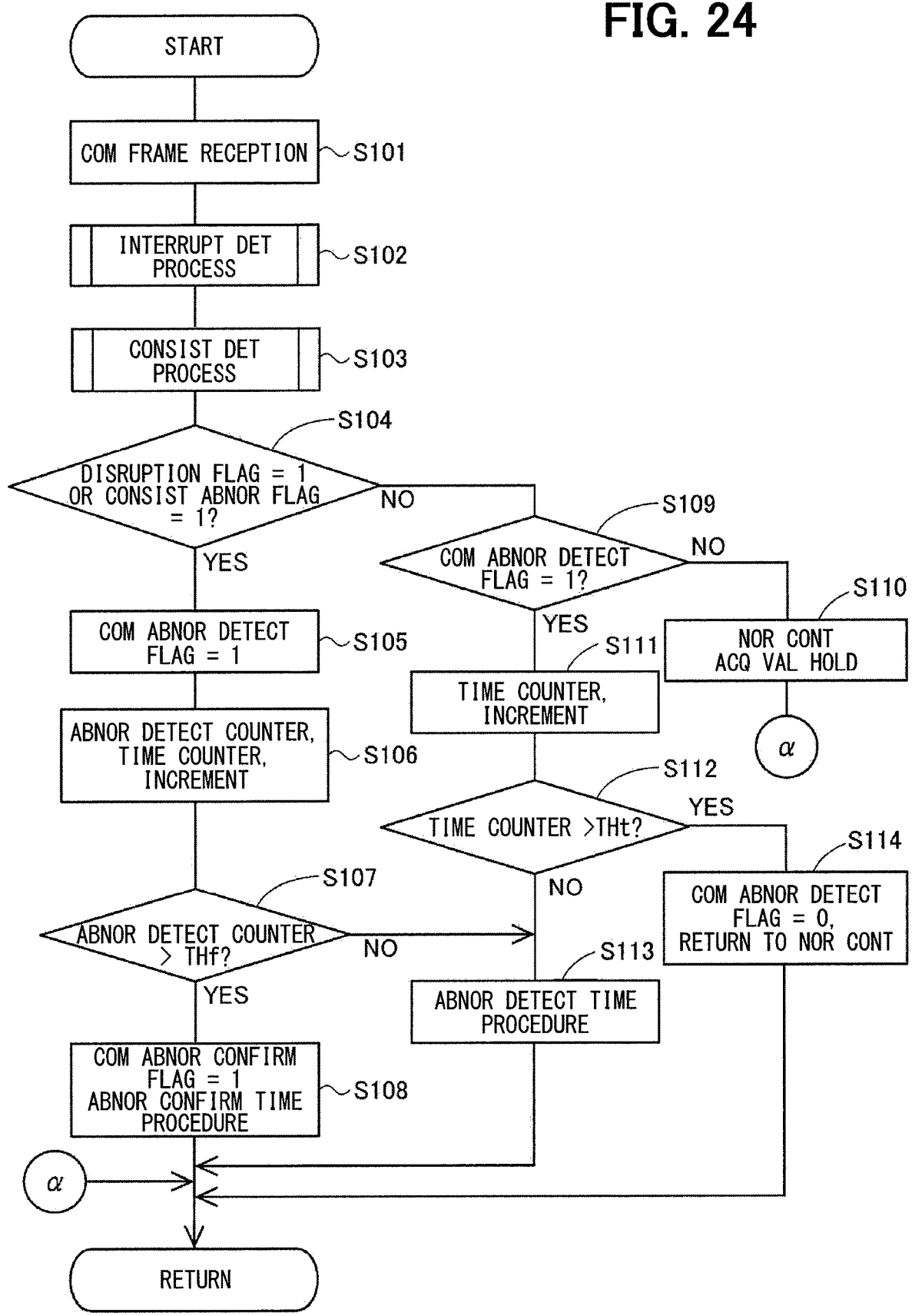
FIG. 24 is a flowchart illustrating a communication abnormality monitoring process according to the seventh embodiment.

The communication abnormality monitoring process according to the present embodiment will be described with reference to a flowchart of FIG. 24. The processing in the second control unit 236, which is the slave side, will be described. This processing is performed in a predetermined cycle by the second control unit 236. Hereinafter, the "step" in step S101 will be omitted, and the symbol "S" will be simply referred to. The other steps are the same.

In the first step S101, the second control unit 236 receives the communication frame from the first control unit 136. In S102, the abnormality monitoring unit 290 performs an interruption determination process. In S103, the abnormality monitoring unit 290 performs a consistency determination process. The interruption determination process and the consistency determination process may be performed in a different order, or may be performed separately from this process to acquire the determination result.

Figure 25:
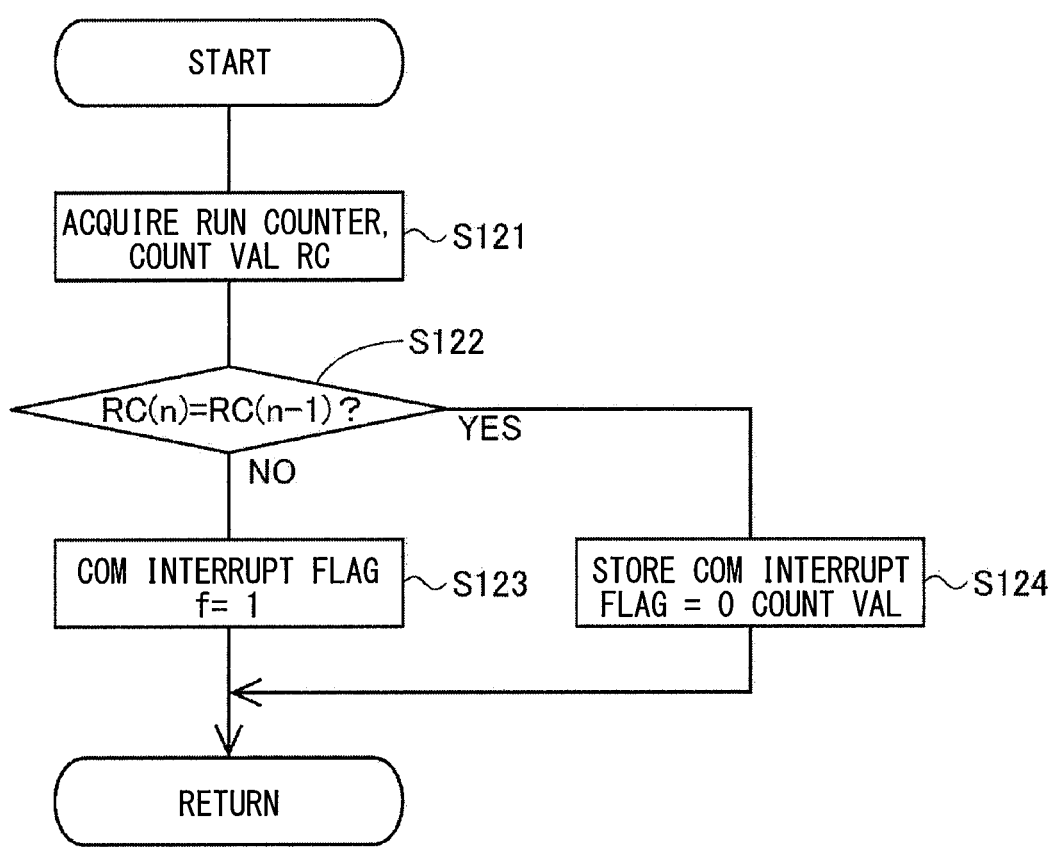
FIG. 25 is a flowchart illustrating an interruption determination process according to the seventh embodiment.

FIG. 25 is a flowchart illustrating the interruption determination process. In S121, the abnormality monitoring unit 290 acquires the count value RC from the run counter signal in the acquired communication frame. The current value of the count value RC is defined as RC(n).

In S122, the abnormality monitoring unit 290 determines whether or not the current count value RC(n) matches a value obtained by adding 1 to the previous count value RC(n−1), which is the previous count value RC. That is, it is determined whether or not Expression (ii) is satisfied. When it is determined that the expression (ii) is not satisfied (NO in S122), the process proceeds to S123. When it is determined that Expression (ii) is satisfied (YES in S122), the process proceeds to S124.

$$RC(n) = RC(n-1) + 1 \quad \text{(ii)}$$

In S123, the abnormality monitoring unit 290 determines that a communication interruption has occurred, and sets a communication interruption flag. In the figure, a state in which each flag is set is set to "1", and a state in which each flag is not set is set to "0".

In S124, the abnormality monitoring unit 290 determines that the communication interruption has not occurred, and resets the communication interruption flag. The current count value RC(n) is stored in a memory (not shown) or the like. The stored current count value is used as the previous value in a next calculation. In this example, at least the latest count value RC is held.

Figure 26:
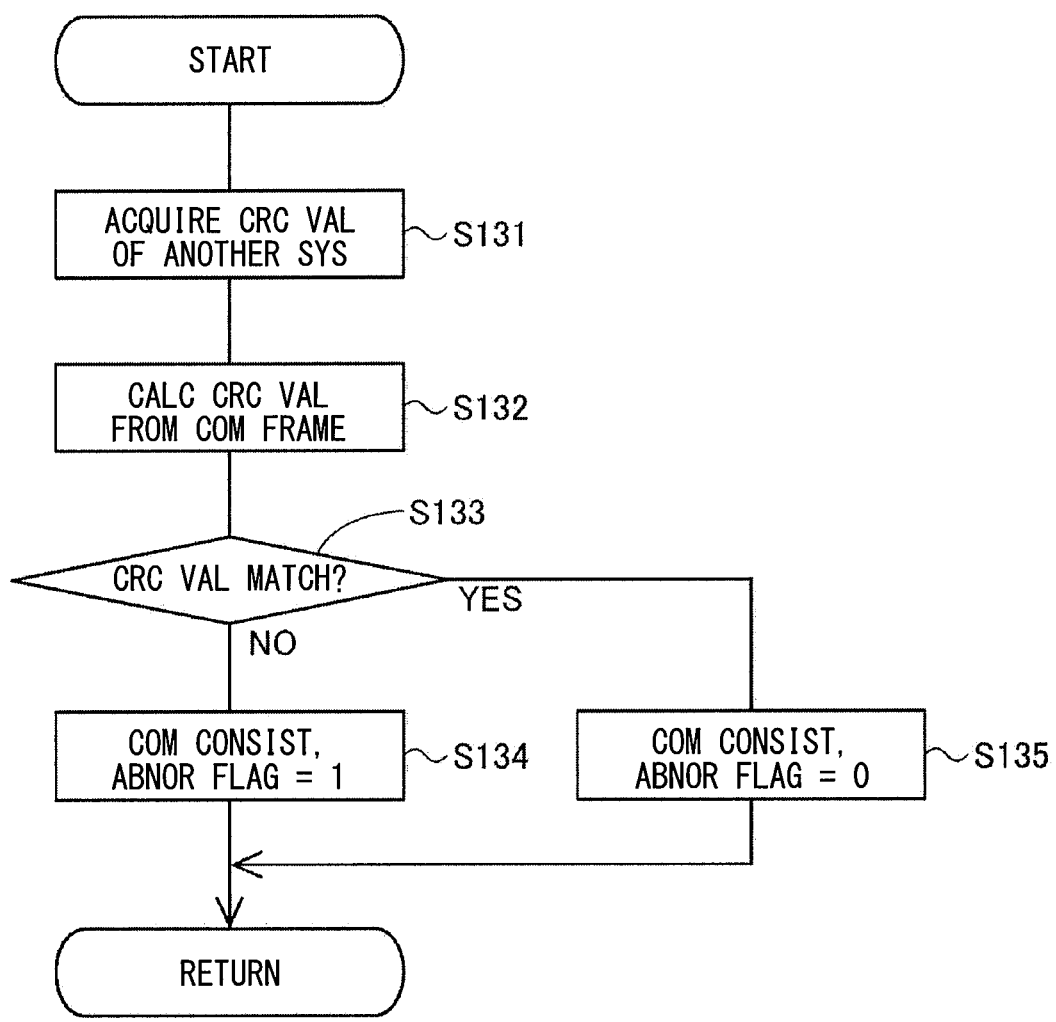
FIG. 26 is a flowchart illustrating a consistency determination process according to the seventh embodiment.

FIG. 26 is a flowchart illustrating the consistency determination process. In S131, the abnormality monitoring unit 290 acquires a value based on the CRC signal from the communication frame. The CRC value acquired in this situation is a value CRC-calculated by the first control unit 136, which is another system, and is hereinafter referred to as the other system CRC value.

In S132, the abnormality monitoring unit 290 calculates a CRC value by a CRC calculation, which is an error detection calculation, based on the communication frame. The value calculated in this situation is a value calculated internally by the second control unit 236, and is hereinafter referred to as a host system CRC value.

In S133, the abnormality monitoring unit 290 determines whether or not the host system CRC value matches the other system CRC value. When it is determined that the host system CRC value and the other system CRC value do not match each other (NO in S133), the process proceeds to S134. When it is determined that the host system CRC value and the other system CRC value match each other (YES in S133), the process proceeds to S135.

In S134, the abnormality monitoring unit 290 determines that a communication consistency abnormality such as bit conversion has occurred, and sets a communication consistency abnormality flag. In S135, the abnormality monitoring unit 290 determines that the communication consistency abnormality such as the bit conversion has not occurred, and resets the communication consistency abnormality flag.

Returning to FIG. 24, in S104 which shifts subsequent to the interruption determination process and the consistency determination process, the abnormality monitoring unit 290 determines whether or not the communication interruption flag or the communication consistency abnormality flag is set. When it is determined that the communication interruption flag and the communication consistency abnormality flag are not set (NO in S104), the process proceeds to S109. When it is determined that the communication interruption flag or the communication consistency abnormality flag is set (YES in S104), the process proceeds to S105.

In S105, the abnormality monitoring unit 290 sets the communication abnormality detection flag. In S106, the abnormality monitoring unit 290 increments an abnormality detection counter and a time counter. The abnormality detection counter is a counter for counting the number of times of abnormality detection, and the time counter is a counter for counting a time from the detection of an abnormality.

In S107, the abnormality monitoring unit 290 determines whether or not the count value of the abnormality detection counter is larger than a confirmation determination threshold THf. When it is determined that the count value of the abnormality confirmation counter is equal to or smaller than the confirmation determination threshold THf (NO in S107), the process proceeds to S113. When it is determined that the count value of the abnormality confirmation counter is larger than the confirmation determination threshold THf (YES in S107), the process proceeds to S108.

In S108, the abnormality monitoring unit 290 sets a communication abnormality confirmation flag. In addition, the second control unit 236 shifts to an abnormality confirmation time procedure. The abnormality confirmation time procedure according to the present embodiment is independent driving control that does not use a value acquired from the first system L1, which is another system.

Figure 27:
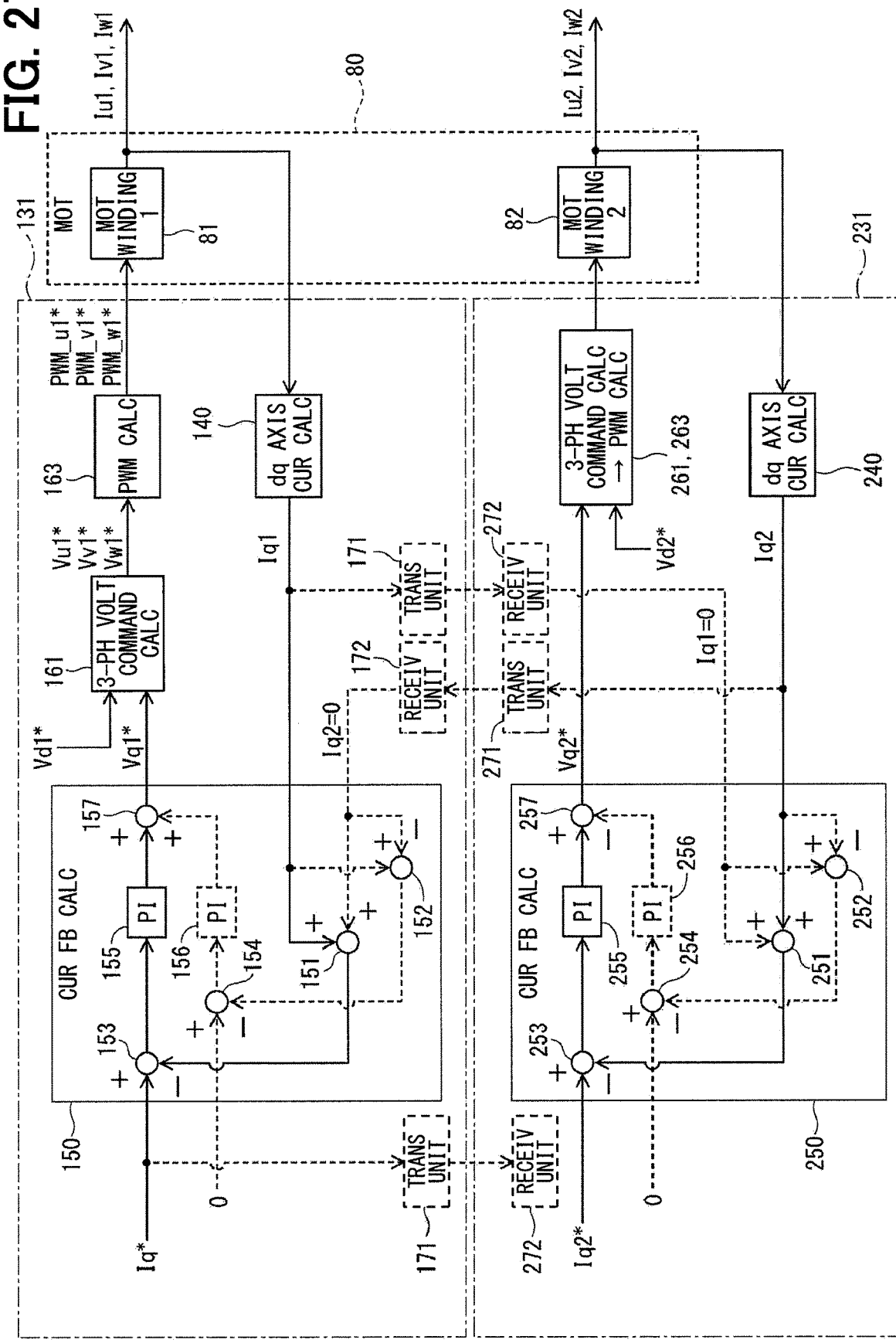
FIG. 27 is a block diagram illustrating an independent driving control according to the seventh embodiment.

The independent driving control will be described with reference to FIG. 27. In this example, it is assumed that the systems L1 and L2 are normal and the inter-microcomputer communication is abnormal. The control when the inter-microcomputer communication is normal has been described with reference to FIG. 10. In FIG. 27, the blocks of the controllers 156, 256 and the like for stopping the processing are illustrated by broken lines.

When the abnormality of the inter-microcomputer communication is confirmed, the first control unit 136 performs the current feedback control without using the value acquired from the second control unit 236. More specifically, the current detection values Id2 and Iq2 of the second system L2 are set to 0, and the PI calculation of the difference is stopped.

The second control unit 236 performs the current feedback control without using the value acquired from the first control unit 136. The second control unit 236 performs a current control with the use of the dq-axis current command values Id* and Iq* acquired from the first control unit 136 in a normal state. On the other hand, when the abnormality of the inter-microcomputer communication is confirmed, the second control unit 236 performs the current feedback calculation with the use of the dq-axis current command values Id2* and Iq2* calculated by the dq-axis current command calculation units 242 and 243 in the second control unit 236, instead of the dq-axis current command values Id* and Iq* acquired from the first control unit 136. In addition, the current detection values Id1 and Iq1 of the first system L1 are set to 0, and the PI calculation of the difference is stopped.

Returning to FIG. 24, in S109 to which the process shifts when it is determined that the communication interruption flag and the communication consistency abnormality flag are not set (NO in S104), the abnormality monitoring unit 290 determines whether or not the communication abnormality detection flag is set. When it is determined that the communication abnormality detection flag is not set (NO in S109), the process proceeds to S110. When it is determined that the communication abnormality detection flag is set (YES in S109), the process proceeds to S111.

In S110, the second control unit 236 continues a normal control with the use of the value acquired by the inter-microcomputer communication. In addition, each value acquired in this communication is held as a hold value in a storage unit (not shown) or the like. In this example, at least the latest value may be held. The second control unit 236 holds the dq-axis current command values Id* and Iq* and the dq-axis current detection values Id1 and Iq1.

In S111, the abnormality monitoring unit 290 increments the time counter. In S112, the abnormality monitoring unit 290 determines whether or not a count value of the time counter is larger than an elapse determination threshold THt. When it is determined that the count value of the time counter is equal to or smaller than the elapse determination threshold THt (NO in S112), the process proceeds to S113. When it is determined that the count value of the time counter is larger than the elapse determination threshold THt (YES in S112), the process proceeds to S114.

In S113 in which the count value of the abnormality detection counter is equal to or smaller than the confirmation determination threshold THE (NO in S107) or the count value of the time counter is equal to or smaller than the elapse determination threshold THt (NO in S112), the abnormality monitoring unit 290 determines that the abnormality in the inter-microcomputer communication is unconfirmed and performs an abnormality detection time procedure. In the abnormality detection time procedure, the current feedback control is performed with the use of a hold value acquired from the first control unit 136 and held internally when the abnormality of the inter-microcomputer communication is not detected. The abnormality detection time procedure may be an independent driving control that does not use a value acquired from another system, similarly to the abnormality confirmation time procedure.

In S114 to which the process shifts when it is determined that the count value of the time counter is larger than the elapse determination threshold THt (YES in S112), the abnormality monitoring unit 290 resets the communication abnormality detection flag. The detected abnormality in the inter-microcomputer communication is considered to be temporary, and the process returns to the normal control using the value acquired by the inter-microcomputer communication from the first control unit 136.

In the abnormality monitoring process in the first control unit 136, the held value is different in S110. In other words, since the dq-axis current command value Id2* and the Iq2* are not acquired from the second control unit 236, the dq-axis current detection values Id1 and Id2 are held as hold values in the first control unit 136. The other processing is substantially the same as the abnormality monitoring process in the second control unit 236.

In the present embodiment, the first control unit 136 includes an abnormality monitoring unit 190 that monitors the abnormalities of the host system and the communication abnormalities. The second control unit 236 also includes an abnormality monitoring unit 290 that monitors abnormalities of the host system and communication abnormalities. This makes it possible to appropriately detect the anomaly of the EUU 10.

An output signal transmitted from one of the control units 136 and 236 to the other includes a run counter signal. When the run counter signal is not updated, the abnormality monitoring units 190 and 290 determine that a communication interruption has occurred as a communication abnormality between the control units. As a result, the communication disruption can be appropriately detected.

The output signal transmitted from one of the control units 136 and 236 to the other includes a CRC signal which is an error detection signal. The abnormality monitoring units 190 and 290 monitor the communication consistency abnormality, which is the communication abnormality between the control units, based on the other system CRC value, which is a value based on the CRC signal included in the output signal, and the host system CRC value, which is a value calculated by the abnormality monitoring units 190 and 290 in the error detection calculation based on the output signal. This makes it possible to appropriately detect a communication consistency abnormality such as bit conversion.

The abnormality monitoring units 190 and 290 confirm the abnormality when a predetermined abnormality continuation condition is satisfied after the abnormality is detected. In the present embodiment, when the count value of the abnormality counter becomes larger than the confirmation determination threshold THf within a predetermined period after the abnormality is detected, it is considered that a predetermined abnormality continuation condition is satisfied, and the abnormality is confirmed. As a result, it is possible to prevent the erroneous confirmation of an abnormality due to a temporary abnormality due to, for example, noise or the like.

When no abnormality is detected, the control units 136 and 236 hold values acquired by a communication from other control units as hold values. A control is performed between the detection of the abnormality and the confirmation of the abnormality with the use of the hold value. This makes it possible to prevent the control using erroneous information from being performed.

The second control unit 236 can calculate the current command values Id2* and Iq2* used for generation 9 of the control signals involved in the host system. In the present embodiment, the current command values Id2* and Iq2* correspond to "slave command values". The control units 136 and 236 may perform the independent driving control mode in which the control signal is generated with the use of the command calculated by the control units 136 and 236 and the detection value of the host system without using the value acquired between the detection of the abnormality and the confirmation of the abnormality. When the abnormality is confirmed, the control units 136 and 236 perform the independent driving control mode. This makes it possible to prevent the control using erroneous information from being performed.

In the normal control mode in which the control units 136 and 236 are driven in coordination with each other, when the current sum and the current difference between the currents of the multiple systems (two systems in the present embodiment) are controlled, the control units 136 and 236 set the current detection value acquired from the other control units to 0 in the independent driving control mode, and stop the control of the current difference. The same applies to the single-system driving mode which will be described later. As a result, even in the case where the sum and difference are controlled in the normal state, it is possible to appropriately shift the normal control mode to the independent driving control mode in the case of the communication abnormality. It should be noted that the "abnormal state" is a concept including both of a period from the detection of the abnormality to the confirmation of the abnormality, and a time of the confirmation of the abnormality.

When the abnormality is not confirmed within a predetermined period of time after the abnormality is detected, the control units 136 and 236 return to the normal control mode. As a result, when the abnormality is not conformed, the normal control mode can be appropriately restored from the abnormality control mode.

In the present embodiment, the ECU 10 is applied to the electric power steering device 8. In the present embodiment, when the abnormality of the inter-microcomputer communication is detected, the process shifts to the abnormality detection time procedure before the abnormality is confirmed, and when the abnormality is confirmed, the process shifts to the independent driving control mode. As a result, even when an abnormality is detected in the inter-microcomputer communication, appropriate measures are taken, so that the safety of the vehicle can be ensured.

Eighth Embodiment

An eighth embodiment is shown in FIGS. 28 to 37. In the seventh embodiment, the processing when the abnormality in the inter-microcomputer communication occurs has been described. In the present embodiment, current FB calculation units 150 and 250 of control units 136 and 236 switch a control mode according to the type of abnormality that has occurred. In this example, the types of abnormalities are classified into (1) an abnormality in the inter-microcomputer communication, (2) an abnormality in which a motor control cannot be performed, (3) an abnormality that indirectly affects the motor control, and (4) a command value deviation between systems. Hereinafter, the abnormalities of the above items (1) to (4) are referred to as "abnormalities (1) to (4)" as appropriate.

(1) When the abnormality in the inter-microcomputer communication occurs and (4) the command values between the systems deviates from each other, the control shifts to the independent driving control. Details of the abnormality in the inter-microcomputer communication have been described in the seventh embodiment.

(2) When an uncontrollable abnormality occurs in which the drive of the motor 80 cannot be controlled in one system, the control shifts to single-system driving control in which the motor 80 is driven with the use of the other system. The uncontrollable abnormality includes an abnormality of a drive system extending from the batteries 191 and 291 to the motor windings 180 and 280 through the inverter circuits 120 and 220, a sensor abnormality used for generation of the command value necessary for the motor control, an abnormality of the control units 131 and 231, and the like. In the present embodiment, the sensors used for generation of the command value necessary for the motor control include the torque sensor 94, the current sensors 125 and 225, and the rotation angle sensors 126 and 226. In the single-system driving control, in the normal system, the current detection value acquired from the other control unit is set to 0, and the control of the current difference is stopped, similarly to the independent driving control (refer to FIG. 27). In the abnormal system, the current FB control and the output of the control signal are stopped. In the single-system driving control, the output torque from the normal system may be the same as that at the time of the two-system drive. Further, in the single-system driving control, the output torque may be made higher than that in the two-system drive in order to compensate for a torque shortage.

(3) When the abnormality that indirectly affects the motor control occurs, alternative control is performed. An abnormality that indirectly affects the motor control is a state in which the motor control is possible, but motor control cannot be performed as intended by the user or under a preset condition. The abnormalities that indirectly affect the motor control include an abnormality in communication with the vehicle communication networks 195 and 295, an abnormality in the temperature sensors 127 and 227, and the like. The alternative control is a control using substitute information instead of using a signal that is abnormal. For example, when the vehicle communication abnormality occurs and information on the vehicle speed cannot be acquired, a fixed value of a predetermined speed (for example, 100 km/h) is used as substitute information on the vehicle speed. Further, for example, when an abnormality occurs in the temperature sensors 127 and 227, a fixed value of a predetermined temperature is used as the substitute information involved in the temperature. The predetermined temperature is set in accordance with a temperature requiring an overheat protection.

In this example, the details of the communication frame of the inter-microcomputer communication are shown in FIG. 28. FIGS. 28A, 28B, 28C, 28D, 28E, and 28F correspond to FIGS. 23A, 23B, 23C, 23D, 23E, and 23F, respectively, and a status signal involved in the host system is added to a head of the run counter signal. The master-side status signal is a signal corresponding to an abnormality monitoring result of the first system L1 in the abnormality monitoring unit 190. The slave-side status signal is a signal corresponding to an abnormality monitoring result of the second system L2 in the abnormality monitoring unit 290. The number of bits of the master-side status signal and the slave-side status signal may be any number, and it is desirable to set the number of bits capable of expressing the state of each abnormality item in accordance with the abnormality item notified to other systems. In the present embodiment, the abnormal state is shared by the control units 136 and 236 with the use of the status signal, but instead of the status signal, the abnormal state may be shared by any information such as an abnormal signal itself, a state transition code, or the like.

Figure 29:
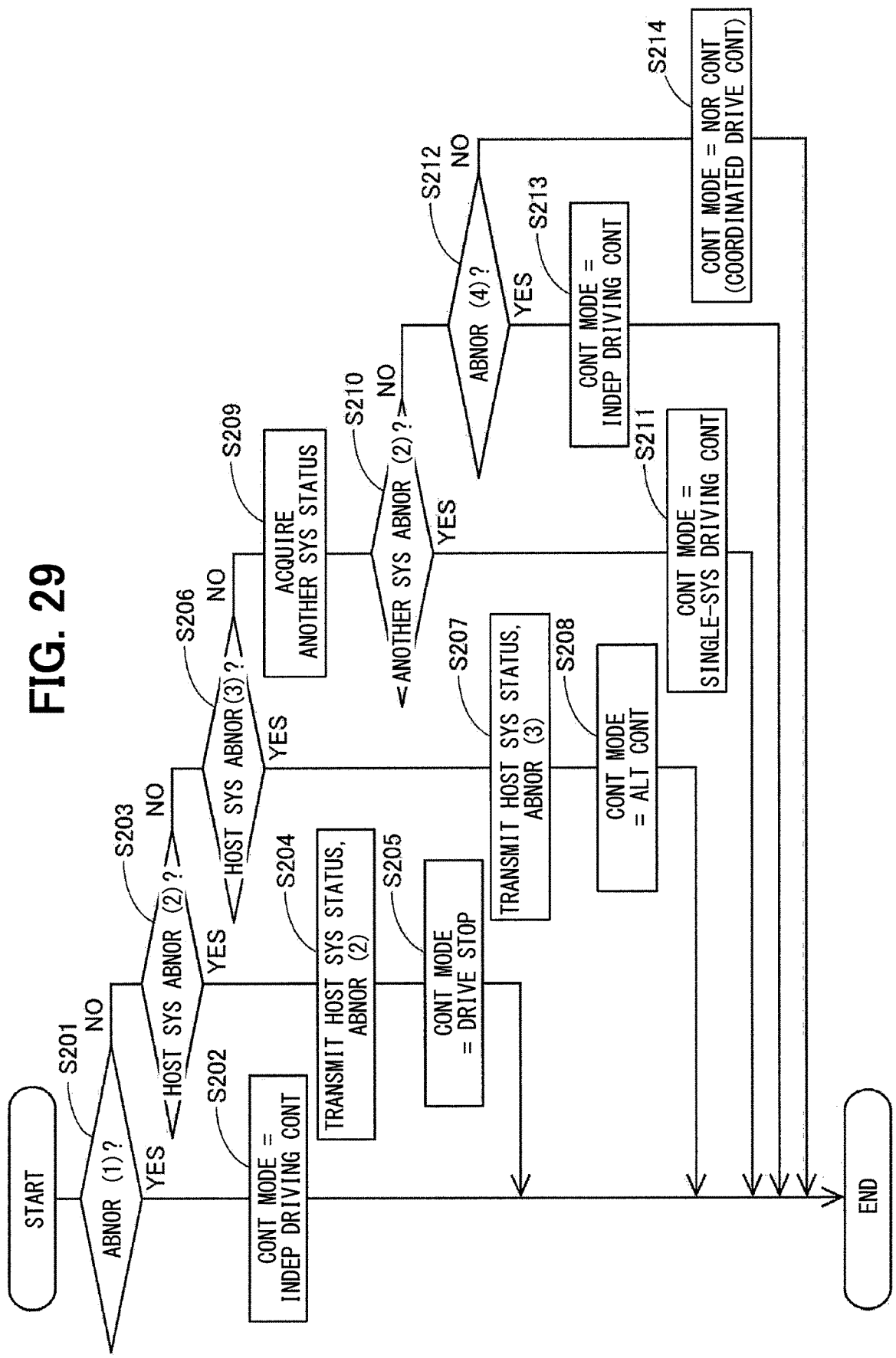
FIG. 29 is a flowchart illustrating a control mode switching process according to the eighth embodiment.

The control mode switching process will be described with reference to flowcharts of FIGS. 29 and 30. The processing of FIG. 29 is performed in a predetermined cycle by the first control unit 136 on the master side. Although the description is omitted in FIGS. 29 and 30, similarly to the above embodiment, when an abnormality is detected, the abnormality counter is incremented, and the abnormality is confirmed when the counter value becomes larger than the confirmation determination threshold THf. The confirmation determination threshold THf may be different for each type of abnormality. In a period from the detection of the abnormality to the confirmation of the abnormality, similarly to the above embodiment, a control is performed with the use of the internally held hold value.

In S201, the abnormality monitoring unit 190 determines whether or not an abnormality (1) that is an inter-microcomputer communication abnormality has occurred. In the present embodiment, the communication abnormality determination is performed in the same manner as in the seventh embodiment, but the abnormality determination method may be different. When it is determined that the abnormality (1) has occurred (YES in S201), the process proceeds to S202, and the control mode is set as independent driving control. When it is determined that the abnormality (1) has not occurred (NO in S201), the process proceeds to S203.

In S203, the abnormality monitoring unit 190 determines whether the abnormality (2) that is an abnormality in which the motor 80 cannot be controlled in the host system has occurred. When it is determined that the abnormality (2) has not occurred (NO in S203), the process proceeds to S206. When it is determined that the abnormality (2) has occurred (YES in S203), the process proceeds to S204.

In S204, the first control unit 136 includes information indicating that the abnormality (2) has occurred in the status signal of the host system, and transmits the status signal to the second control unit 236. For convenience of description, the signal is transmitted in this step, but the signal may be transmitted from the transmission unit 171 at a predetermined communication timing. The same applies to other steps involved in signal transmission and reception.

In S205, the first control unit 136 stops driving the control mode of the host system. In this case, if the other system is normal, the motor 80 is driven by the single-system driving on the other system side.

In S206, the abnormality monitoring unit 190 determines whether an abnormality (3), which is an abnormality that indirectly affects the motor control, has occurred. When it is determined that the abnormality (3) has not occurred (NO in S206), the process proceeds to S209. When it is determined that the abnormality (3) has occurred (YES in S206), the process proceeds to S207.

In S207, information indicating that the abnormality (3) has occurred is included in the status signal of the host system, and is transmitted to the second control unit 236. In S208, the control unit 136 sets the control mode as the alternative control.

In S209, the abnormality monitoring unit 190 acquires status information of another system. In S210, the abnormality monitoring unit 190 determines whether or not the abnormality (2) has occurred in the other system based on the status information of the other system. When it is determined that the abnormality (2) has not occurred in the other system (NO in S210), the process proceeds to S212. When it is determined that the abnormality (2) has occurred in the other system (YES in S210), the process shifts to S211, and the control mode is set to single-system driving control.

In S212, the abnormality monitoring unit 190 determines whether or not the abnormality (4), which is a command deviation between systems, has occurred. In the present embodiment, the abnormality (4) is determined on the slave side, and the abnormality monitoring unit 190, which is the master side, determines the abnormality based on the status information acquired from the second control unit 236, which is the slave side. When it is determined that the abnormality (4) has occurred (YES in S212), the process proceeds to S213, and the control mode is set as the independent driving control. When it is determined that the abnormality (4) has not occurred (NO in S212), that is, when none of the abnormalities (1) to (4) has occurred, the process shifts to S214, and the control mode is set to the normal control. The normal control according to the present embodiment is a coordinative drive control for controlling the master system and the slave system with the use of the command value on the master side. The details of the coordinative drive control may be those of any of the embodiments described above.

Figure 30:
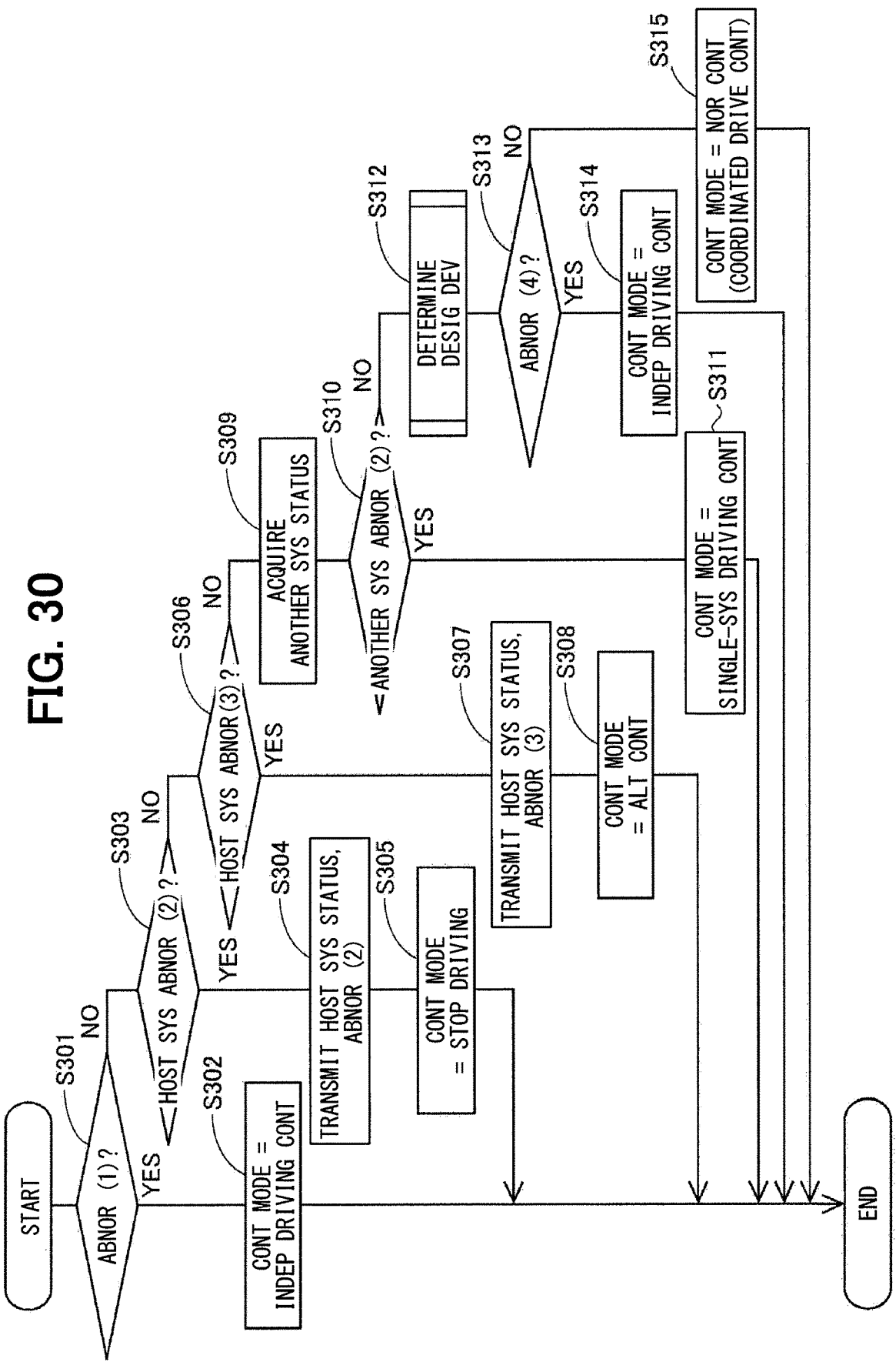
FIG. 30 is a flowchart illustrating a control mode switching process according to the eighth embodiment.

The processing of FIG. 30 is executed by the second control unit 236 on the slave side in a predetermined cycle. The processing of S301 to S310 is the same as the processing of S201 to S210. In the processing of FIG. 30, the second system L2 is used as the host system, and the first system L1 is used as the other system, and for example, the abnormality monitoring unit 190 is used as the abnormality monitoring unit 290, and the corresponding control blocks and values may be appropriately replaced.

Figure 31:
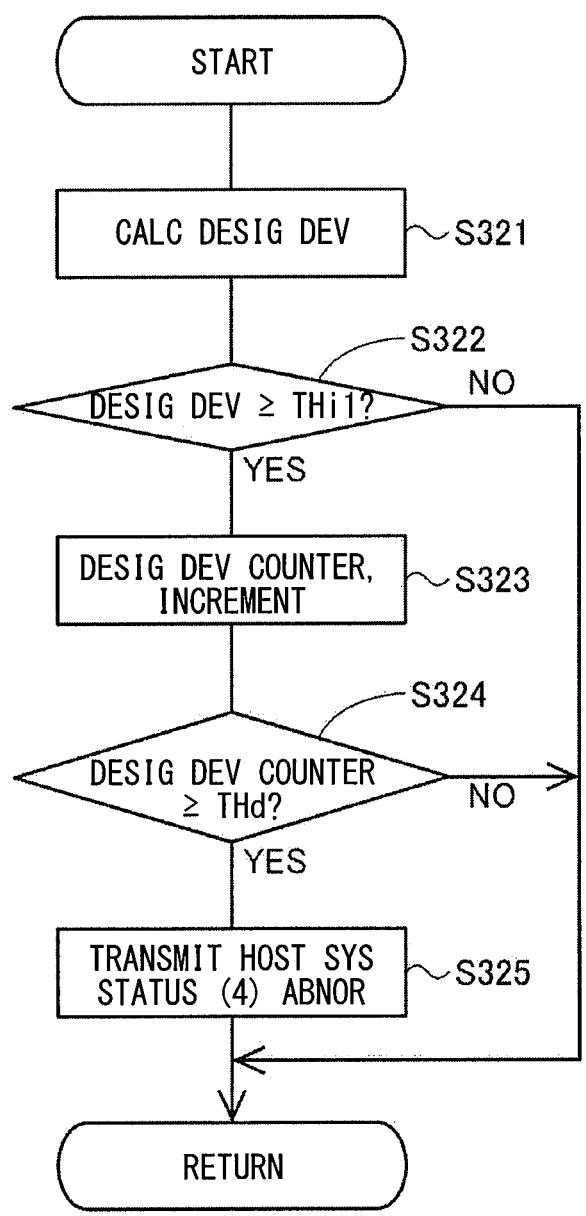
FIG. 31 is a flowchart illustrating a command deviation determination process according to the eighth embodiment.

In S312 to which the process shifts when a negative determination is made in S310, a command deviation determination process is performed. The command deviation determination process is shown in FIG. 31. In S321, the abnormality monitoring unit 290 calculates a command deviation, which is a deviation between the command value of the master system acquired by the inter-microcomputer communication and the command value calculated by the host system. In the present embodiment, the abnormality monitoring unit 290 calculates a deviation $\Delta I$ between a current command value $I1.*$ of the first system and a current command value $I2*$ of the second system. The current command values $I1*$ and $I2*$ may be any values such as a command value involved in the dq-axis current, a command value involved in the three-phase current, or a sum of squares of command values involved in the three-phase current. The command deviation is not limited to the deviation of the current command value, and may be a deviation of the torque command value or the voltage command value.

In S322, the abnormality monitoring unit 290 determines whether or not the command deviation $\Delta I$ is equal to or greater than a command deviation determination threshold THi1. The command deviation determination threshold is set to such a value that the current command values $I1*$ and $I2*$ are considered to be coincident with each other. When it is determined that the command deviation $\Delta I*$ is smaller than the command deviation determination threshold THi1 (NO in S322), it is determined that the command deviation abnormality has not occurred, the routine ends, and the process proceeds to S313 in FIG. 30. When it is determined that the command deviation $\Delta I*$ is equal to or greater than the command deviation determination threshold THi1 (YES in S322), the process proceeds to S323, and the command deviation counter is incremented.

In S324, the abnormality monitoring unit 290 determines whether or not the count value of the command deviation counter is equal to or larger than a deviation determination threshold THd. When it is determined that the count value of the command deviation counter is smaller than the deviation determination threshold THd (NO in S324), the command deviation abnormality is not confirmed, and the routine ends, and the process proceeds to S313 in FIG. 30. When it is determined that the count value of the command deviation counter is equal to or larger than the deviation determination threshold THd (YES in S324), the process proceeds to S325.

In S325, the second control unit 236 includes information indicating that the abnormality (4) has occurred in the status signal of the host system, and transmits the status signal to the first control unit 136.

Returning to FIG. 30, in S313, the second control unit 236 determines whether or not an abnormality (4) has occurred. When it is determined that the abnormality (4) has occurred (YES in S313), the process shifts to S314, and the control mode is set to the independent driving control. When it is determined that the abnormality (4) has not occurred (NO in S313), the process proceeds to S315, and the control mode is set to the normal control.

Figure 32:
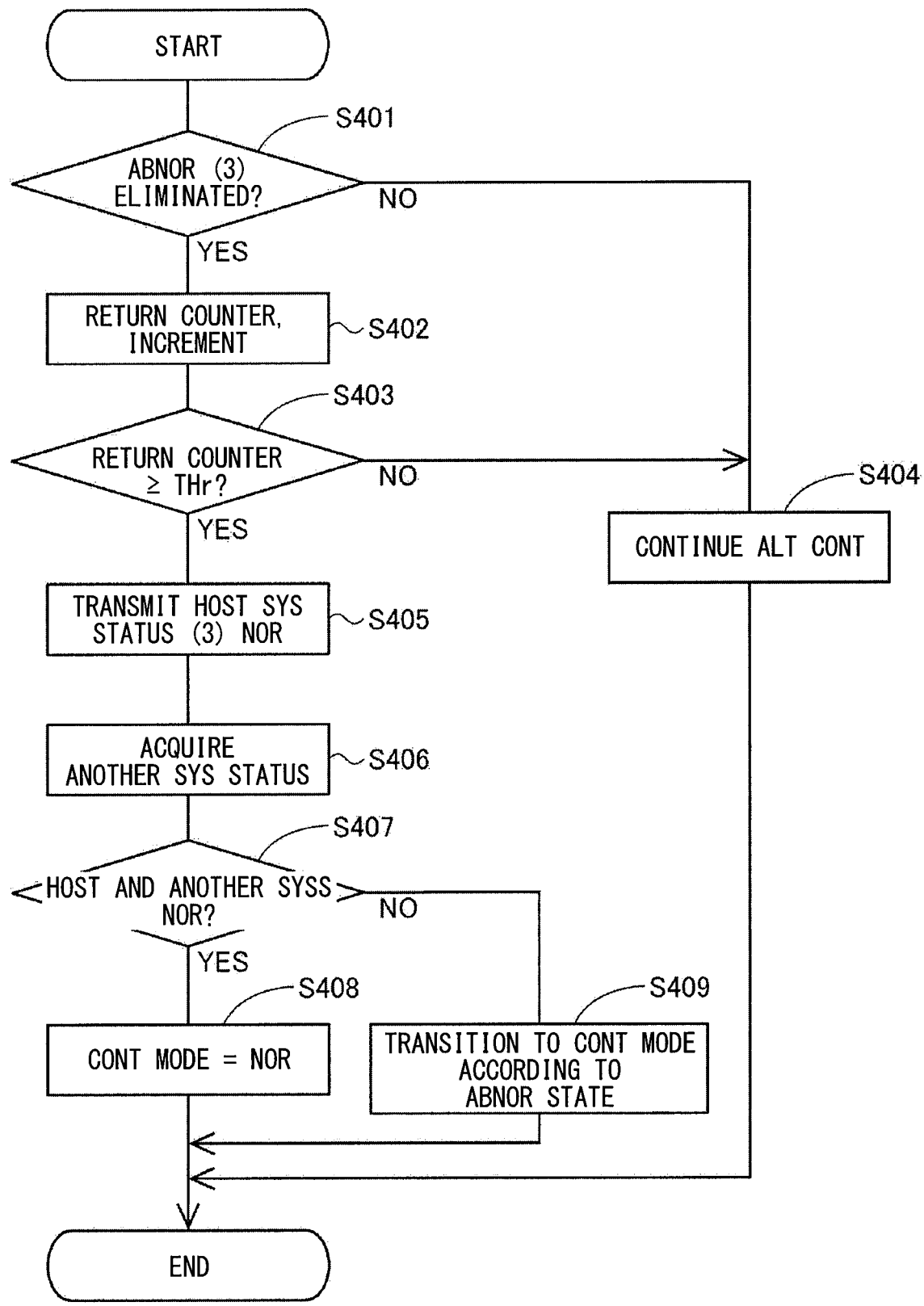
FIG. 32 is a flowchart illustrating a return process from an alternative control according to the eighth embodiment.

FIG. 32 is a flowchart illustrating a return process when the control mode is the alternative control. This processing is executed by the control units 136 and 236 in a predetermined cycle when shifting to the alternative control. Since the return process from the alternative control is the same in the control units 136 and 236, the processing of the first control unit 136 will be described, and a description of the second control unit 236 will be omitted. The same applies to FIG. 33.

In S401, the abnormality monitoring unit 190 determines whether or not the abnormality (3) has been resolved. When it is determined that the abnormality (3) has not been resolved (NO in S401), the process proceeds to S404, and the alternative control is continued. When it is determined that the abnormality (3) has been resolved (YES in S401), the process proceeds to S402.

In S402, the abnormality monitoring unit 190 increments a return counter. In S403, the abnormality monitoring unit 190 determines whether or not the count value of the return counter is equal to or larger than a return determination threshold THr. The return determination threshold THr may be the same as or different from the value in the return process from other abnormalities. When it is determined that the count value of the return counter is smaller than the return determination threshold THr (NO in S403), the process proceeds to S404, and the alternative control is continued. When it is determined that the count value of the return counter is equal to or larger than the return determination threshold THr (YES in S403), the process proceeds to S405.

In S405, the first control unit 136 includes information indicating that the abnormality (3) is normal in the status signal of the host system, and transmits the status signal to the second control unit 236. In S406, the abnormality monitoring unit 190 acquires status information of another system.

In S407, the abnormality monitoring unit 190 determines whether or not the host system and other systems are normal. When it is determined that the host system and the other systems are normal (YES in S407), the process shifts to S408, and the control mode is set to the normal control. When it is determined that the host system or the other system is not normal (NO in S407), the process shifts to S409, and the control mode shifts to a control mode corresponding to the abnormal state. More specifically, the control mode is determined by the control mode switching process described with reference to FIGS. 29 and 30.

Figure 33:
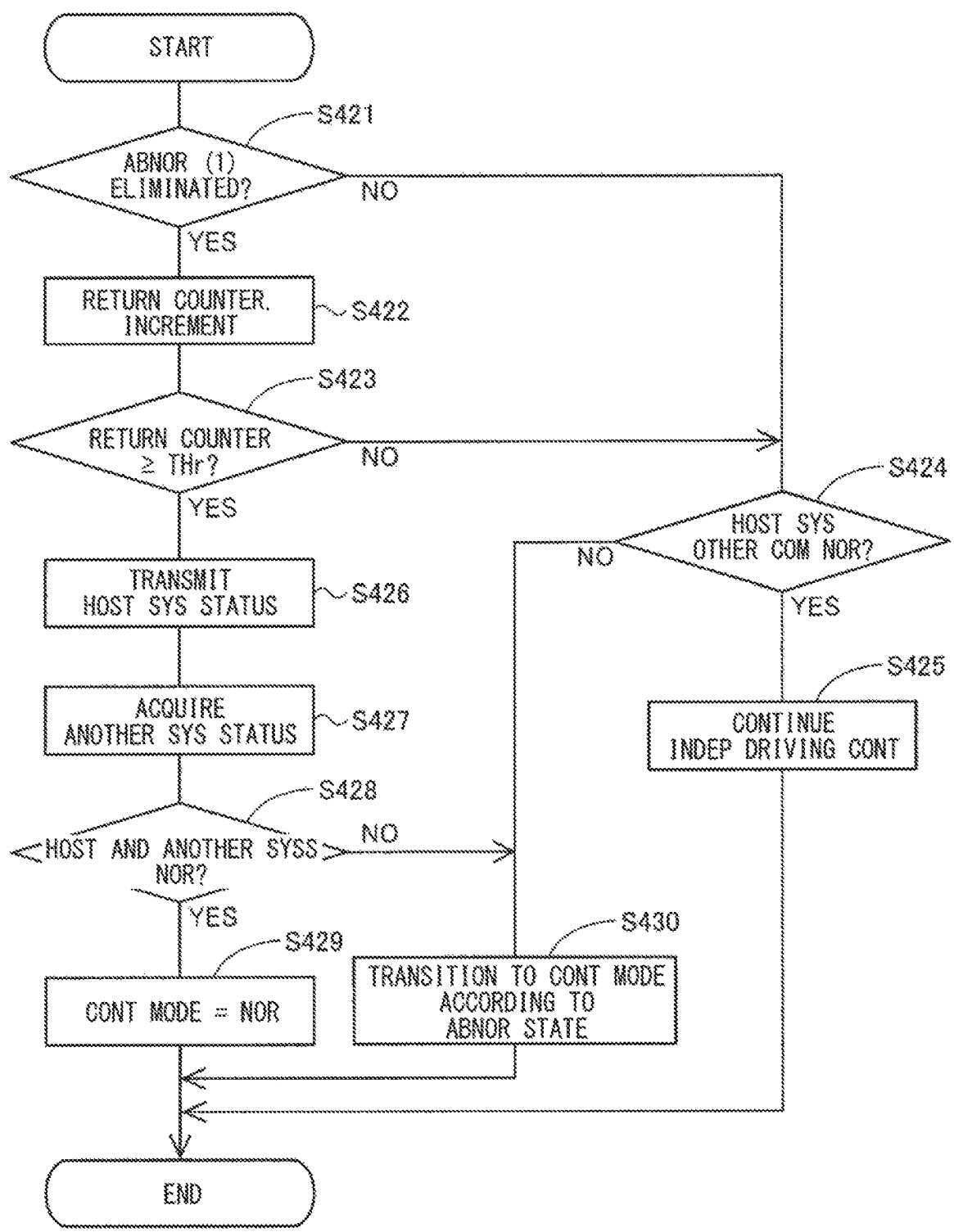
FIG. 33 is a flowchart illustrating a return process from an independent driving control due to an abnormality in the inter-microcomputer communication according to the eighth embodiment.

FIG. 33 is a flowchart illustrating the return process when the control mode is the independent driving control due to the abnormality in the inter-microcomputer communication. This processing is performed at predetermined intervals when the control unit 136 or 236 shifts to the independent driving control due to a communication abnormality.

In S421, the abnormality monitoring unit 190 determines whether or not the abnormality (1) has been resolved. In this example, when the CRC signal and the run counter are normal, it is determined that the abnormality (1) has been resolved. When it is determined that the abnormality (1) has not been resolved (NO in S421), the process proceeds to S424. When it is determined that the abnormality (1) has been resolved (YES in S421), the process proceeds to S422.

The processing of S422 and S423 is the same as the processing of S402 and S403 in FIG. 32. When it is determined in S423 that the count value of the return counter is smaller than the return determination threshold THr (NO in S423), the process proceeds to S424. When it is determined that the count value of the return counter is equal to or larger than the return determination threshold THr (YES in S423), the process proceeds to S426.

In S424, the abnormality monitoring unit 190 determines whether or not the host system is normal except for the inter-microcomputer communication. In this step, if the host system is normal except for the inter-microcomputer communication, it is determined that the host system is normal. The same applies to S465 and S525 which will be described later. If it is determined that the host system is not normal (NO in S424), the process proceeds to S430. When it is determined that the host system is normal (YES in S242), the process proceeds to S425, and the independent driving control is continued.

In S426, the first control unit 136 transmits a signal including status information involved in the abnormality information of the host system to the second control unit 236. In S427, the first control unit 136 acquires status information of another system. The processing of S428 to S430 is the same as the processing of S407 to S409 in FIG. 32.

Figure 34:
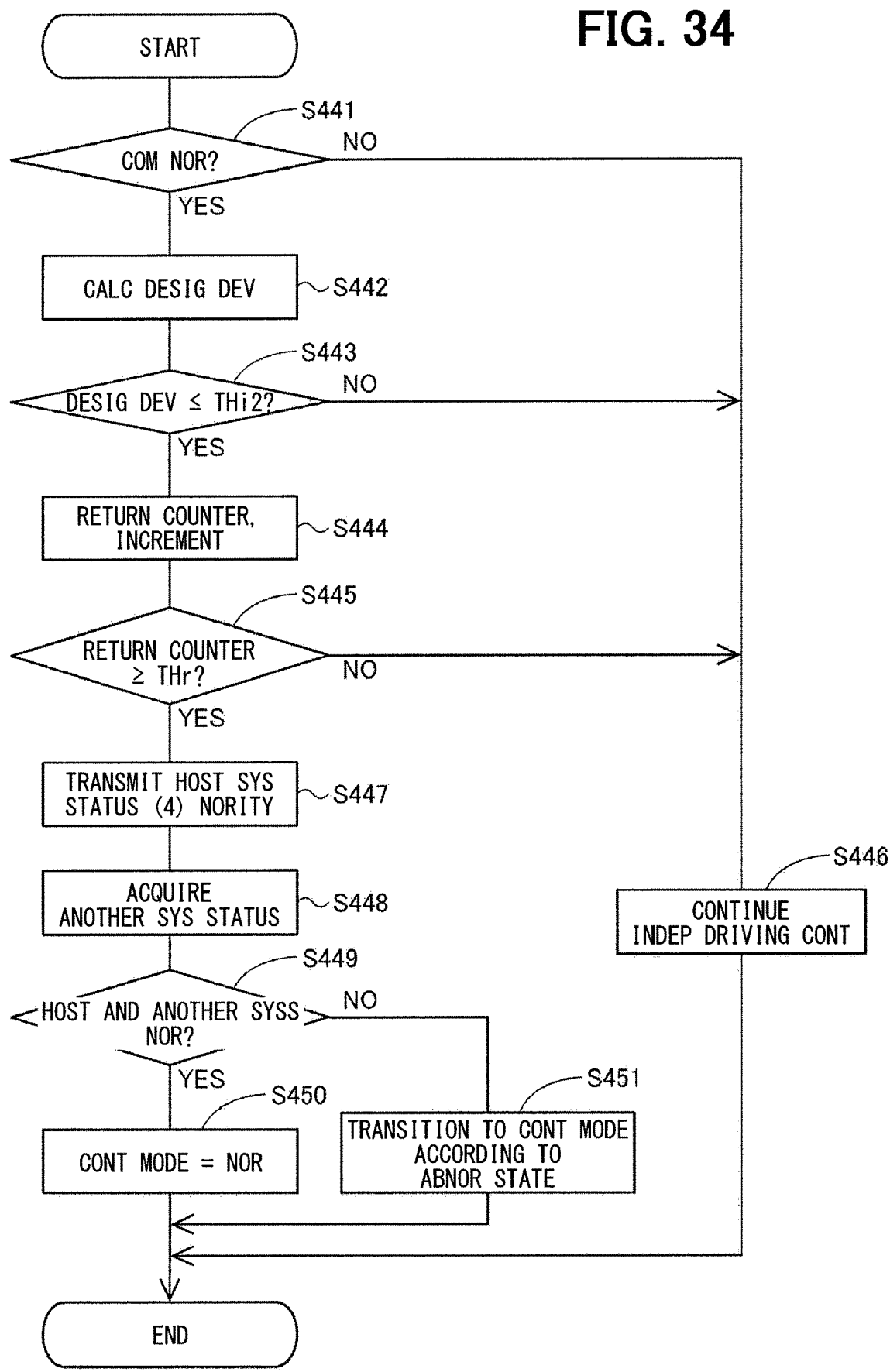
FIG. 34 is a flowchart illustrating a return process from the independent driving control due to a command deviation abnormality according to the eighth embodiment.
Figure 35:
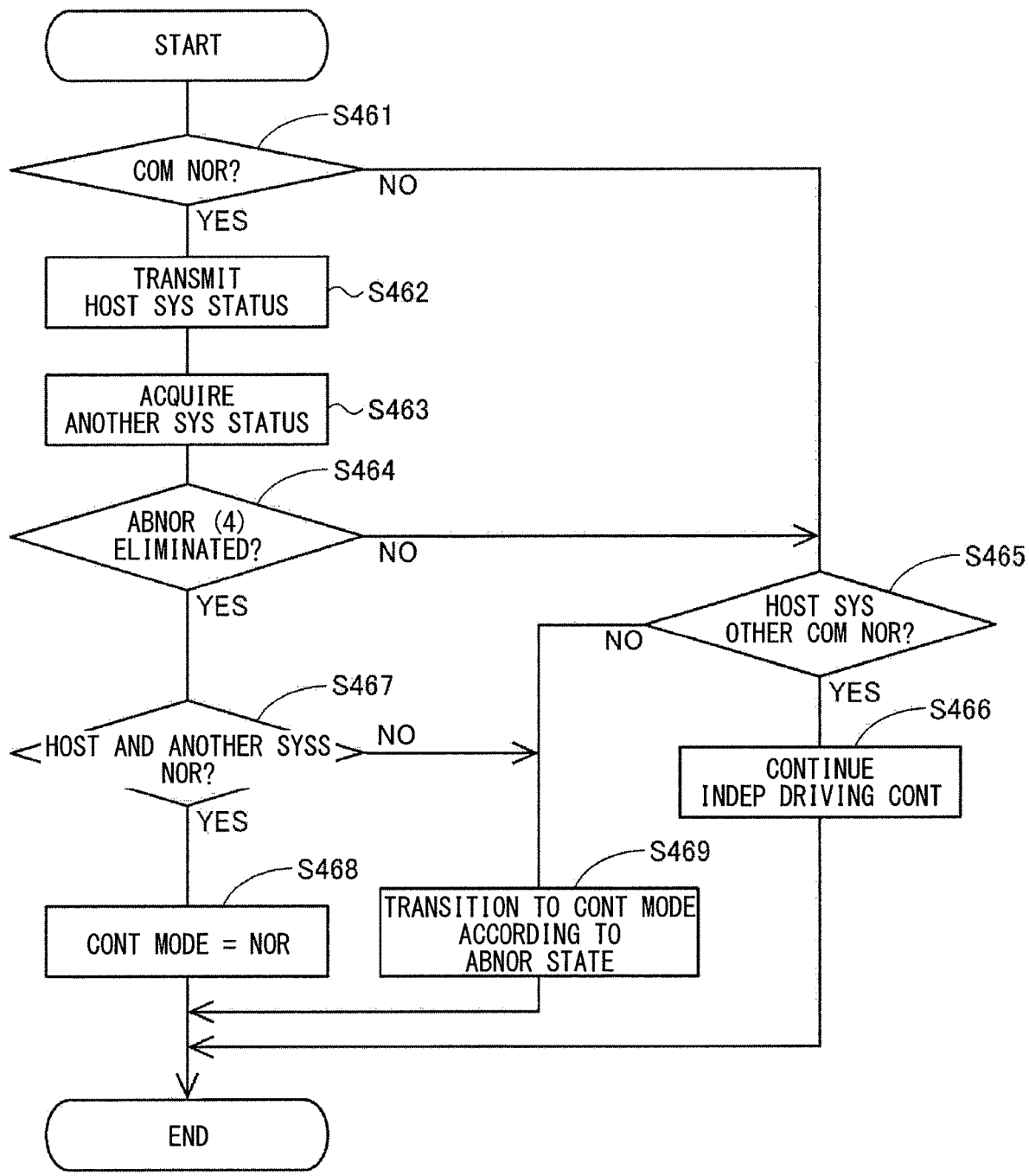
FIG. 35 is a flowchart illustrating the return process from the independent driving control due to the command deviation abnormality according to the eighth embodiment.

FIGS. 34 and 35 are flowcharts illustrating the return process at the time of the command value deviation abnormality. FIG. 34 shows processing of the second control unit 236 on the slave side, and FIG. 35 shows processing of the first control unit 136 on the master side.

As shown in FIG. 34, in S441, the abnormality monitoring unit 290 determines whether or not the inter-microcomputer communication is normal. When it is determined that the inter-microcomputer communication is not normal (NO in S441), the process proceeds to S446, and the independent driving control is continued. When it is determined that the inter-microcomputer communication is normal (YES in S441), the process proceeds to S442, and a command deviation ΔI* is calculated. As described with reference to FIG. 31, the command deviation may be other than the current deviation.

In S443, the abnormality monitoring unit 290 determines whether or not the command deviation ΔI* is equal to or less than a command deviation determination threshold THi2. The command deviation determination thresholds THi2 are set to such a value that the current command values I1.* and I2* of the first system L1 can be considered to coincide with each other. Note that the command deviation determination threshold value THi2 used here may be the same value as the command deviation determination threshold value THi1 used in S322, or may be a different value. When it is determined that the command deviation ΔI* is larger than the command deviation determination threshold THi2 (NO in S443), the process proceeds to S446, and the independent driving control is continued. When it is determined that the command deviations ΔId* and ΔIq* are equal to or smaller than the command deviation determination thresholds THi2 (YES in S443), the process proceeds to S444.

The processing of S444 and S445 is the same as the processing of S402 and S403 in FIG. 32. If it is determined in S445 that the count value of the return counter is smaller than the return determination threshold THr (NO in S445), the process proceeds to S446, and the independent driving control is continued. When it is determined that the count value of the return counter is equal to or larger than the return determination threshold THr (YES in S445), the process proceeds to S447.

In S447, the second control unit 236 includes information indicating that the abnormality (4) is normal in the status signal of the host system, and transmits the status signal to the first control unit 136. In S448, the second control unit 236 acquires status information of another system. The processing of S449 to S451 is the same as the processing of S407 to S409 in FIG. 32.

As shown in FIG. 35, in S461, the abnormality monitoring unit 190 determines whether or not the inter-microcomputer communication is normal. When it is determined that the inter-microcomputer communication is not normal (NO in S461), the process proceeds to S465. When it is determined that the inter-microcomputer communication is normal (YES in S461), the process proceeds to S462.

The processing of S462 and S463 is the same as the processing of S426 and S427 in FIG. 33. In S464, the abnormality monitoring unit 190 determines whether or not the abnormality (4) has been resolved based on the status information acquired from the slave side. When it is determined that the abnormality (4) has been resolved (YES in S464), the process proceeds to S467. When it is determined that the abnormality (4) has not been resolved (NO in S464), the process proceeds to S465.

The processing of S465 and S466 is the same as S424 and S425 in FIG. 33, and the processing of S467 to S469 is the same as the processing of S428 to S430.

Figure 36:
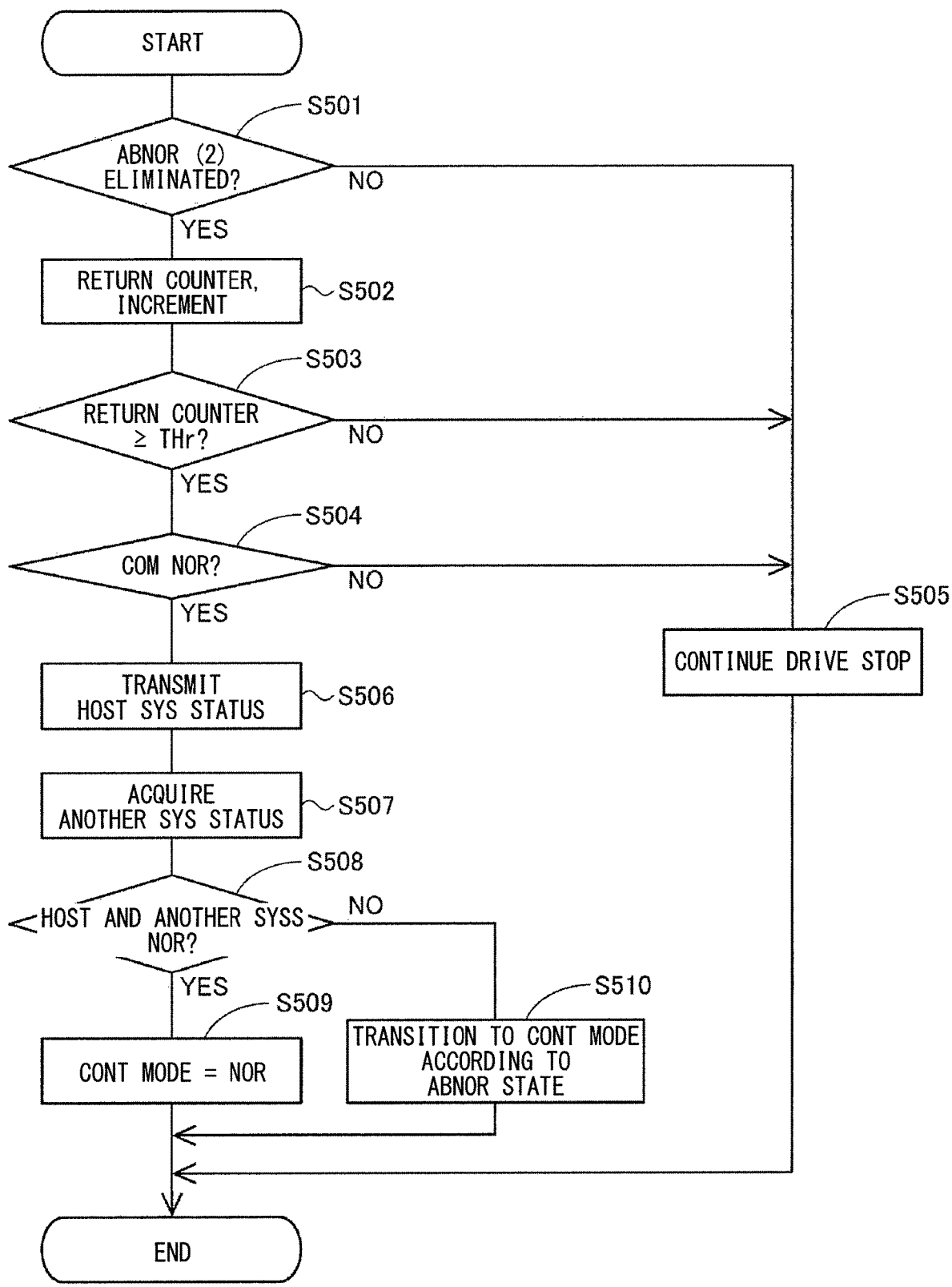
FIG. 36 is a flowchart illustrating a return process from a single-system driving according to the eighth embodiment.
Figure 37:
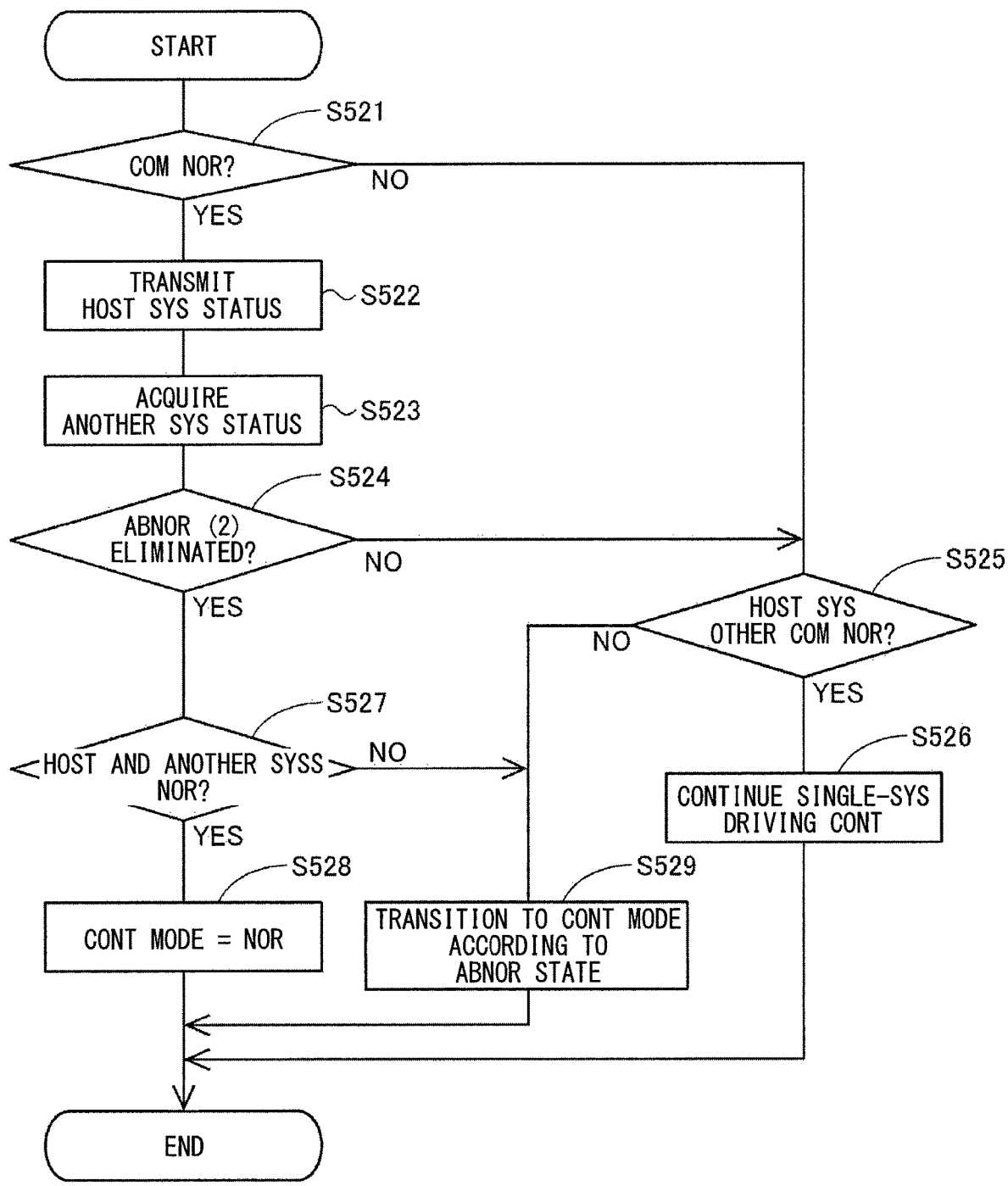
FIG. 37 is a flowchart illustrating the return process from the single-system driving according to the eighth embodiment.

FIGS. 36 and 37 are flowcharts illustrating the return process from the single-system driving. FIG. 36 shows the processing of the abnormal system in which the driving is stopped due to the abnormality (2), and FIG. 37 shows the processing of the system in which the single-system driving is continued. In this example, it is assumed that the first system L1 is an abnormal system and the second system L2 continues single-system driving.

As shown in FIG. 36, in S501, the abnormality monitoring unit 190 determines whether or not the abnormality (2) has been resolved. When it is determined that the abnormality (2) has not been resolved (YES in S501), the process proceeds to S505, and the driving stop state is continued. When it is determined that the abnormality (2) has been resolved (YES in S501), the process proceeds to S502.

The processing of S502 and S503 is the same as the processing of S402 and S403 in FIG. 32. If it is determined in S503 that the count value of the return counter is smaller than the return determination threshold THr (NO in S503), the process proceeds to S505, and the driving stop state is continued. When it is determined that the count value of the return counter is equal to or larger than the return determination threshold THr (YES in S503), the process proceeds to S505.

In S504, the abnormality monitoring unit 190 determines whether the inter-microcomputer communication is normal. When it is determined that the inter-microcomputer communication is not normal (NO in S504), the process proceeds to S505, and the driving stop state is continued. When it is determined that the inter-microcomputer communication is normal (YES in S504), the process proceeds to S506. The processing of S506 to S510 is the same as the processing of S426 to S430 in FIG. 33.

As shown in FIG. 37, in S521, the abnormality monitoring unit 290 determines whether or not the inter-microcomputer communication is normal. When it is determined that the inter-microcomputer communication is not normal (NO in S521), the process proceeds to S525. When it is determined that the inter-microcomputer communication is normal (YES in S521), the process proceeds to S522. The processing of S522 and S523 is the same as the processing of S426 and S427.

In S524, the abnormality monitoring unit 290 determines whether or not the abnormality (2) in the first system L1 that has stopped driving has been resolved based on the acquired status signal. When it is determined that the abnormality (2) has been resolved (YES in S524), the process proceeds to S527. When it is determined that the abnormality (2) has not been resolved (NO in S524), the process proceeds to S525.

In S525, the abnormality monitoring unit 290 determines whether or not the host system is normal except for the inter-microcomputer communication. When it is determined that the host system is not normal (NO in S525), the process proceeds to S529. When it is determined that the host system is normal (YES in S525), the process proceeds to S526, and the single-system driving is continued. The processing of S527 to S529 is the same as the processing of S407 to S409 in FIG. 32.

In the present embodiment, the control units 136 and 236 share the host system abnormality information involved in the abnormality of the host system and the other system abnormality information involved in the abnormality of the other system. More specifically, the control units 136 and 236 transmit the host system abnormality information, which is the abnormality information of the host system, to the control units 236 and 136 of the other systems, and acquire the other-system abnormality information, which is the abnormality information of the other systems, from the control units 236 and 136 of the other systems. In the present embodiment, the abnormality information is included in the status signal and shared by the inter-microcomputer communication. The first control unit 136 transmits the master-side status signal including the host system abnormality information to the second control unit 236, and acquires the slave-side status signal including the other system abnormality information from the second control unit 236. In addition, the second control unit 236 transmits the slave-side status signal including the host system abnormality information to the first control unit 136, and acquires the master-side status signal including other system abnormality information from the first control unit 136. This makes it possible to appropriately share the abnormal state of each system among the systems.

The control units 136 and 236 can switch between the normal control mode and the abnormal control mode as the control mode based on the host system abnormality information and the other system abnormality information. In the normal control mode, the control units 136 and 236 are driven in coordination with each other. The abnormal-time control mode includes at least one of the alternative control mode, the single-system driving control mode, and the independent driving control mode. The control units 136 and 236 return to the normal control mode when the abnormality is resolved during the alternative control mode, the independent driving control mode, or the single-system driving control mode.

In the alternative control mode, alternative information is used in place of an abnormal signal among signals used in the normal control mode. In the single-system driving control mode, the drive of a part of the systems is stopped, and the control of the motor 80 is continued with the use of the remaining systems. In the independent driving control mode, the control units 136 and 236 are not coordinated with each other, and the control of the motor 80 is continued for each system. As a result, the control of the motor 80 can be appropriately continued in accordance with the abnormal state.

The control units 136 and 236 switch to the independent driving control mode when there is a communication abnormality between the control units in which the other system abnormality information is unavailable. This makes it possible to prevent the control using erroneous information from being performed.

When the uncontrollable abnormality occurs in the host system, the control units 136 and 236 transmit information indicating that the uncontrollable abnormality has occurred to the control units 236 and 136 of the other system, stop the driving of the host system, and when information indicating that the uncontrollable abnormality has occurred in the other system abnormality information is included, the control units 136 and 236 switch the drive mode to the single-system driving mode. The uncontrollable abnormality is an abnormality of the drive system from the batteries 191 and 291 to the motor windings 180 and 280 through the inverter circuits 120 and 220, an abnormality of the torque sensor 94, the current sensors 125 and 225, or the rotation angle sensors 126 and 226, or an abnormality of the control units 136 and 236. In the case of the uncontrollable abnormality, the motor 80 can be appropriately continued to be driven with the use of the normal system by switching to the single-system driving mode.

When an abnormality indirectly affecting the driving of the motor 80 occurs, the control units 136 and 236 switch to the alternative control mode. In the present embodiment, the drive control of the motor 80 can be appropriately continued.

The control units 136 and 236 switch to the independent driving control mode when the command value I* calculated by the first control unit 136 deviates from the command value I* calculated by the second control unit 236. This can prevent control inconsistencies due to the use of deviated commands. For example, even if the calculation value calculated by the second control unit 236 based on the command value transmitted from the first control unit 136 is used for the command deviation determination, the calculation value is regarded as a "value calculated by the master control unit". The same applies to the value calculated by the slave control unit.

Figure 38:
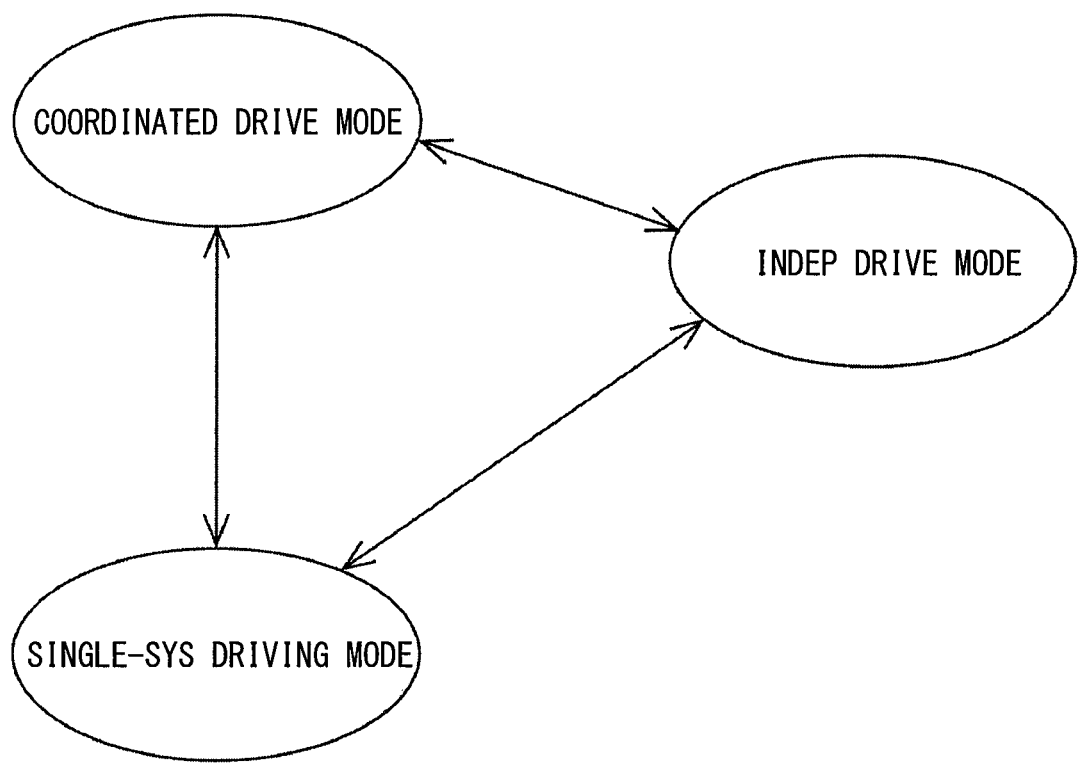
FIG. 38 is a transition diagram illustrating a mode transition according to the eighth embodiment.

As shown in FIG. 38, the control units 136 and 236 have a coordinative drive mode, an independent drive mode, and a single-system driving mode. In other words, the motor control device having the coordinative drive mode, the independent drive mode, and the single-system driving mode is considered to correspond to the ECU of the present embodiment. In the present embodiment, the drive mode is switched according to the abnormal state, but the drive mode may be switched under a transition condition other than the abnormal state. As a supplement, for example, in the independent drive mode, the alternative control mode may be combined with another control mode in such a manner that the alternative control is performed in one system.

In the coordinative drive mode, the first control unit 136, which is the master control unit, calculates a command value involved in the generation of the control signal, outputs the control signal based on the command value, and the second control unit 236, which is the slave control unit, outputs a control signal based on the command value calculated by the first control unit 136.

In the independent drive mode, the first control unit 136 calculates a command value involved in the generation of the control signal of the host system, outputs a control signal based on the calculated command value, and the second control unit 236 calculates a command value involved in the generation of the control signal of the host system, and outputs a control signal based on the calculated command value.

In the single-system driving mode, a part of the master control unit and the slave control unit stops outputting the control signal, and the other control unit calculates the command value involved in generation of the control signal of the host system, and outputs the control signal based on the command value. As a result, it is possible to appropriately control the driving of the motor 80 composed of a plurality of systems. In addition, the same effects as those of the above embodiment can be obtained.

Other Embodiments

In the above embodiments, there are two control units, one of which is a master control unit and the other of which is a slave control unit. In another embodiment, there may be three or more control units. That is, the number of systems may be three or more. In this case, the number of master control units is one, and a plurality of slave control units are provided. Incidentally, in the case of three or more systems, the case of stopping the driving of any one system and continuing the driving in the remaining plurality systems, and the case of stopping the driving of the plural systems and continuing the driving in the remaining one system are also included in the concept of "single-system driving". Further, for example, when an abnormality occurs in the master control unit, the master control unit may be replaced by switching one of the slave control units to the master control unit to continue the cooperative control. In addition, the multiple drive circuits and winding sets may be provided for one control unit.

In the above embodiment, the control unit controls the driving of the rotary electric device by the current feedback control. In another embodiment, the driving of the rotary electric device may be controlled by methods other than the current feedback control. In another embodiment, the master control unit may transmit the torque command value, the current command value, the voltage command value, or a value other than the PWM signal as a command value to the slave control unit according to the control method.

In the above embodiments, the rotary electric device is a three-phase brushless motor. In another embodiment, the rotary electric device is not limited to the brushless motor, but may be any motor. The rotary electric device is not limited to the motor, but may be a generator, or may be a so-called motor generator having both of the functions of an electric motor and a generator. In the above embodiments, the drive device is an electro-mechanically integrated type in which the ECU and the motor are integrally provided. In another embodiment, the ECU may be provided separately from the motor.

In the above embodiment, the rotary electric device control device is applied to an electric power steering device. In another embodiment, the rotary electric device control device may be applied to devices other than the electric power steering device. As described above, the present disclosure is not limited to the above-described embodiments, and can be implemented in various forms without departing from the spirit of the present disclosure.

The present disclosure has been described in accordance with embodiments. However, the present disclosure is not limited to such embodiments and structures. The present disclosure also encompasses various modifications and variations within the scope of equivalents. Also, various combinations and forms, as well as other combinations and forms that include only one element, more, or less, are within the scope and spirit of the present disclosure.

What is claimed is:

1. A rotary electric device control device for controlling driving of a rotary electric device including a plurality of winding sets, the rotary electric device control device comprising:
a plurality of drive circuits; and
a plurality of control units that include signal output units for outputting control signals to the drive circuits corresponding to the control units, respectively, and communicate with each other, wherein:
the control units include: one master control unit that calculates a command value for generating the control signals in all the control units, and transmits the command value to another control unit; and at least one slave control unit that outputs another control signal based on the command value transmitted from the master control unit;
the command value transmitted from the master control unit to the slave control unit includes at least one of a current command value, a torque command value, a voltage command value and a control signal,
the master control unit transmits the current command value as the command value to the slave control unit;
the master control unit and the slave control unit execute current feedback control with a same current command value;
a combination of the master control unit, and a drive circuit and a winding set corresponding to the master control unit is defined as a master system;
a combination of the slave control unit, and another drive circuit and another winding set corresponding to the slave control unit is defined as a slave system;
the master control unit transmits a master current detection value, which is a current detection value of the master system, to the slave control unit;
the slave control unit transmits a slave current detection value, which is a current detection value of the slave system, to the master control unit; and
the master control unit and the slave control unit respectively control a current sum of the master system and the slave system to be a current sum command value and a current difference between the master system and the slave system to be a current difference command value.

2. The rotary electric device control device according to claim 1, wherein:
the control unit transmits and receives information necessary for a current feedback control in a period after calculating current detection values and until the current feedback control starts.

3. The rotary electric device control device according to claim 1, wherein:
each control unit uses a value in a previous control cycle as information necessary for calculating a control signal, which is acquired from another control unit.

4. The rotary electric device control device according to claim 1, wherein:
each control unit further includes an abnormality monitoring unit that monitors an abnormality and a communication abnormality of an own system.

5. The rotary electric device control device according to claim 4, wherein:
the control units share own-system abnormality information relating to an abnormality of an own system and another system abnormality information relating to an abnormality of another system.

6. The rotary electric device control device according to claim 5, wherein:
the control units are switchable between a normal control mode in which a master control unit and a slave control unit are driven cooperatively with each other and an abnormality control mode including at least one of an alternative control mode, a single-system drive control mode, and an independent drive control mode, according to the own-system abnormality information and the other-system abnormality information;
the slave control unit calculates a slave command value for generating a control signal relating to a slave system;
in the alternative control mode, substitute information is used in place of an abnormal signal used in the normal control mode;
in the single-system drive control mode, a part of the systems stop driving, and the rotary electric device continues to be controlled by remaining systems; and
in the independent drive control mode, the master control unit and the slave control unit are not driven cooperatively with each other, and the rotary electric device continues to be independently controlled by each system.

7. The rotary electric device control device according to claim 6, wherein:
the current sum and the current difference of a plurality of systems are controlled in the normal control mode; and
in the independent drive control mode and the single-system drive mode, the control unit sets a current detection value acquired from another control unit to be zero, and stops controlling the current difference.

8. The rotary electric device control device according to claim 6, wherein:
the abnormality monitoring unit confirms an abnormality and switches from the normal control mode to the abnormality control mode when a predetermined abnormality continuation condition is satisfied after the abnormality is detected.

9. The rotary electric device control device according to claim 8, wherein:
the control unit stores a value acquired from another control unit by a communication as a hold value when the abnormality is not detected; and
the control unit generates the control signal based on the hold value in a period after the abnormality is detected and until the abnormality is confirmed.

10. The rotary electric device control device according to claim 8, wherein:
the control unit sets a control mode to be the independent drive control mode without using a value acquired from another control unit in a period after the abnormality is detected and until the abnormality is confirmed.

11. The rotary electric device control device according to claim 8, wherein:
the control unit returns to the normal control mode when the abnormality is not confirmed within a predetermined period after the abnormality is detected.

12. The rotary electric device control device according to claim 6, wherein:
the control unit switches a control mode to the independent drive control mode when a communication abnormality between the control units, in which the other-system abnormality information is unavailable, occurs.

13. The rotary electric device control device according to claim 12, wherein:
a signal transmitted from one of the control units to another of the control units includes a run counter signal; and
the abnormality monitoring unit determines that communication interruption occurs as the communication abnormality between the control units when the run counter signal is not updated.

14. The rotary electric device control device according to claim 12, wherein:
an output signal transmitted from one of the control units to another of the control units includes an error detection signal; and
the abnormality monitoring unit monitors a communication consistency abnormality, which is the communication abnormality between the control units, based on a value attributed to the error detection signal included in the output signal and a value calculated by the abnormal monitoring unit in an error detection calculation based on the output signal.

15. The rotary electric device control device according to claim 6, wherein:
the control unit transmits information, indicating that an uncontrollable abnormality occurs, to another control unit of another system, and stops driving the own system when an abnormality of the control unit as the uncontrollable abnormality, an abnormality of a drive system disposed from a power supply to the winding set through the drive circuit, or an abnormality of a torque sensor, a current sensor, or a rotation angle sensor occurs in the own system; and
the control unit switches the control mode to the single-system drive control mode when the other-system abnormality information includes information indicating that the uncontrollable abnormality occurs.

16. The rotary electric device control device according to claim 6, wherein:
the control unit switches the control mode to the alternative control mode when an abnormality that indirectly affects the driving of the rotary electric device occurs.

17. The rotary electric device control device according to claim 6, wherein:
the control unit switches the control mode to the independent driving control mode when the command value calculated by the master control unit deviates from the command value calculated by the slave control unit.

18. The rotary electric device control device according to claim 6, wherein:
the control unit returns to the normal control mode when an abnormality is resolved while executing the alternative control mode, the independent drive control mode, or the single-system drive control mode.

19. The rotary electric device control device according to claim 4, wherein:
the control unit executes an alternative control mode according to alternative information in place of an abnormal signal.

20. An electric power steering device comprising:
a rotary electric device control device according to claim 1;
the rotary electric device that outputs an assist torque for assisting a steering operation of a steering wheel by a driver; and
a power transmission unit that transmits a driving force of the rotary electric device to a drive target.

21. A rotary electric device control device for controlling driving of a rotary electric device including a plurality of winding sets, the rotary electric device control device comprising:
a plurality of drive circuits; and
a plurality of control units that include signal output units for outputting control signals to the drive circuits corresponding to the control units, respectively, and communicate with each other, wherein:
the control units include; one master control unit that calculates a command value for generating the control signals in all the control units, and transmits the command value to another control unit; and at least one slave control unit that outputs another control signal based on the command value transmitted from the master control unit;
the command value transmitted from the master control unit to the slave control unit includes at least one of a current command value, a torque command value, a voltage command value and a control signal;
the master control unit transmits the torque command value as the command value to tile slave control unit;
the torque command value is calculated according to a torque signal obtained from a torque sensor and a vehicle speed,
a combination of the master control unit, and a drive circuit and a winding set corresponding to the master control unit is defined as a master system;
a combination of the slave control unit, and another drive circuit and another winding set corresponding to the slave control unit is defined as a slave system;
the master control unit transmits a master current detection value, which is a current detection value of the master system, to the slave control unit;
the slave control unit transmits a slave current detection value, which is a current detection value of the slave system, to the master control unit; and
the master control unit and the slave control unit respectively control a current sum of the master system and the slave system to be a current sum command value and a current difference between the master system and the slave system to be a current difference command value.

22. A rotary electric device control device for controlling driving of a rotary electric device including a plurality of winding sets, the rotary electric device control device comprising:
a plurality of drive circuits; and
a plurality of control units that include signal output units for outputting control signals to the drive circuits corresponding to the control units respectively, and communicate with each other, wherein:
the control units include, one m aster control unit that calculates a command value for generating the control signals in all the control units, and transmits the command value to another control unit and at least one slave control unit that outputs another control signal based on the command value transmitted from the master control unit;
the command value transmitted from the master control unit to the slave control unit includes at least one of a current command value, a torque command value, a voltage command value and a control signal;
a combination of the master control unit, and a drive circuit and a winding set corresponding to the master control unit is defined as a master system;

a combination of the slave control unit, and another drive circuit and another winding set corresponding to the slave control unit is defined as a slave system;
the master control unit calculates a voltage command value relating to the master system and a slave voltage command value which is a voltage command value relating to the slave system, and transmit the slave voltage command value as the command value to the slave control units,
the slave control unit transmits a slave current detection value, which is a current detection value of the slave system, to the master control unit; and
the master control unit calculates voltage command values of the master system and the slave system based on a master current detection value, which is a current detection value of the master system, and the slave current detection value to control a current sum of the master system and the slave system to be a current sum command value and a current difference between the master system and the slave system to be a current difference command value.

23. A rotary electric device control device for controlling driving of a rotary electric device including a plurality of winding sets, the rotary electric device control device comprising:
a plurality of drive circuits; and
a plurality of control units that include signal output units for outputting control signals to the drive circuits corresponding to the control units respectively, and communicate with each other, wherein:
the control units include, one mast control unit that calculates a command value for generating the control signals in all the control units, and transmits the command value to another control unit and at least one slave control units, that outputs another control signal based on the command value transmitted from the master control unit; and
the command value transmitted from the master control unit to the slave control unit includes at least one of a current command value, a torque command value, a voltage command value and a control signal;
a combination of the master control unit, and a drive circuit and a winding set corresponding to the master control unit is defined as a master system;
a combination of the slave control unit, and another drive circuit and another winding set corresponding to the slave control unit is defined as a slave system;
the master control unit calculates a control signal relating to the master system and a slave control signal that is a control signal relating to the slave system, and transmits the slave control signal as the command value to the slave control unit;
the slave control unit transmits a slave current detection value, which is a current detection value of the slave system, to the master control unit; and
the master control unit calculates voltage command values of the master system and the slave system based on a master current detection value, which is a current detection value of the master system, and the slave current detection value to control a current sum of the master system and the slave system to be a current sum command value and a current difference between the master system and the slave system to be a current difference command value.

24. A rotary electric device control device for controlling driving of a rotary electric device including a plurality of winding sets, the rotary electric device control device comprising:
a plurality of drive circuits; and
a plurality of control units that include signal output units for outputting control signals to the drive circuits corresponding to the control units, respectively, and communicate with each other, wherein:
the control units include one master control unit and at least one slave control unit; and
the control unit includes:
a cooperative drive mode in which the master control unit calculates a command value for generating a control signal, and outputs the control signal based on the command value, and the slave control unit outputs another control signal based on the command value calculated by the master control unit;
an independent drive mode in which the master control unit calculates a command value for generating a control signal in a master system and outputs the control signal based on a calculated command value, and the slave control unit calculates another command value for generating another control signal of a slave system and outputs the other control signal based on a calculated other command value; and
a single-system driving mode in which a part of the master control unit and the slave control unit stops outputting a control signal, and another control unit calculates another command value for generating another control signal of another system and outputs the other control signal based on the other command value.

25. The rotary electric device control device according to claim 24, wherein:
the master control unit transmits the current command value as the command value to the slave control unit;
the master control unit and the slave control unit execute current feedback control with a same current command value;
a combination of the master control unit, and a drive circuit and a winding set corresponding to the master control unit is defined as a master system;
a combination of the slave control unit, and another drive circuit and another winding set corresponding to the slave control unit is defined as a slave system;
the master control unit transmits a master current detection value, which is a current detection value of the master system, to the slave control unit;
the slave control unit transmits a slave current detection value, which is a current detection value of the slave system, to the master control unit; and
the master control unit and the slave control unit respectively control a current sum of the master system and the slave system to be a current sum command value and a current difference between the master system and the slave system to be a current difference command value.

* * * * *